United States Patent
Noland et al.

(10) Patent No.: US 9,886,833 B2
(45) Date of Patent: Feb. 6, 2018

(54) SYSTEM AND METHOD OF AUTOMATED GUNSHOT EMERGENCY RESPONSE SYSTEM

(71) Applicants: Bryan Lee Noland, Tulsa, OK (US); Frank Z Patterson, Woodward, OK (US)

(72) Inventors: Bryan Lee Noland, Tulsa, OK (US); Frank Z Patterson, Woodward, OK (US)

(73) Assignee: OnAlert Guardian Systems, Inc., Tulsa, OK (US)

( * ) Notice: Subject to any disclaimer, the term of this patent is extended or adjusted under 35 U.S.C. 154(b) by 0 days.

(21) Appl. No.: 15/023,235

(22) PCT Filed: Feb. 26, 2014

(86) PCT No.: PCT/US2014/018782
§ 371 (c)(1),
(2) Date: Mar. 18, 2016

(87) PCT Pub. No.: WO2014/134217
PCT Pub. Date: Sep. 4, 2014

(65) Prior Publication Data
US 2016/0232774 A1   Aug. 11, 2016

Related U.S. Application Data

(60) Provisional application No. 61/850,934, filed on Feb. 26, 2013, provisional application No. 61/900,472, filed on Nov. 6, 2013.

(51) Int. Cl.
| | | |
|---|---|---|
| G08B 21/04 | (2006.01) |
| G08B 13/16 | (2006.01) |
| G08B 15/00 | (2006.01) |
| G08B 27/00 | (2006.01) |
| G08B 29/18 | (2006.01) |
| G08B 25/06 | (2006.01) |
| G08B 25/10 | (2006.01) |
| G08B 19/00 | (2006.01) |

(Continued)

(52) U.S. Cl.
CPC ..... *G08B 21/0438* (2013.01); *G08B 13/1672* (2013.01); *G08B 15/00* (2013.01);
(Continued)

(58) Field of Classification Search
CPC ....................... G08B 21/0438; G08B 13/1672; G08B 15/00; G08B 25/06; G08B 25/10; G06Q 10/00
(Continued)

(56) References Cited

U.S. PATENT DOCUMENTS 5,686,889 A * 11/1997 Hillis .................... G01S 3/7864
250/330
8,562,158 B2 * 10/2013 Chien .................... F21V 19/00
362/276

(Continued)

*Primary Examiner* — Omar Casillashernandez
(74) *Attorney, Agent, or Firm* — Kramer Amado, P.C.

(57) ABSTRACT

A threat sensing system is provided including, in some aspects, a plurality of threat sensing devices distributed throughout a school or facility, with each of the threat sensing devices comprising one or more acoustic sensors, one or more gas sensors, and a communication circuit or communication device configured to output sensor data to a system gateway. The system gateway is configured to receive and process the sensor data output from the threat sensing devices and determine whether the processed sensor data corresponds to one of a predetermined plurality of known threats (e.g., a gunshot) and, if so, to communicate the existence of the threat, the processed sensor information, and/or predetermined messaging information to one or more recipient devices (e.g., first responders, dispatchers).

28 Claims, 23 Drawing Sheets

(51) Int. Cl.
  *G08B 21/14*   (2006.01)
  *G08B 25/00*   (2006.01)
  *G06K 9/00*   (2006.01)

(52) U.S. Cl.
  CPC ............ *G08B 25/06* (2013.01); *G08B 25/10* (2013.01); *G08B 27/001* (2013.01); *G08B 29/183* (2013.01); *G06K 9/00335* (2013.01); *G06K 9/00771* (2013.01); *G08B 19/005* (2013.01); *G08B 21/14* (2013.01); *G08B 25/009* (2013.01)

(58) Field of Classification Search
  USPC ......................................................... 340/521
  See application file for complete search history.

(56) References Cited

U.S. PATENT DOCUMENTS

| | | | |
|---|---|---|---|
| 2003/0021188 A1* | 1/2003 | Baranek | G08B 7/066 367/136 |
| 2004/0036602 A1* | 2/2004 | Lerg | B60C 23/06 340/540 |
| 2008/0136626 A1* | 6/2008 | Hudson | G01S 17/023 340/540 |
| 2008/0272910 A1* | 11/2008 | Anderson | B60R 25/1004 340/540 |
| 2008/0278579 A1* | 11/2008 | Donovan | H04N 7/18 348/143 |
| 2009/0173788 A1* | 7/2009 | Moraites | F41G 3/04 235/411 |
| 2009/0212967 A1* | 8/2009 | Bonasia | H02H 3/335 340/4.32 |
| 2011/0069585 A1* | 3/2011 | Baxter | G01S 5/22 367/128 |
| 2011/0300825 A1* | 12/2011 | Lundgren | G06Q 20/10 455/404.1 |
| 2012/0063270 A1* | 3/2012 | Angell | G01S 5/0027 367/127 |
| 2013/0057384 A1* | 3/2013 | Morris | H04L 67/1095 340/5.74 |
| 2013/0169814 A1* | 7/2013 | Liu | H04N 7/183 348/151 |

* cited by examiner

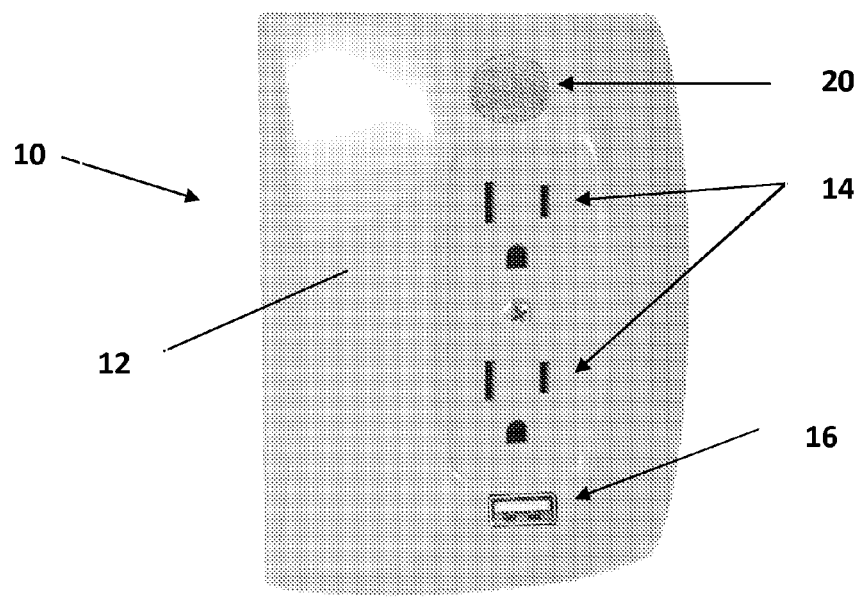
FIG. 1A
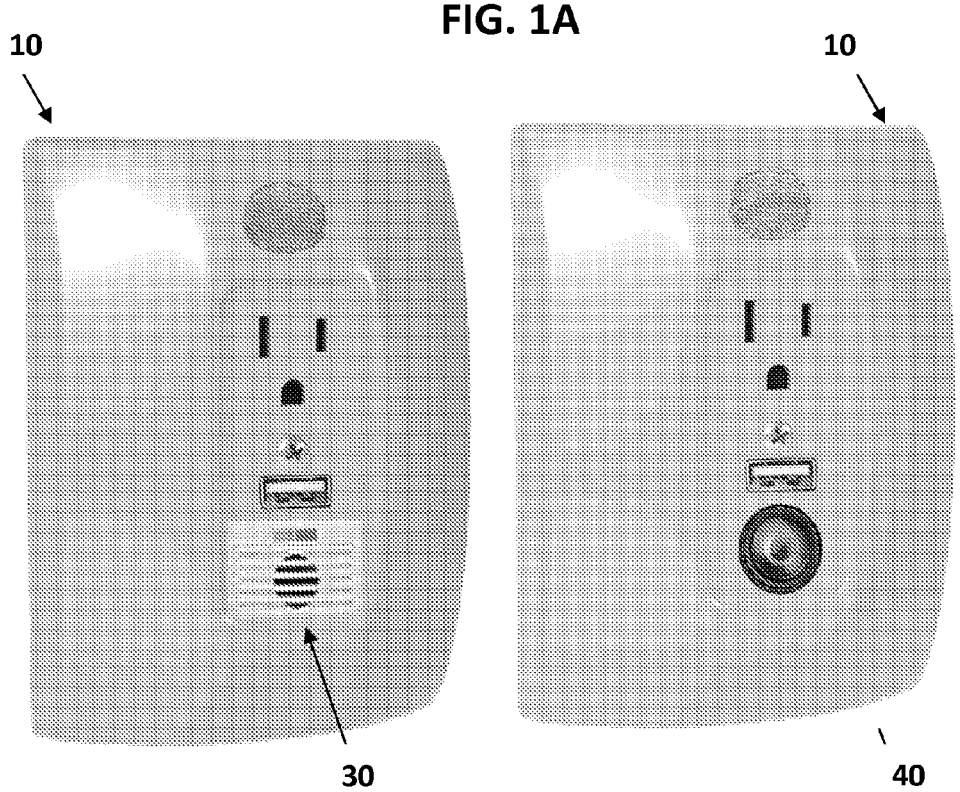
FIG. 1B
FIG. 1C

SYSTEM AND METHOD OF AUTOMATED GUNSHOT EMERGENCY RESPONSE SYSTEM

CROSS REFERENCE AND PRIORITY CLAIM

The present application claims priority to U.S. Provisional Patent Application No. 61/850,934, filed on Feb. 26, 2013 and U.S. Provisional Patent Application No. 61/900,472, filed on Nov. 6, 2013, each of which is incorporated by reference in its entirety herein.

FIELD OF THE INVENTION

The present threat sensing system 100 relates generally to gaming apparatus and methods for emergency response systems and, more particularly, to emergency response systems adapted to detect gunshots.

BACKGROUND OF THE INVENTION

School shootings, such as those at Columbine and Sandy Hook, plague the national consciousness and highlight deficiencies in preparedness and response to such tragedies. The present concepts seek to provide more effective means to protect our children and teachers. Existing technology, developed for military applications and environments, is not suited for application in schools, nor are they affordable to civilians.

In a conventional gunshot locating system, a plurality of sensors are situated in the field, usually at fairly regular intervals along an x-y grid. Each sensor includes a microphone and, presumably, an amplifier to produce an audio signal. The audio signal is then carried by a dedicated telephone line to a central location where the sound is processed. Upon detecting a gunshot from the processed audio, relative times of arrivals at the central location are processed to determine a location of the source of the gunshot.

In another known method for identifying the location of a gunshot, a special sensor having several microphones arranged in a geometric array is used and a radial direction can be determined by measuring the differences in arrival times at the various microphones. Unfortunately, such systems suffer from limited accuracy in the determination of the radial angle, which in turn, translates into significant errors in the positional accuracy of the source of the noise when triangulation of two or more sensors is performed. Since errors in the radial angle result in ever increasing position error as the distance from the sensor to the source increases, the reported position will be especially suspect toward the outer limits of the sensor's range.

Yet another type of gunshot sensor detects a gunshot and attempts to identify a particular type of weapon, or at least a class of weapon. These systems generally analyze the duration, envelope, or spectral content of a gunshot and compare the results to known samples.

U.S. Pat. No. 6,847,587, incorporated herein by reference in its entirety, discloses a system and method for detecting, identifying, and fixing the location of the source of an acoustic event, the system and method including a plurality of sensors dispersed at some-what regular intervals throughout a monitored area, a communication network adapted to deliver information from the sensors to a host processor, and a process within the host processor for determining, from the absolute times of arrival of an event at two or more sensors, a position of the source of the event. Acoustic events are detected and analyzed at each sensor so that the sensor transmits over the network an identifier for the sensor, an identifier for the type of event, and a precise absolute time of arrival of the event at the sensor.

U.S. Pat. No. 7,203,132, incorporated herein by reference in its entirety, discloses an acoustic event location and classification system comprising an array of at least two acoustic transducers arranged spaced from one another, a central data processing unit for receiving signals from the acoustic transducers and processing the signals to determine an event type and location, and an internet or LAN connection for transmitting event type and location data to a third party, wherein the central data processing unit uses a DSNN to determine the event type and generalized cross correlation functions between microphone pairs to determine the event location.

U.S. Pat. No. 7,411,865, incorporated herein by reference in its entirety, discloses a system and method for archiving and retrieving gunshot detection and location information from an array of remote sensors and preserving audio information surrounding a gunshot event for later review or analysis.

U.S. Pat. No. 7,688,679, incorporated herein by reference in its entirety, discloses a system for locating and identifying an acoustic event, such as gunfire, employing a plurality of wearable acoustic sensors, with each acoustic sensor having a display associated therewith for displaying information concerning the acoustic event to a user. The sensor includes a microphone for receiving acoustic information, an A/D converter, a processor for processing the digitized signal to detect a gunshot and determine a time of arrival, a GPS receiver for determining the position of the acoustic sensor, and a network interface for bidirectional communication with a system server.

U.S. Pat. No. 7,961,550, incorporated herein by reference in its entirety, discloses a systems and method for processing signals, particularly gunshot acoustic signals, the method including transforming initial bullet data associated with one or more sensors into a set of discrete pulses, dividing the discrete pulses into pulse subsets, generating, for the subsets, time domain representations of the pulses, wherein the time domain representations include waveforms having pulse features, and processing the time domain representations to determine alignment between one or more of pulse features, pulses, pairs of channels, and/or pairs of sensors.

U.S. Pat. No. 8,351,297, incorporated herein by reference in its entirety, discloses systems and methods for processing information associated with monitoring persons/devices and weapon fire location information. A weapon fire location system is used to characterize and locate impulsive events and these locations are correlated with the positions of monitoring persons or devices, such as monitoring anklets placed on offenders.

U.S. Pat. No. 8,325,562, incorporated herein by reference in its entirety, discloses a survey method for measuring signal propagation from an acoustic event in an urban setting with a distributed array in the midst of many buildings. A survey or tour of the covered region uses a moving signal source to probe propagation inside the region. Survey results may indicate where more sensors are needed.

U.S. Pat. No. 8,325,563, incorporated herein by reference in its entirety, discloses a system and method for locating a source of an acoustic transient, such as a gunshot, explosion, weapons launch, etc. The method is said to permit locating of the acoustic transient from a combination of propagation phenomena including a discharge time of the weapon fire incident. Moreover, the method may include obtaining a first propagation parameter of the incident from one or more first sensors, obtaining the discharge time from another sensor, and processing the data to determine a location using a common time basis among sensor measurements.

SUMMARY OF THE INVENTION

The present concepts uniquely combine hardware (e.g., to detect and report gunshot events) and software, inclusive of mobile application software (e.g., to alert and manage the response to gunshots so police can respond more effectively and engage the shooter in less time) to reduce the threat of and impact of gunshot violence in schools while simultaneously avoiding obtrusive, TSA-style security in the schools.

In at least some aspects, the present concepts include a threat sensing system comprising at least one threat sensing device, the at least one threat sensing device comprising one or more sensors, the one or more sensors comprising at least one of an acoustic sensor, a gas sensor, a pressure sensor, and an image sensor, the at least one threat sensing device further comprising a first communication device configured to output sensor data along a communication pathway and a system gateway, comprising a second communication device configured to receive sensor data from the at least one threat sensing device along communication pathway, the system gateway being configured to determine whether the sensor data corresponds to one of a predetermined plurality of known threats and, if so, to communicate at least one of the existence of the threat, the sensor data, or one or more predetermined messages to one or more pre-registered recipient devices.

In another aspect of the present concepts, a threat sensing system comprises at least one threat sensing device, the at least one threat sensing device comprising one or more sensors, the one or more sensors comprising at least one of an acoustic sensor, a gas sensor, a pressure sensor, and an image sensor, the at least one threat sensing device further comprising a first communication device configured to output sensor data along a communication pathway and a system gateway, comprising a second communication device configured to receive sensor data from the at least one threat sensing device along communication pathway, the system gateway being configured to automatically communicate at least one of the existence of the threat, the sensor data, or one or more predetermined messages to one or more pre-registered recipient devices if the sensor data is determined to correspond to one of a predetermined plurality of known threats.

In at least some other aspects, the present concepts include a method of detecting and reporting a threat comprising the acts of disposing at least one threat sensing device in at least a first location in a building, the at least one threat sensing device comprising one or more sensors, the one or more sensors comprising at least one of an acoustic sensor, a gas sensor, a pressure sensor, and an image sensor, the at least one threat sensing device further comprising a first communication device configured to output sensor data along a communication pathway and outputting the sensor data to a system gateway, the system gateway comprising a second communication device configured to receive sensor data from the at least one threat sensing device along communication pathway. The method further includes the act of determining, using the system gateway or the threat sensing device, whether the sensor data corresponds to a gunshot and automatically communicating, in the event that the act of determining confirms that the sensor data corresponds to a gunshot, at least one of the gunshot, the sensor data, or one or more messages relating to the gunshot to one or more predetermined recipient devices.

The disclosed hardware instantly detects weapons fire in schools and expedites the arrival of police by immediately sending emergency notification to 911 and all the mobile devices carried by law enforcement personnel, providing them with a diagram of the school and the shooter's location. Simultaneously, the threat sensing system disclosed herein can initiate lockdown procedures in the school, or portions thereof, and facilitate a faster response by teachers and staff to secure the school. In addition, the threat sensing system disclosed herein advantageously, but optionally provides a mobile messaging channel between school staff and the Gunshot Emergency Manager located in dispatch or the 911 center. This message channel can provide first responders with greater situational awareness when they arrive on scene.

The automatic detection of the occurrence of a gunshot in a school or other facility and immediate reporting of that occurrence to law enforcement without human intervention is unique. In accord with the present concepts, notification of all first responders can be achieved in 5 seconds versus 5 minutes, which is how long it took 911 to be called following the tragic events at Columbine and Sandy Hook.

In accord with the present concepts, the threat sensing system is configured to initiate remote control procedures and internal message functions within the school, providing additional tools and opportunities for those in the school to contain the shooter and reduce the target-profile of children and staff in the school.

In accord with the present concepts, the threat sensing system is configured to acquire situational intelligence and report such intelligence instantly to first responders en route.

In accord with the present concepts, the markedly faster response time by law enforcement directly translates to a reduced opportunity for the shooter to move unhindered in the building and a reduced opportunity to cause harm.

The present concepts can be used to by schools, state and federal governments to detect, report, and automate responses to gunshots indoors or outdoors in any building or setting.

According to one aspect of the present threat sensing system 100, a threat sensing system comprising a gunshot detection system and notification system. The gunshot detection system includes at least one sensor adapted to sense acoustic/sonic/barometric pressure (and changes therein) (e.g., acoustic pressure detected from a ultrasonic piezeo sensor or Piezo crystal coated metal), at least one InfraRed (IR) sensor to sense muzzle flash and/or body heat (e.g., changes relative to a background, differentiation of IR signals, etc.), and a Nitrogen sensor to sense nitrogen found in the nitro celluloid used in single-stage accelerants and nitroglycerin found in dual-stage accelerants). The threat sensing system further includes firmware monitoring a sensor value of each sensor to convert to digital protocols, a means to analyze a probability Boolean of the digital protocols to run on an active matrix assisted component, a means to record basic personal information (e.g., gender, height, age, location, etc.) of participants (e.g., students, teachers, administration, first responders, etc.), a means to record proximity information of floor plans and building layouts, and one or more secure physical data storage devices. The notification system comprises a controller or processors configured to recall or process any stored or emergent (e.g., data sensed on-the-fly in real time) data and convey such data to an emergency message center. The notification system also advantageously comprises a means to transmit data to one or more networks (e.g., Wide Area Networks (WAN) and/or Local Area Networks (LAN) and/or Cellular Network) or communication pathways (e.g., a network based SMS (Short Message Service)) to notify the participants of emergency and to provide information relevant to each such participant (e.g., proximity information of floor plans and building layouts, location of threat, vector of movement of threat, etc.). The notification system also advantageously comprises a means for one or more designated personnel to manually override all (or select) sensor(s) or sensor values, as may be needed, and a means to verify the notification services.

In at least some aspects, the means to sense acoustic pressure comprises an acoustic recording device, such as a membrane which vibrates a magnet in a coil. Acoustic waves travel at 1100 feet per second and hit a membrane causing a vibration. Passive phase filters such as capacitors and resistors allow the signals that are not needed to determine the peak of the amplitude caused from the loud blast of a gunshot. While this does not preclude false positives, it does however give one element to be sensed and stored in memory before converting to a Boolean probability value. Threshold and sensitivity values can be controlled by the firmware in the Digital Signal Processor (DSP) which analyzes the wave form of the gunshot(s).

In at least some aspects, the means to sense sonic pressure comprises a Piezo crystal coated metal that produces an electrical signal responsive to the sonic wave from the gun blast. The differential equation comparing the information of the acoustic recording device and the Piezo Element are converted into information that can be utilized in combination of each other to positively identify one of the basic sound elements of a gunshot.

In at least some aspects, the means to sense barometric pressure changes comprises a BM085 circuit, which analyzes air pressure changes (e.g., such as caused by a gunshot). Because sound and sonic pressure are faster to be sensed the BM085 circuit waits until the first two are sensed and then records a spike in the Barometric Pressure Sensor (BMP) of the area where the gunshot occurred. This reading is stored as another Boolean Probability to be analyzed by the probability engine for confidence scoring. In other aspects, the circuit does not wait and to record and instead records in real-time.

In at least some aspects, the means to Infrared (IR) signals extending from a muzzle in association with the gunshot, comprises a separate sensing circuit which analyzes the IR changes in the room to run concurrent with the acoustic and sonic sensors. This information records the various IR signatures of the gunshot to determine gun type. This information adheres to memory to be stored and used later as another probability score in the deterministic engine.

In at least some aspects, the means to sense nitrogen (e.g., from nitro celluloid and nitroglycerin from both single and dual stage accelerants) comprises a metal or metallization layer (e.g., in a metal-oxide-semiconductor (MOS)) configured to collect a thin film when nitrogen is introduced into the room atmosphere. In some aspects of the present concepts, a fan is actuated after the acoustic sensor reads a high decibel noise value and begins the process of sequentially reading the sensor(s) for predetermined values to be compared to the event. When the nitrogen collects on the MOS, it reduces the resistance, which is read in the analog, and related as Val1 vs time−Val2 vs time=TVa1, which is stored in memory and becomes an additional Boolean probability to heighten the confidence score of the gunshot event.

In at least some aspects, to help identify the process of Boolean selection, Sigma Squared modeling is utilized where sigma squared is equal to the integration of the common occurrence of the frequency of the sensor value of the event multiplied by the actual event sensing values Val1−Val2=TVa1 divided by the number of the event notifications (n) multiplied by (n−1) for nonbiased analysis. The Rule values are placed in a "Boolean Pattern Matching" engine and an Action Delimiter determines the outcome which can be 1 of 3 possible events. (1) do nothing, (2) store memory for recall, and (3) call event into action and recall memory in (2).

In at least some aspects, the means to monitor the sensor (s) of the threat sensing system comprises firmware monitoring sensor values of each analog sensor and converting sensor value to digital protocols for transmission to a communication gateway for further transmission and/or analysis, such as local analysis and scoring (e.g., determination of characteristics of gunshot event).

In at least some aspects, the means to means to analyze a probability Boolean of the digital protocols to run on an active matrix assisted component consists of a probability standard deviation sampling of probable Booleans which came from each sensor. A rule based pattern matching engine analyzes the gunshot event process to look at the nominal values to determine a high confidence score. All of which are advantageously, but not necessarily, capable of being over-written by a human intervening in the deterministic process.

In at least some aspects, a means to store recorded information optionally stores information provided by participants (or parents or guardians thereof, as appropriate) in advance of any adverse event and can be linked to employee IDs, student IDs, RFIDs, class schedules, attendance records, etcetera. Recorded information may also advantageously include building location, proximity information of floor plans, aerial maps, building layouts and other structural data (e.g., uploaded to and resident in the physical digital storage medium) instructions on what to do in case of emergency, and contact and coordination information. The recorded information also includes information sufficient to analyze any gunshot(s) to determine the gun caliber(s) of such gunshot(s) and information related to any adverse event, such as the number of shots fired, type(s) of weapon(s), and location(s) of gunshot(s). Input information (e.g., personal information, police, fire, ambulance, rescue, parents, teachers, School Resource Officer, Security Guard, Principal or local administrators) is entered into and stored in a physical digital storage medium in a conventional format (e.g., in a database, CSV file, XML file, etc.).

In at least some aspects, a processing means to recall and transmit the stored data to an emergency message center comprises instructions automating the call process. In at least some aspects, the processing means to recall and transmit the stored data comprises instructions to transmit pertinent information of a probable gunshot event.

In at least some aspects, a means to call a network based SMS (Short Message Service) on Wide Area Networks (WAN) and/or Local Area Networks (LAN) and/or Cellular Networks to notify the participants of the emergency and proximity information of floor plans and building layouts comprises SMS gateway hardware or software call from email to SMS services to be transmitted to a list of recorded information of personnel and personal information, police, fire/rescue, ambulance, teachers, parents, RSO, principal and local Administrators.

In at least some aspects, a means is provided to manually override all sensor values (e.g., an input by one or more designated personnel via a computer, wireless device, key fob, panic button, lanyard, entry of a code into a keypad, entry of a code into a mobile device threat sensing system application, etc.). In at least some aspects, this is accomplished by a "Key Fob" borne by a teacher, local administrator or principal. This device can override the system (e.g., a "panic button") and begin the immediate transaction of notification of proper authorities in the event the system does not immediately respond to an adverse event in progress, while providing a means to properly adhere to established protocols.

In at least some aspects, a means to verify the notification services comprises a call back number or link which identifies who received and responded to the probable gunshot event.

In at least some aspects, sensing units are identified by MAC protocols or System ID protocols to a specific network. In yet other aspects, GPS is further utilized to identify the event sensing location as well. In still other aspects, sensing units further integrate an FM modulator to enable the sensing unit to be used as a local radio to broadcast emergency instructions as well in a Spread Spectrum Emergency Band.

Additional aspects of the threat sensing system 100 will be apparent to those of ordinary skill in the art in view of the detailed description of various embodiments, which is made with reference to the drawings, a brief description of which is provided below

BRIEF DESCRIPTION OF THE DRAWINGS

FIGS. 1A-1D show examples of threat sensing devices according to at least some aspects of the threat sensing system of the present concepts.

Figure 1D:
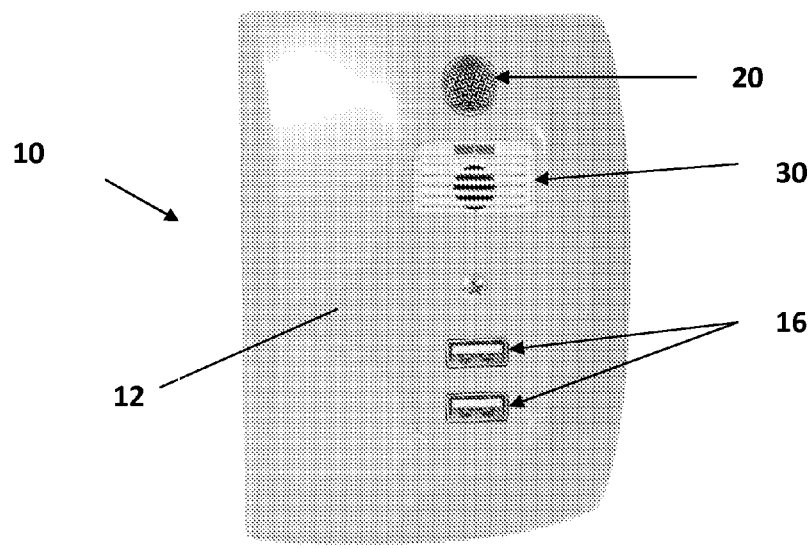

While the threat sensing system 100 is susceptible to various modifications and alternative forms, specific embodiments have been shown by way of example in the drawings and will be described in detail herein. It should be understood, however, that the threat sensing system 100 is not intended to be limited to the particular forms disclosed. Rather, the threat sensing system 100 is to cover all modifications, equivalents, and alternatives falling within the spirit and scope of the threat sensing system 100 as defined by the appended claims.

DETAILED DESCRIPTION

While this threat sensing system 100 is susceptible of embodiment in many different forms, there is shown in the drawings and will herein be described in detail preferred embodiments of the threat sensing system 100 with the understanding that the present disclosure is to be considered as an exemplification of the principles of the threat sensing system 100 and is not intended to limit the broad aspect of the threat sensing system 100 to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

In general, there is provided herein a threat sensing system 100 and method to automatically detect, verify and report adverse events (e.g., weapon discharge(s), etc.) in schools, offices, commercial, residential and indoor structures, to thereby enable a faster response by law enforcement and first responders. In at least some aspects, further than simply detecting, verifying and reporting weapon discharge(s), the threat sensing system 100 and method may optionally automatically deploy countermeasures to protect children, and adults. In at least some other aspects, the threat sensing system 100 and method provide a two-way messaging channel between all parties involved with an event.

The system(s) 100 and method(s) disclosed herein provide a means to protect children and adults in school, and everyone where they live and work, while respecting both freedom and privacy. These system(s) 100 and method(s) automate an emergency response to threats, both locally (e.g., in a school) and remotely (e.g., outside of the school), concurrent with notification of first responders, while the first responders are still en route, and while the first responders are on-site. In accord with these concepts, products comprising one or more gunshot detection sensors and, optionally, countermeasure technology (e.g., to help contain or minimize the threat before first responders arrive), are integrated into the existing infrastructure in a schools or building. The countermeasure technology may be passive (e.g., locking doors, altering lighting, activating sirens, activating lighting, etc.) or active (e.g., engaging the shooter or prospective shooter) and can be activated following a shooting, before first responders would have time to arrive, or even before a shooting (i.e., a potential threat is ascertained).

The system(s) 100 and method(s) disclosed herein enable first responders, such as law enforcement and emergency medical personnel, to reach the location of an adverse event (e.g., a shooting, a threat to children and/or workers, etc.) faster than currently possible and, further, to provide first responders with near real-time information (e.g., via mobile devices, laptops, streaming information to Google Glasses or the like, streaming information to dispatchers, who can relay information to the first responders, etc.) about the adverse event and/or shooter(s)' location(s) inside of a building, along with the type of weapon(s) fired and information about each time the weapon(s) were fired. Concurrent with the providing of information to first responders, the system(s) 100 and method(s) disclosed herein are adapted to automate an immediate response within the school or other building (e.g., by broadcasting an alert to all rooms and offices in the building and the campus, isolating and encumbering the shooter(s) with countermeasures in areas where gunshots or threats are detected and/or anticipated to occur, etc.). Broadcast alerts may comprise, but are not limited to, email alerts transmitted (e.g., SMTP) in accord with a pre-defined database, an RSS Alert (relaying information through a RSS feeds, such as signage, twitter, Facebook, etc.), SMPP (Short message peer-to-peer), SMS (Short message service—text messaging), Voice Alert (a recorded voice message transmitted to a pre-defined database of cellular & landline phones), PA system announcements, visual alerts to digital signage, or utilization of any other visual and/or auditory broadcast medium.

Figure 4:
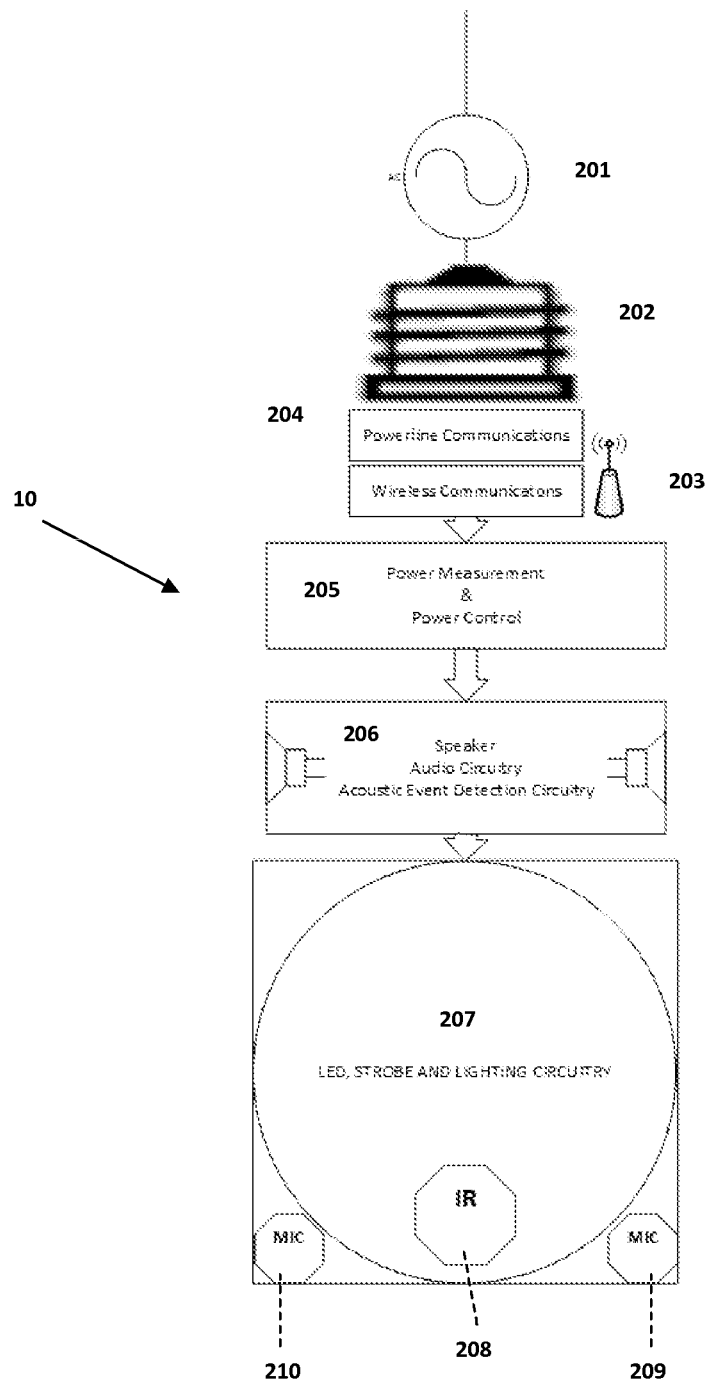
FIG. 4 shows a representation of a component of the school-based threat sensing system, comprising a light-based sensor and output device, according to at least some aspects of the present concepts.

FIGS. 1A-1D show different embodiments of a threat sensing device 10 and, more particularly, gunshot detection sensors, in accord with at least some aspects of the present concepts. These gunshot sensors 10 detect and digitize gunshot sounds into waveform data, then transmit this data though the existing power lines in the building to the Systems Gateway (see 110 in FIG. 2A). To facilitate rapid deployment in any building or environment, the threat sensing devices 10 are "plug-and-play" devices that can plug directly into existing, conventional electrical outlets (e.g., a standard US 120V electrical outlet) in the same manner as any conventional electrical device. Alternatively, one or more threat sensing devices 10 can be wired directly into the existing electrical system (e.g., in-wall units, ceiling units, etc.). In yet other aspects of the threat sensing system 100, the threat sensing device 10 is integrated into overhead lighting (e.g., screwed into any standard lamp socket or other lighting type fixture) such as is shown in FIG. 4, or likewise into emergency lighting, or other powered devices (e.g., signage, bells, etc.) mounted throughout the building, so as to advantageously use the pre-existing power supplies and mountings.

In general, the threat sensing devices 10 utilizes not only sound to localize a threat (e.g., a gunshot location), but also utilizes in combination therewith one or more other sensors (e.g., optical sensors, pressure sensors, gas sensors, etc.) and output devices (e.g., lights, speakers, countermeasures, etc.) to provide enhanced detection and defense capabilities.

As shown in FIGS. 1A-1C, the threat sensing devices 10 comprise one (e.g., FIGS. 1B-1C) or more (e.g., FIG. 1A) optional electrical sockets/prongs to permit the threat sensing device to also function as a standard electrical outlet while simultaneously providing gunshot detection technology and/or other threat sensing functions.

Figure 2A:
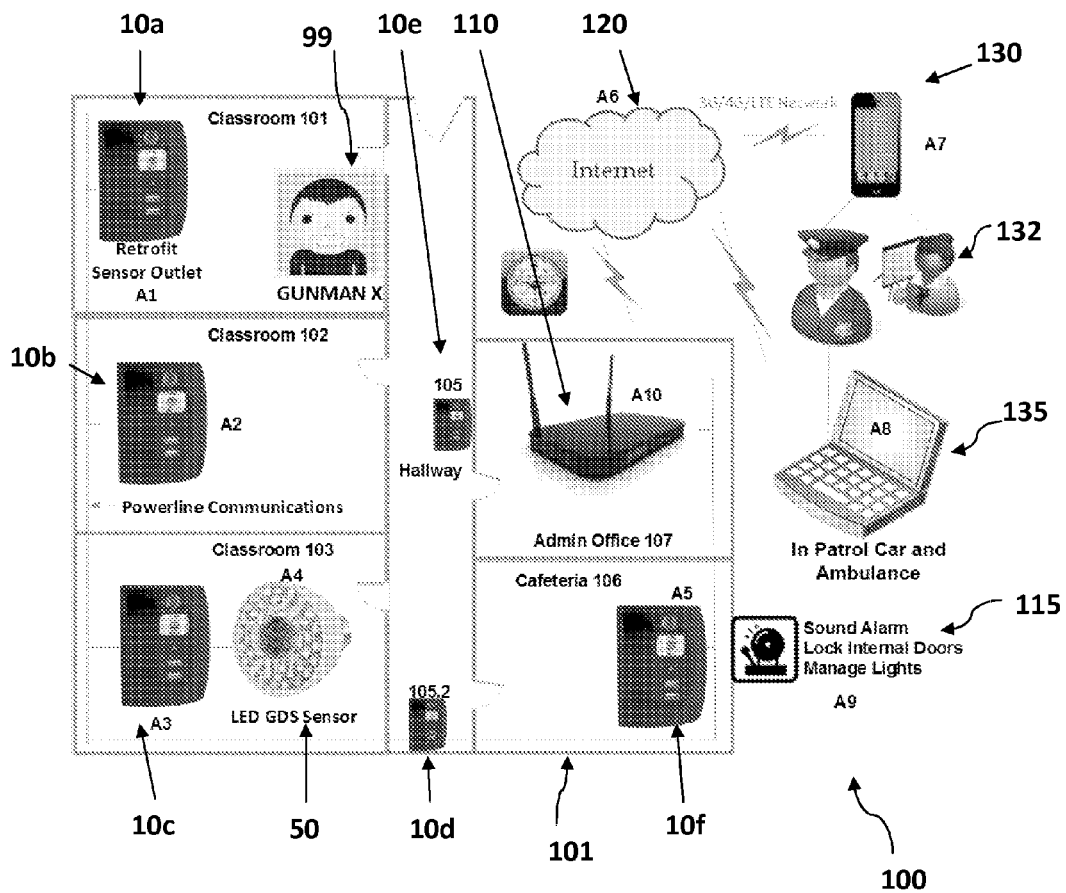
FIG. 2A shows a representation of a school-based threat sensing system, comprising a plurality of threat sensing devices, according to at least some aspects of the present concepts.

In at least some aspects, the threat sensing device 10 comprises one or more conventional communication port(s) 16 such as, but not limited to, a Universal Serial Bus "USB" port, micro-USB port, firewire port, or other communication port, to accommodate expansion devices such as camera(s), light(s), external microphone(s), external speaker(s), motion sensor(s) and location sensor(s). The threat sensing device 10 advantageously contains a communication module (e.g., a wireless or hardwired communication device) to connect with third-party automation devices, other sensors (e.g., attached via port(s) 16), and external devices (e.g., a system gateway 110 such as shown in FIG. 2A, etc.), such as by a powerline carrier network 15, broadband network, or 2G/3G/4G/LTE wireless network.

Mounting of the acoustic sensor(s) (e.g., a gunshot sensor) 20 or other sensor(s) (e.g., gas sensor(s) 30, such as a nitrogen sensor, image sensor(s) 40, etc.) can optionally be provided outside of the threat sensing device 10 housing 12, using one or more of the communication port(s) 16 and associated cable or connector. Such external mounting of the sensors enhance the flexibility in positioning the sensor(s) to avoid obstruction(s) and provide improved accuracy and system responsiveness. Optionally, the acoustic sensor(s) 20 and/or gas sensor(s) 30 and/or image sensor(s) 40 are connected to the housing 12, through an input/output port (e.g., port 16), or hardwired directly into the threat sensing device 10, utilizing cords or cables, optionally integrated with bendable and/or rotatable arms, to enable accurate and secure positioning of the sensor(s) in any desired location (e.g., in a middle of a wall, high on a wall, on a ceiling, etc.). Calibration methods can be used to determine acoustic/visual quality of a selected sensor placement. Notifications can be sent to installer/user if sensor is blocked or not optimal.

The threat sensing system 100 gas sensor 30 can detect gunpowder gases or residue using, for example, a MEMS sensor, molecular sensor (e.g., to detect gun powder and molecules produced from explosives), or other smell/order based sensors. One example of a suitable sensor technology includes metal-oxide-semiconductor gas sensors manufactured by SGX Sensortech of Essex, England. Vapors (off-gassing or outgassing) from solvents and oils used on firearms can also be detected with the gas sensor 30. The threat sensing device 10 gas sensor 30, and attendant ability to detect gun powder, gun oils, gun lubricants and other molecules in the air, enhances the ability of the threat sensing device to validate the waveform registered by the acoustic sensor 20 against the gaseous/particulate results registered by the gas sensor, and properly declare an adverse event. Further to merely detecting gunshots, the acoustic sensor(s) 20 are further able to detect the acoustic signatures characteristic of movement of weapon parts such as movement of the charging handle, bolt carrier, cocking of the hammer, magazine release, and reloading of the weapon (e.g., seating of a new magazine).

In fact, the gas sensor 30 enables the threat sensing devices 10 to not only improve a confidence of sensed acoustic event as a gunshot in combination with the acoustic sensor 20, but also is able to provide, on a stand-alone basis, advanced detection of a potential threat. Since the gas sensor 30 (also referred to herein as a "smell sensor") is able to detect vapor particles, gun powder, gun oils, gun lubricants, solvents used to clear firearms, and other molecules in the range of parts per billion, it is also able to aid in the detecting of firearms or explosives even before they are discharged. Correspondingly, threat sensing devices 10 comprising a gas sensor 30 (optionally omitting the acoustic sensor 20, could be deployed and concentrated in areas near points of ingress and egress to provide early detection of unauthorized weapons or materials. As discussed further below, a fan is optionally integrated with the threat sensing device 10 to pull (or push depending on placement) vapor plumes toward the sensor for faster identification and processing.

Most modern firearms are designed for use with oil. Certain older firearms (such as the Ml Garand) are designed for mil-spec grease, not oil. There are many basic constituent elements of the lubricants and cleaning agents conventionally used with firearms. Many lubricants and cleaning agents share the same base chemistry. The gas sensor 30 is advantageously configured to sense one or more of the following: graphite, molybdenum disulfide ("moly grease"), halogenated hydrocarbons (HH), chlorinated paraffin, epoxidized oils, siloxanes, teflon, Polytetrafluoroethylene, synthetic esters, synthetic oils, polyalphaolefin, smokeless propellant components, nitrocellulose, nitroglycerin, nitroguanidine, D1NA (bis-nitroxyethylnitramine), Fivonite (tetramethylolcyclopentanone), DGN (di-ethylene glycol dinitrate), acetyl cellulose, deterrents (or moderants) use to slow a burn rate, centralites (symmetrical diphenyl urea-primarily diethyl or dimethyl), dibutyl phthalate, dinitrotoluene, akardite (asymmetrical diphenyl urea), ortho-tolyl urethane, polyester adipate, camphor, stabilizers used to prevent or slow down self-decomposition, diphenylamine, petroleum jelly, calcium carbonate, magnesium oxide, sodium bicarbonate, beta-naphthol methyl ether, decoppering additives (used to hinder the buildup of copper residues from the gun barrel rifling), tin metal and compounds (e.g., tin dioxide), bismuth and compounds (e.g., bismuth trioxide, bismuth subcarbonate, bismuth nitrate, bismuth antimonide), lead and lead compounds, flash reducers (which reduce the brightness of the muzzle flash but produce more smoke), potassium chloride, potassium nitrate, potassium sulfate, wear reduction additives (used to lower the wear of the gun barrel liners), wax, talc, titanium dioxide, polyurethane, ethyl acetate (a solvent for manufacture of spherical powder), or rosin (a surfactant).

The gas sensor 30 may comprise luminescence-based sensors configured to detect explosive decomposition products by fluorescence or chemiluminescence. Polycurcumin acrylate (PCUA) and Polycurcumin methacrylate (PCUMA) can be used as a very simple chemical sensor for nitroaromatic compounds (i.e., to detect explosives) and could be used in the threat sensing device 10 to detect, for example, gun powder and gun oils.

In one aspect, the gas sensor 30 may comprise a molecular sensor configured to detect single molecules, such as by utilizing a colorimetric sensor array for detection of triacetone triperoxide (TATP) vapor. Although TATP is extremely difficult to detect directly, a simple and highly sensitive colorimetric sensor is able to detect TATP vapor with semiquantitative analysis from 50 ppb to 10 ppm. By using a solid acid catalyst to pretreat a gas stream, a colorimetric sensor array of redox sensitive dyes can detect even very low levels of TATP vapor from its acid decomposition products (e.g., $H_2O_2$) with limits of detection (LOD) below 2 ppb (i.e., <0.02% of its saturation vapor pressure). Common potential interferences (e.g., humidity, personal hygiene products, perfume, laundry supplies, volatile organic compounds, etc.) do not generate an array response, and the array can also differentiate TATP from other chemical oxidants (e.g., hydrogen peroxide, bleach, tert-butylhydroperoxide, peracetic acid). Most commonly use gun cleaning solvents contain petroleum based solvents and many commercial solvents contain acetone, ethyl alcohol, or kerosene. Following cleaning, lubricants are applied. These solvents and lubricants are detectable, both by smell and by gas sensors 40 configured to detect offgassing/outgassing from such applied products.

In at least some aspects, the threat sensing device 10 comprises a near field communication (NFC) device and/or a far-field communication device (e.g., standard RF, Wi-Fi, etc.), to communicate directly with nearby portable devices (e.g., radio-frequency identification "RFID" integrated into an ID Badge, etc.) or mobile devices, as discussed in more detail below.

Optionally, the threat sensing device 10 comprises other sensors such as, but not limited to, a temperature sensor, moisture sensor, carbon monoxide, radon, smoke, or water sensor (not shown). These sensors can be used, for example, as inputs to the acoustic or gunshot sensor to provide enhanced accuracy of calculations relating to perceived events, or simply to detect abnormalities such as a localized heat source (e.g., fire) or flooding.

In at least some aspects, the threat sensing device 10 is configured to, through the provided standard power dissemination outlet (e.g., socket(s) 14 as shown in FIGS. 1A-1C) adapted for a country of interest (e.g., a North American 120V, 60 Hz NEMA 5-15 socket or a European 220-240V, 50 Hz Europlug socket, Australian AS/NZS 3112 socket, etc.), turn off or on any device plugged into the socket(s) when the threat sensing device receives a remote command, receives instructions from an external controller, or executes instructions borne by an internal memory device and/or firmware (e.g., a threshold sound profile measured by the acoustic sensor could turn on or off a device attached to the threat sensing device through the socket and/or other port(s)). Using this feature, potentially distracting electronic devices can be turned off when gunshots detected.

Figure 1E:
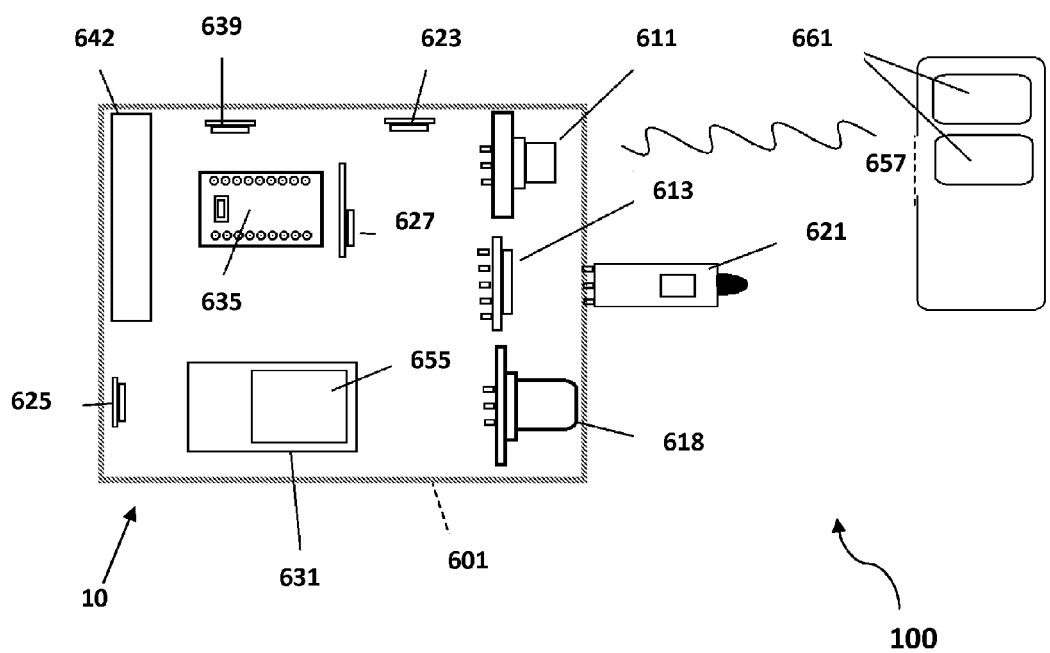
FIGS. 1E-1F show aspects of a threat sensing device according to at least some aspects of the threat sensing system of the present concepts.

FIG. 1E shows an example of a threat sensing device 10 sensor board 601 according to at least some aspects of the threat sensing system of the present concepts. The sensor board 601 utilizes a plurality of sensors namely an acoustic Sensor 611, Barometric Pressure Sensor 613, Nitrogen Sensor 618, Sonic Sensor Not Shown and Infrared Sensor 621 whose signals are monitored by two processors 635, 655. The first processor 635, such as an ATmega328, runs the Acoustic Pressure sensor (e.g., a High Sensitivity Sound Microphone Sensor Detection Module For Arduino AVR PIC), whose decibel noise layer is hyper 150 dB per meter squared. The sound travels at 1100 feet per second to the Acoustic Sensor where a measure from a processor listens to the signal and converts the decibel noise in analog to a digital value, which is processed by the MPU 635. Once verified to be above or equal to threshold value, it then listens to (e.g., for increases) Barometric Pressure BMP085 613, which is processed by the same processor 635. After the BMP085 validation, the Nitrogen Sensor 618 (e.g., a Sain Smart MQ135 DC 5V 10-1000 ppm Ammonia Gas Sensor Module Detector) decreases the resistance proportional to the PPM of nitrogen. Simultaneously a second processor 655 (e.g., a Tinyduino processor) is sensing a change in IR (e.g., a photosensitive diode light sensor module for IR light detecting from the muzzle flash of a discharged gun) and, after validation, a Sonic Sensor (e.g., a HC-SR04 Ranging Detector) records its threshold values which are stored in memory and set for data transport between the two processors by three (3) variable means of network protocols.

In operation, in at least some aspects, constants such as Pin Connections are declared as "Output" for signal out and the analog pin input is declared and a threshold value set and stored in memory. The variables to read, such as integers representing stored values read from the sensor pin, are set and the state value of the output state is set to low or high depending on the desired setup mode. The integer stored for the BMP Sensor is then defined and the integer or the sensor value of the gas sensor, which is last in the arguments, is stored. The startup program with declarations of pinMode values and communication protocols are initiated (e.g., starting "Serial Communication Mode" such as Baud Rate, Stop bits and Parity) and a looping process started to listen for a decibel noise to begin the arguments in the "Void Loop" arguments. The sensor readings are stored in a variable "sensorReading" after the sensor has detected a discharge acoustic sound whose decibel noise rating is above 150 decibels. This is done, in some aspects, by using both hardware capacitors to filter lower noise ratings and increasing the threshold in the constants in the arguments and firmware coding of the threshold values to be accepted as nominal.

Figure 1F:
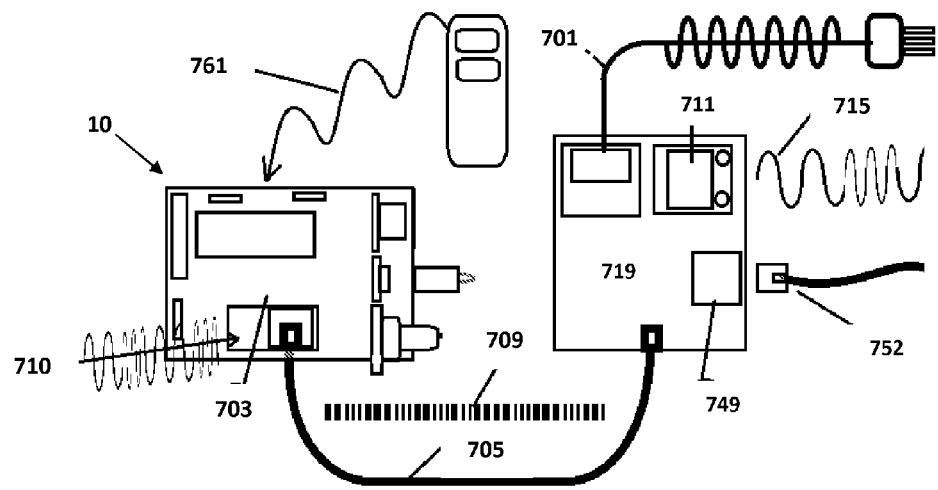

Once the analog read value is set in the GunShotSensor an "If" statement looks to the sensor read to be greater than or equal to the threshold and if it's true, it toggles the output status of a visual indicator and serial response of the threshold value to be stored in memory of an active Boolean Engine which is carried by, for example, (1) NIC cable or network cabling to be hardwired 752, (2) WIFI 802.11.X Protocol 715 via WIFI card 711, or (3) Balun Coil with passive phase filter and OFDM signal over Power Line Carrier Technology 701, as shown in FIG. 1F.

Figure 1G:
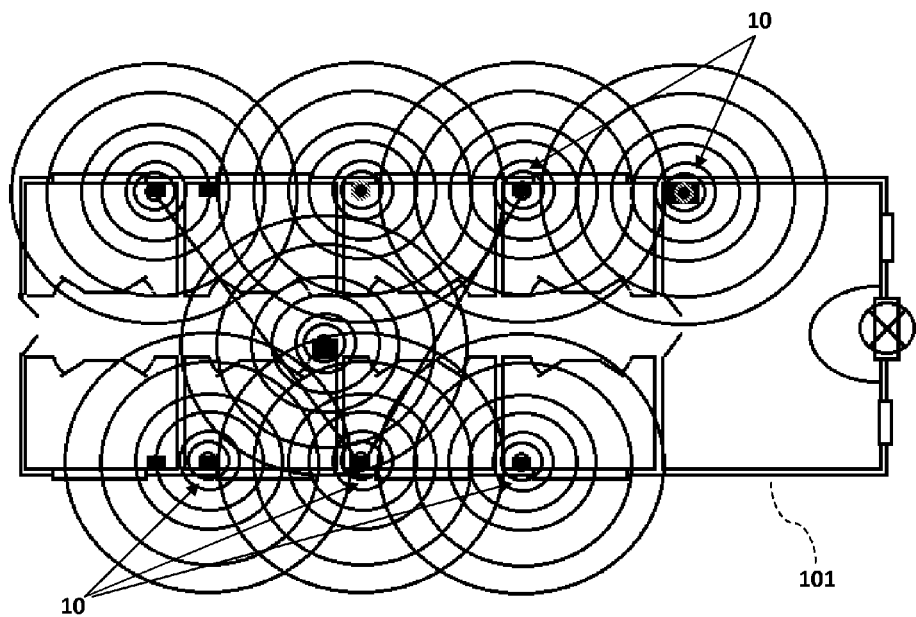
FIG. 1G shows an example of an implementation of a plurality of threat sensing devices in a school according to at least some aspects of the threat sensing system of the present concepts.

In some aspects, the threat sensing devices 10 are connected by a "Mesh Network" as shown in FIG. 1G and all of the threat sensing devices communicate with one another (e.g., each threat sensing device communicates with one or more other threat sensing device(s), or all other threat sensing devices) to relay the data from each active sensing unit. XBee Modules may be used to form invisible network protocols in 802.11.X protocols. In at least some aspects of the present concepts, each threat sensing device 10 sensor has a specific ID that identifies, among other data, where the sensor is located in each room and the building's IP location is used to determine where in the Wide Area Network (WAN) the threat sensing device resides. When the data is received, it is processed in a Boolean Engine having a series of probability rules that define the directive of the RG or "Residential Gateway" (system gateway). The RG receives information from the Mesh Network and looks at the signal from each sensor relayed from one another until it gets to the RG for processing. The Boolean engine contains a Rule Based Pattern Matching Engine that uses a "Rule Header", a "Description" and a "Subject", "Object", "Boolean Lines" and an "Action" (or DSOBA).

As shown in FIG. 1G, the Sensor Board 710 combines with the RG 719 to receive the signals 710 from the "Mesh Network" which uses the GPIO connection 705 from Python to import the TX signal 709. Each of the sensor boards 710 are RTX or "Transceivers" which can both send and receive data to one another. If by chance an observer who is wearing a programmable Transmitter 761 can override the sensor value to immediately send the distress signal to the RG for calling the SMS gateway for text messaging. The sensor board 703 and CPU 719 both make up the Residential Gateway. The sensor board is programmed in Keil Tool C or Sketch C#, which transmits through serial data 709 to the CPU 719, which uses a Raspberry Pi that runs Linux OS. In the Linux OS, a Python program listens to data in and also sends data commands back out. These data commands are used to allow remote access to each of the sensor boards in the network. In aspects of the present concepts, the Boolean Engine uses 6 elements to solve probability variables: a Bank Class which stores values of categories, a Chat Class that stores the arguments to handle Rule Based variables, an Engine Class that handles the operators being fed to the input statements in many cases are ASCII format, a Blueprint Class that defines the operations of actions stemming from input variables and the computations, a Policy Class to handle the DSOBA libraries and a Main Class that puts them all together to calculate probable events based on Rule compositions. A rule looks like the following:

<ruleHeader-1> Rule+hierarchy d: description line which describes what the rule does. More like a comment line s: Subject line to define any subject such as Acoustic, Gas, BMP, IR, Sonic ect o: Object association b:  40*<ACOUSTICLOW>*<LOWPRESSURE>* <LOWGAS>* a: *<YIML call setMemory(ACOUSTICLOW,% value %)> Loud sound with no other sensed values to collaborate the event so store as memory.

Bank Class

<ACOUSTICLOW>

:135

:136

:137

:138

:139

:140

<LOWPRESSURE>

:103

:104

:105

Ect

<LOWGAS>

:33

:34

:35

:36

Etcetera.

Each of the numbers is values sent from a sensor that sensed a semi loud sound that triggered sense response for false alarm. The decibel Noise threshold was the minimum measured in decibels, the bank class harboring the values of Acoustic Low values, barometric pressure measured in Kilo Pascals or KPa and particles of Nitrogen measured in Parts per Million. There can be thousands of rules each one with a different set of possibilities and different set of actions. The call string which calls a webpage in the "Action" delimiter looks like this:

*<web http://onalertguardian/Notifications/Users/AccountName/SendAll.html MAIN>

This action tag calls the browser to activate a webpage. In the webpage is an HTML code that tells the page to auto load (an "Init" function).

<script language="JavaScript" type="text/javascript">
 var t=setTimeout("document.myform.submit( )",100);
 // measured in miliseconds
 </script>

This tells the "Form" which is identified by "myform" as the name="myform". The field values are preset to look at a CVS file delimited and parsed for accounts. This can just as easily be set up with a database. The script is written in PHP that sends the email or email-to-text message to the user.

The user information is collected for use when an emergency occurs. This information is triggered by the PHP call to Web to Text protocol and sends messages to cellular phones to those registered in the system. The Image URL is the building floor plan layout. The instructions for emergency are sent, along with name, address and any phone numbers that need to be relayed. Each of the fields are signified by a %% value %% so the FORM set in the PHP calls would look like this:

</TABLE>
 <font color=#333333 face=verdana size=2><b>Message</b>:</font><br>
 <TEXTAREA rows=15 name=body cols=80 wrap=soft>
 Attn: %%lastname%%,
 Go to %%imageurl%% to see the image.
 A detection of a %%gun_type%% is at
   %%SchoolName%%
 %%instructions%%
 </TEXTAREA>
 </table>

The Hex conversion of the % is #37 so as to signify the HTML conversion of %% name %% would be %%name%%. The message would relay the fields "ImageURL", "SchoolName", "Gun Type" and "Instructions" which can contain contact numbers as well. In the occupation Field there can be a pull down menu to select the Personnel Type being contacted such as "Fire, Police, School Resource Officer, Sheriff, Ambulance, Rescue, Teachers, Administration or parents" as Selections. The CSV store file is delimited with | between each stored value to equate to a database structure containing all necessary information. The | delimiter is parsed by the CGI file which tells the HTML pages how to call the values needed. For instance the Username is Anthony is the first value so this is the "Login Name" for the Account. This is followed by MAC and temporary Password which is txt messaged to the registrant. Then there is the date of registry and Name of Contact, phone@carrier and address information. To call a user from the HTML page the variable such as Login would be "%%Login%%" or %% Login %% in PHP.

Thus, in accord with the examples shown in FIGS. 1A-1G, the threat sensing system sensors detect, in sequence, (1) sound dB above a threshold value corresponding to a gunshot or explosion, (2) rising barometric pressure measured in KPa, (3) Nitrogen measured in Parts per Million, causing resistance to fall. The IR in light frequency and sonic pressure in KHz give all of the characteristics or signatures needed to give a high confidence score in the Boolean Engine residing in the system gateway. In at least some aspects of the present concepts, each threat sensing device 10 comprises a Global Position System (GPS) unit and is identified by a MAC address unique to each device. This is mapped in multiple images to show some signification of the recorded event. The Boolean Engine processes the probability and deploys an Action String which can be one of 3 probabilities (1) Do Nothing, (2) Record data for memory, or (3) Act on event and recall recorded data in memory for Txt Deployment. The Action tag calls a web browser if the event notification which has a webpage that auto loads and auto runs the functions on the webpage. The Webpage is connected to a PHP CGI program that instructs a list of fields that were filled out previously by participants who wish to be notified. The call string includes any and all participants both singularly and individually. The Text Content is comprised of variables found in the HTML page which are relayed as well. This can be images of the floor plan of the building where the gunshot even took place, phone numbers of other participants who are important to the immediate response and information on where to go and what to do in the case of a recorded gunshot event. The system gateway that relays the trigger for the event can be any Operating System and can even run in a MPU as well without a CPU. Many variations of the system gateway can be utilized. Raspberry Pi and its GPIO in Python are presently preferred for ease of use and rapid design, but such selections are not to be construed as limiting in any way.

Figure 1H:
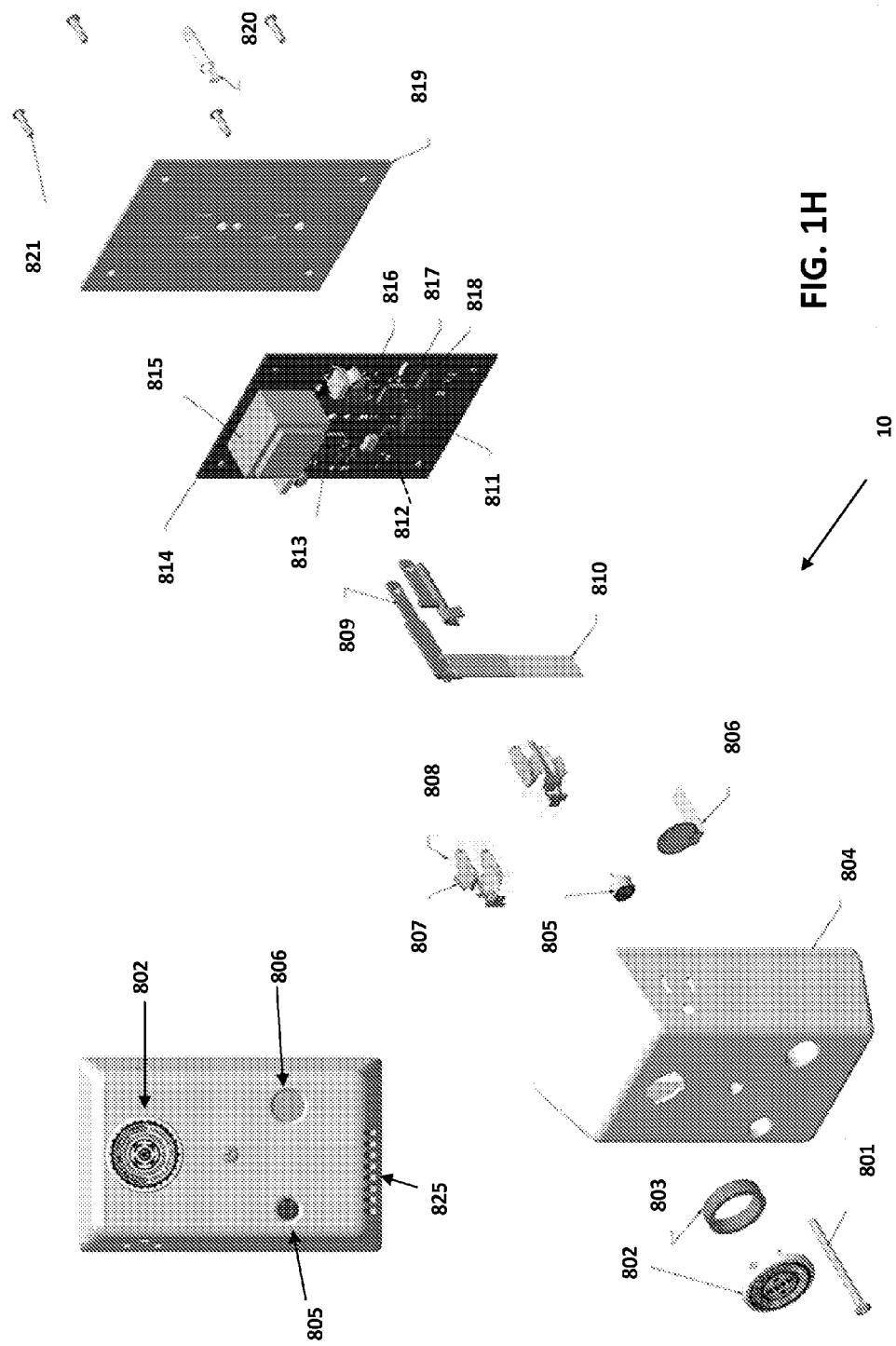
FIG. 1H shows a disassembled isometric view of an example of a threat sensing device according to at least some aspects of the threat sensing system of the present concepts.

FIG. 1H shows an isometric, disassembled view of a threat sensing device 10 in accord with at least some aspects of the present concepts. A wall mounting screw 801 passes through an opening in the housing 804 to secure the threat sensing device 10 to a wall outlet (not shown). An air inlet cover 802 provides protection for air filter element 803. Housing 804 also includes corresponding openings for the sonic sensor 805 and pressure sensing element 806. Vents 825 are provided in the housing to permit air circulation. Outlet contacts 807 and contact support and optical plug sensing body 808 are also indicated in FIG. 1H. Incoming power contacts 9 are shown to connect to a piezoelectric fan 810 used to promote air circulation across the off gas sensor 812. On the main circuit board 814 are disposed a powerline communications analog interface 813, the off gas sensor 812, a tamper detection opto switch 811, a FRAM memory 818, a digital signal processor 817, power line communications device 816, and transformer 815. FIG. 1H also shows backing insulation board 819 and tamper detection plug 820 and four enclosure fasteners 821.

Although the threat sensing devices 10 are shown installed indoors, the threat sensing devices may be adapted (e.g., via a weatherproof housing) to work in an outdoor environment or about a perimeter of a structure.

FIG. 2A represents one example of both a threat sensing system 100 installation, as well as an example of an adverse event, represented by Gunman X 99. The threat sensing system comprises a plurality of threat sensing devices 10a, 10b, 10c, . . . 10n, where n represents any integer, distributed through classrooms, hallways, rooms, gymnasium, cafeteria, and offices throughout the school 101. Although the threat sensing system 100 is depicted in FIG. 2A as having a threat sensing device 10 in each room, it is not necessary to have compete coverage and benefits of the system may still be had with lesser degrees of coverage. The threat sensing devices 10a, 10b, 10c, . . . 10n communicate sensed information, or processed sensed information, to the system gateway 110 (e.g., wirelessly, through powerline communication, etc.). The system gateway 110 in turn, communicates threat-based information wirelessly and/or through hardwired communication lines to external systems such as, but not limited to, the Internet 120, mobile devices 130, dispatchers 132, first responder portable devices 135, and/or local devices 115 (e.g., alarms, door locks, lights, etc.).

When an adverse event occurs, here a gunshot, the threat sensing system 100 immediately opens a communication channel, via the system gateway 110, between law enforcement summoned to respond to the incident and the staff/administrators at the school/building. In at least some aspects of the present concepts, designated first-responders, government personnel, and school officials are included in these communications, as appropriate to the adverse event. The disclosed threat sensing system 100 makes possible immediate and real-time transmission of information from the threat sensing system to first responders, triggering of threat containment actions, and communications between the first-responders and affected or potentially affected teachers/employees/victims (e.g., transmission of instructions, messaging between law enforcement, teachers and faculty via personal communication devices or intercoms, etc.).

As one example of containment actions responsive to an adverse event (e.g., a detection of a gunshot in a facility or a room), following the detection of the threat (e.g., a shooter 99), the threat sensing system 100, integrated with automatic door locks 115 (e.g., magnetic locks in classrooms 101, 102, 103, cafeteria 106 and administrative offices 107) and optionally door actuators (e.g., to automatically close doors that may be open), activates all designated door locks (and optional actuators if provided) to cause all designated doors to lock (or close and lock). If the threat (e.g., a shooter) is not in a room, the students, teachers and employees in that room can be locked safely into the room, such as classrooms 102, 103 in FIG. 2A; however, if the threat is in a room, such as classroom 101 in FIG. 2A, then the door of that room is not automatically locked.

Further, the threat system 100 may be configured to unlock a secured lock box (e.g., safe) in which one or more firearms, and optionally other defensive items such as body armor, are disposed to enable authorized persons (e.g., a principal, etc.) access to such defensive capabilities following the occurrence of an adverse event (e.g., the firearm(s) are not accessible until an actual shooting is in progress). As an additional safety measure, the secured lock box can only be unlocked when a shooting is in progress (i.e., it is not unlocked due to a manual actuation, but would unlock if one or more threat sensing devices 10 later registered a gunshot).

FIG. 2A shows a school 101 wherein Gunman X 99 is an active shooter threat that has fired a weapon in "Classroom 101". A threat sensing device (gunshot sensor) 10a automatically and instantly detects, analyzes, and reports to the system gateway 110 that a weapon was discharged in "Classroom 101". In at least some aspects, each threat sensing device 10a . . . 10n is assigned a unique hardware address that is recognized by the system gateway 110.

At the same time, gunshot sensor 10b automatically and instantly detects, analyzes, and reports to the system gateway 110 that a weapon was discharged in a classroom to "Classroom 102" and a gunshot sensor 10c automatically and instantly detects, analyzes, and reports to the system gateway 110 that a weapon was discharged in the general proximity of gunshot sensor 10c ("Classroom 103"). "Classroom 103" is also shown to include an LED Gunshot Sensor 50, which also detects, analyzes, and reports to the system gateway 110 that a weapon has been discharged, but not in the proximity of LED Gunshot Sensor. In the hallway, gunshot sensors 10d, 10e detects, analyze, and report to the system gateway 110 that a gunshot has been fired in the proximity of gunshot sensor 10d, but not in the proximity of gunshot sensor 10e. From the system gateway 110, information regarding the Gunman X 99 and the weapon discharge (e.g., location of weapon discharge, acoustic signature, image signature, determined weapon type, determined caliber, etc.) is sent via the Internet 120 to designated mobile devices 130 and local authorities 132 (e.g., law enforcement, EMSA, other first responders, etc.), such as to patrol car and ambulance mobile computers 135. FIG. 2A also shows the activation of local alarms, locking of internal doors, and management of lighting 115.

Figure 2B:
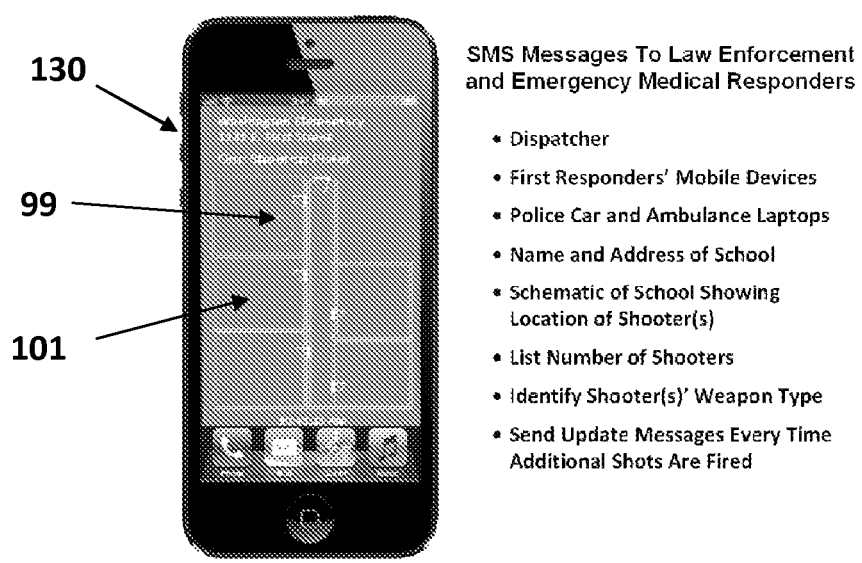
FIG. 2B shows an example of an output of the threat sensing system, such as is represented by way of example in FIG. 2A, to a wireless device according to at least some aspects of the present concepts.

Following detection of a gun-based threat (e.g., gunman X 99 in FIG. 2A), or manual activation of the system by an authorized person (e.g., a teacher, a principal, etc.), the threat sensing system 100, in at least some aspects, automatically broadcasts a gun-threat alarm throughout the school (e.g., via a PA or alarm system 115, text alerts or automated calls to cell phones 130, etc.), prompting teachers, administrators and students to react in accordance with a pre-established plan. In at least some aspects, the threat sensing system 100 utilizes stored contact information of, for example, all faculty, school administrators, employees and local law enforcement, to automatically notify all persons listed on a call list particular to the adverse event of the declared adverse event. An example of an alert to a cellular phone is shown in FIG. 2B, where a phone 130 is shown having displayed thereon the map of FIG. 2B, with the threat (i.e., Gunman X 99) highlighted as being in classroom 101. As noted above, in some aspects, the threat sensing system 100 is configured to enable a manual actuation of the system, such as by use of a "Key Fob" borne by a designated person (e.g., a teacher, a local administrator, a principal, etc.) or by an input from such designated person to a computer, wireless device, or keypad. In at least some aspects, this is accomplished by a "Key Fob. Manual activation is beneficial, for example, where a threat (e.g., a telephone call with a bomb threat, a visual observation of a weapon by a student or teacher, a threatening note, etc.) is received, or a gas leak is detected, or a hazardous chemical spill (e.g., mercury from a lab) occurs, but is not evident or otherwise not able to be sensed by the threat sensing system (e.g., a threat in an area not covered by a threat sensing device 100). In other aspects, the threat sensing system 100 can automatically activate responsive to an approaching tornado, hurricane, flash flood or other extreme weather conditions (e.g., responsive to NOAA SAME digital burst broadcasts and 1050 Hz warning alarm) or be activated manually (e.g., a teacher looking out the window sees a funnel cloud forming).

In at least some aspects, the threat sensing system 100 is integrated with a mobile application (i.e., software pre-installed on user's mobile devices) to enable all faculty, school administrators, employees and local law enforcement affected by the adverse event to broadcast messages directly to one another (e.g., a group chat, directed communications with one or more others having the application, etc.). In at least some aspects, the threat sensing system 100 is configured to automatically disable one or more mobile devices if the threat sensing system determines that a mobile device may have been compromised and is in use by the threat (e.g., shooter) so as to block communications to that device. In at least some aspects, the threat sensing system 100 transmits to designated mobile devices (e.g., mobile devices registered with the threat sensing system, mobile devices having installed thereon a threat sensing system mobile application, etc.) messages and information immediately following the detection of a threat (e.g., gunfire, etc.) that identifies the location of the threat or event in the school/facility. Subsequent messages and information advantageously provide updates, such as any movement of the threat (e.g., changing location of the shooter) and/or change (e.g., a change in weapon used). The messages and information and/or updates thereto permit safer egress for staff and students, while improving communications with responders arriving to the school or targeted location.

In at least some aspects, the threat sensing system 100 is integrated with other electronic devices in the school or building, such other electronic devices including televisions, radios and other potentially distracting electronic devices, so that the threat sensing system can automatically turn off any such other electronic devices after a threat (e.g., a shooter) has been detected. Optionally, the threat sensing system 100 may selectively turn on one or more such other electronic devices as a threat counter measure.

While the threat sensing system 100 is automatically implementing local actions, such as those noted above, an Active Shooter Alert Message(s) (or other message(s) appropriate to the perceived threat) will be broadcast to local law enforcement which can include, but is not limited to, transmissions to mobile phones, laptop computers, dispatch systems (e.g., digital signage, etc.), and local emergency command and control centers. The alert message(s) provide information including, but not limited to, any combination of one or more of the location of the school/facility, the room where the gunshot or threat occurred (e.g., as a location on a map, a textual description, etc.), the type of weapon(s) involved, the number of threats, the location of the threat, the last known location of the threat, the number of shots fired, audio picked up from microphones in the threat sensing system 100 sensing devices, etc.).

Currently, a maximum elapsed time of a few seconds occurs between the first shot fired (threat detection) at a school/facility and the reception of a threat notification message (e.g., shot fired) by law enforcement dispatch and mobile devices and laptops borne by first responders. The elapsed time between adverse event and notification is limited only by the communication technology.

As noted above, the threat messaging (e.g., the Active Shooter Alert Message, etc.) can be broadcasted continuously as the threat (e.g., shooter(s), etc.) continues to move through the building. The first responders are provided with the last known position of the threat and, when they arrive on the scene, they are enabled to position their initial response as close to the threat as possible. Likewise, as to the persons on site, whether first responders or staff/faculty/students, the threat messaging broadcasts, whether by public (e.g., PA system) or private (e.g., mobile device) medium, continuously or intermittently (e.g., as updates are available) provide information on the whereabouts of the threat to facilitate appropriate, and faster, offensive or defensive responses thereto.

In at least some aspects, the alert messaging is sent to all teachers, employees and school staff members via a private, subscription only, multi-directional messaging system, so the actions of law enforcement, all first-responders, faculty, school administrators, local government authorities, and even parents (if desired) can be coordinated through the threat response system 100 messaging system.

While waiting for arrival of the first responders, school faculty and administrators can send and receive messages to the police and to one another through the threat response system 100 mobile application. In other aspects, each staff member may be equipped with a key fob "panic button" device that can be activated if a threat is in the immediate proximity of the staff member and that key fob, linked to the staff member, immediately provides positional information regarding not only the staff member, but also of the threat.

In at least some aspects, the threat response system 100 messaging system messaging system enables law enforcement responders and/or dispatchers to broadcast instructions, information and/or coordination messages to other first responders, faculty, school administrators, local government authorities, and even parents.

A system gateway (SG), shown as 110 in FIG. 2A, is disposed in the administrative office 107, but could be placed anywhere within a school or facility. The system gateway 110 receives, analyzes, and broadcasts threat-based information and manages communications, such as broadcast threat alerts. The system gateway 110 plugs into existing wall outlets to receive power and receives data from gunshot sensors over the same powerline using various powerline protocols such as, but not limited to, HomePlug, X10 and Maxim. The system gateway 110 receives data from each of the threat sensing devices 10 over wireless communication using various wireless protocols such as, but not limited to, 900 MHz, Wi-Fi, Zigbee, and Z-wave.

The system gateway 110 is advantageously, but not necessarily, configured to analyze the sound waveform data received from gunshot sensors of the threat sensing devices 10 to determine whether the sound waveform indicates a valid gunshot or gunshots and, if so, to further determine the general type of weapon (e.g., shotgun, handgun, long rifle) that could have produced that sound waveform, and establish the location or room number of the shooter(s). Alternatively, the system gateway 110 can transmit the sound waveform data to another processing device that is local (e.g., within the school or facility) or remote (e.g., outside of the school or facility). In yet another alternative, the threat sensing devices 10 themselves perform the sound waveform analysis and provide the results of the analysis to the system gateway 110. In this alternative, each of the threat sensing devices 10 independently makes its own determination as to the existence of a threat and provides its determination to the system gateway, so that multiple affected sensors in one or more threat sensing devices provide notice and data regarding the threat.

Where configured to analyze sound waveforms, the system gateway 110 determines not only the validity of a suspect gunshot waveform and determines, from the waveform, the type of weapon involved and location of the waveform, but also independently evaluates each subsequent sound waveform to determine if more than one weapon is being used and/or more than one shooter is involved.

Figure 2C:
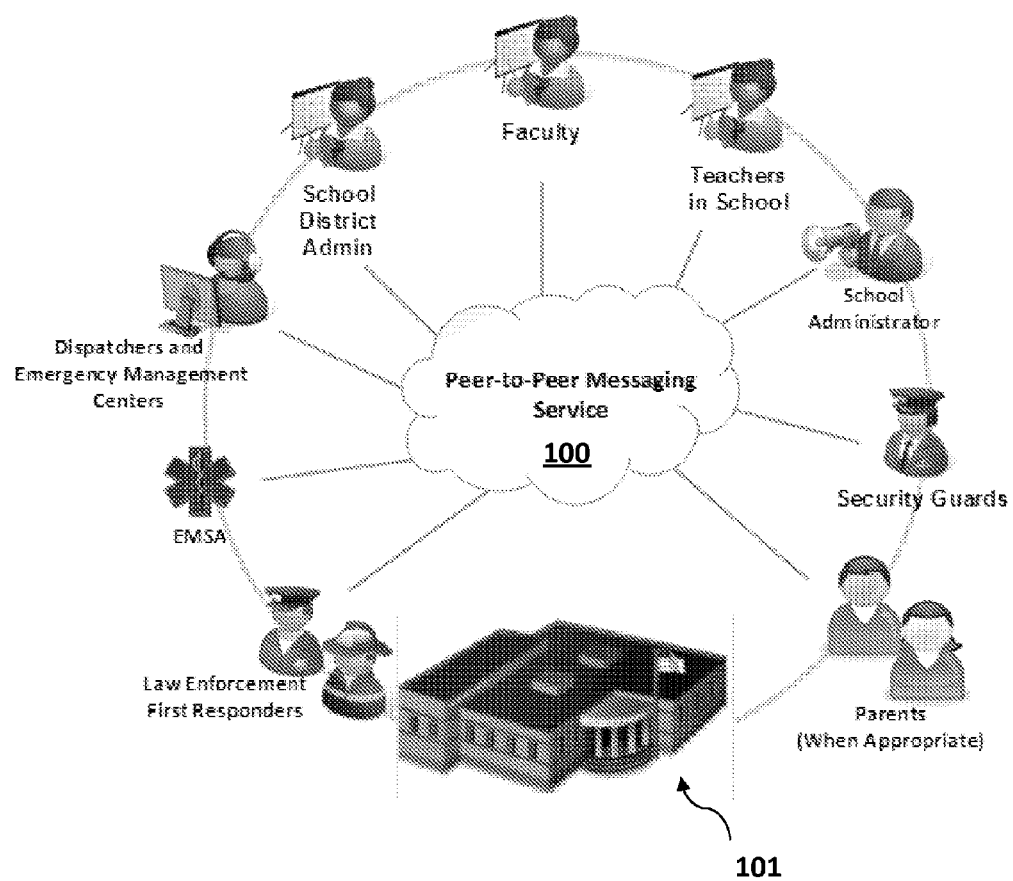
FIG. 2C depicts a communication network to which the threat sensing system, such as is represented by way of example in FIG. 2A, is connected according to at least some aspects of the present concepts.

The system gateway 110 transmits information relating to the adverse event (e.g., gunshot event) simultaneously over several communication paths, such as Ethernet, broadband, cellular networks, and emergency broadcasting systems (e.g., transmitting using the Emergency Priority Transmission protocol that all national wireless carriers offer). The threat sensing system 100 is also able to receive communication via the system gateway 110 over the same communications pathways. FIG. 2C shows an example of the external communications between the system gateway 110 and external devices including, but not limited to, peer-to-peer messaging service communications with law enforcement first responders, EMSA (Medical), dispatchers and emergency management centers, school district administration, faculty, teachers in the school, school administrators, security guards, and parents, where appropriate. By way of example, with regard to the above-noted mobile software application, the threat sensing system 100, through the system gateway 110, sends adverse event related information to mobile applications installed on law enforcement mobile devices such as, but not limited to, a smartphone, tablet computer, or wearable computer (e.g., Google glasses). The adverse event related information may include, as previously noted, the school/facility name and address, a facility map, location(s) or room number(s) of the shot(s), the number of shots fired, last known location of the shooter(s), closest entry point(s), and the weapon type(s) involved. The system gateway 110 also advantageously is configured to transmit instructions and coordinate the transmission of information to and from the affected school staff members. In at least some aspects, the mobile application works with mobile devices, smartphones, mobile phones, tablets, digital signage, and intercom systems and permits two-way communication between police, first responders, teachers, administrators, government authorities and, optionally, parents. Similarly, client software for computers is installed on computer systems associated with first responders and other potentially affected entities or groups (e.g., school districts, government officials, transportation offices, hospitals, clinics, etc.) so the threat sensing system 100, through the system gateway 110, is able to send adverse event related information to potentially involved computer systems and receive inputs therefrom.

In yet other aspects, a restricted-access (e.g., password protected) Internet software application is provided in association with the threat sensing system 100 to display, via an Internet browser or local run applications, gunshot alerts and adverse event related information uploaded from the system gateway 110. As with the above-noted mobile application, the Internet software application is advantageously configured to identify and display the location(s) and room number(s) where gunshots were detected, preferably in association with a visual map of the school or facility that was preloaded into the system. The Internet software application is advantageously configured to indicate and display, in real-time, the type of weapon(s) being fired and the number of shots fired. Multiple shooters and multiple room numbers can be identified and displayed. Further, the Internet software application is advantageously configured to facilitate multidirectional communication with local law enforcement and first responders. In some aspects, the website platform is private-labeled for each entity (e.g., school) and includes training videos along with any other items the entity chooses to provide its employees, staff and parents (in the case of schools).

In at least some aspects, the system gateway 110 receives the acoustic data (e.g., waveforms) from all of the threat sensing devices 10 of that detect the sound (e.g., via gunshot sensors 20). The system gateway 110 then uses data from one or more of the threat sensing devices 10 to analyze the sensed sound to determine whether the sound was a gunshot. This analysis can comprise methods known in the prior art, such as those disclosed in the references disclosed herein and incorporated by reference herein, or can utilize lookup tables of waveforms of gunshots of numerous firearms firing numerous different bullets of different loadings and characteristics (e.g., a 9 mm Glock 17 will have a slightly different acoustic waveform than a 9 mm Glock 34, which has a slightly longer barrel, and each would be different than a 9 mm Glock 17C, which is compensated, even though all are firing the same ammunition). Moreover, each of these handguns will have different acoustic waveforms with different ammunition (9 mm, 9 mm+p, 9 mm+p+), as the pressure of each of these cartridges differs. In at least some aspects, the sound waveform determined to have the greatest amplitude is the threat sensing device 10 closest to the gunshot (i.e., establishing the location of the gunshot) and the threat sensing device 10 or system gateway 110 determines, via the lookup tables, the type of weapon producing the sensed acoustic waveform based on the characteristics of the waveform. The system gateway 110 correlates the known location of the threat sensing device 10 closest to the location of the gunshot.

To improve differentiation of the actual gunshot waveform from echoes, the sensor sampling rate is selected to appropriately distinguish the gunshot from echoes. Further, higher mountings of the acoustic sensors 20 are less likely to receive higher volumes of echoes because most of the items that can generate echoes are closer to the ground in the room.

For optimal setup of the threat sensing system 100, the geometry of each room (e.g., dimensions of the room, etc.) and location (e.g., room number, location in school, etc.) in which a threat sensing device 10 is installed is entered into the system, as is the location, height and orientation of the threat sensing device. This information is advantageously integrated into the schematics of the facility for dissemination to first responders or other persons having a need for the information.

In at least some aspects, the threat sensing system 100 provides a simulation mode for training of staff, law enforcement and first responders.

Further to merely sensing a threat and providing messaging and information regarding the threat, the threat sensing system 100 is also adaptable to deploy proactive countermeasure technology to provide a defense capability, such as to encumber or disable the shooter(s) without harming bystanders.

In some aspects of the present concepts, a threat sensing device 10 comprises an image-based sensor(s) (or sensor array) 40, such as is represented by way of illustration in FIG. 1C. The threat sensing device 10 may advantageously comprise, or be integrated with (e.g., as part of a single housing or in separate housings spaced apart from one another, such as in a different housing across the room), multiple image-based sensors 40, such as IR projectors and IR cameras, depth sensors, optical 2D tracker sensor, 3D motion capture sensor, special mapping transmitter/receiver and color CMOS cameras. These image-based sensors 40, as noted above, may be individually or collectively used to collect image information used by the threat sensing device 10 to guide deployment of one or more countermeasures or threat neutralizing device or system. The images recorded by the image-based sensor(s) 40 enable application of facial recognition software and hardware to operate and to also track potential threats (e.g., within a room and from room to room), communicate exact coordinates of a threat or subpart of the threat (e.g., a head position, a hand position), even if the treat is in motion. Resolution of a moving target using the image-based threat sensing device 10 is on the order of less than about one square inch at a distance up to 15-20 feet.

Figure 5A:
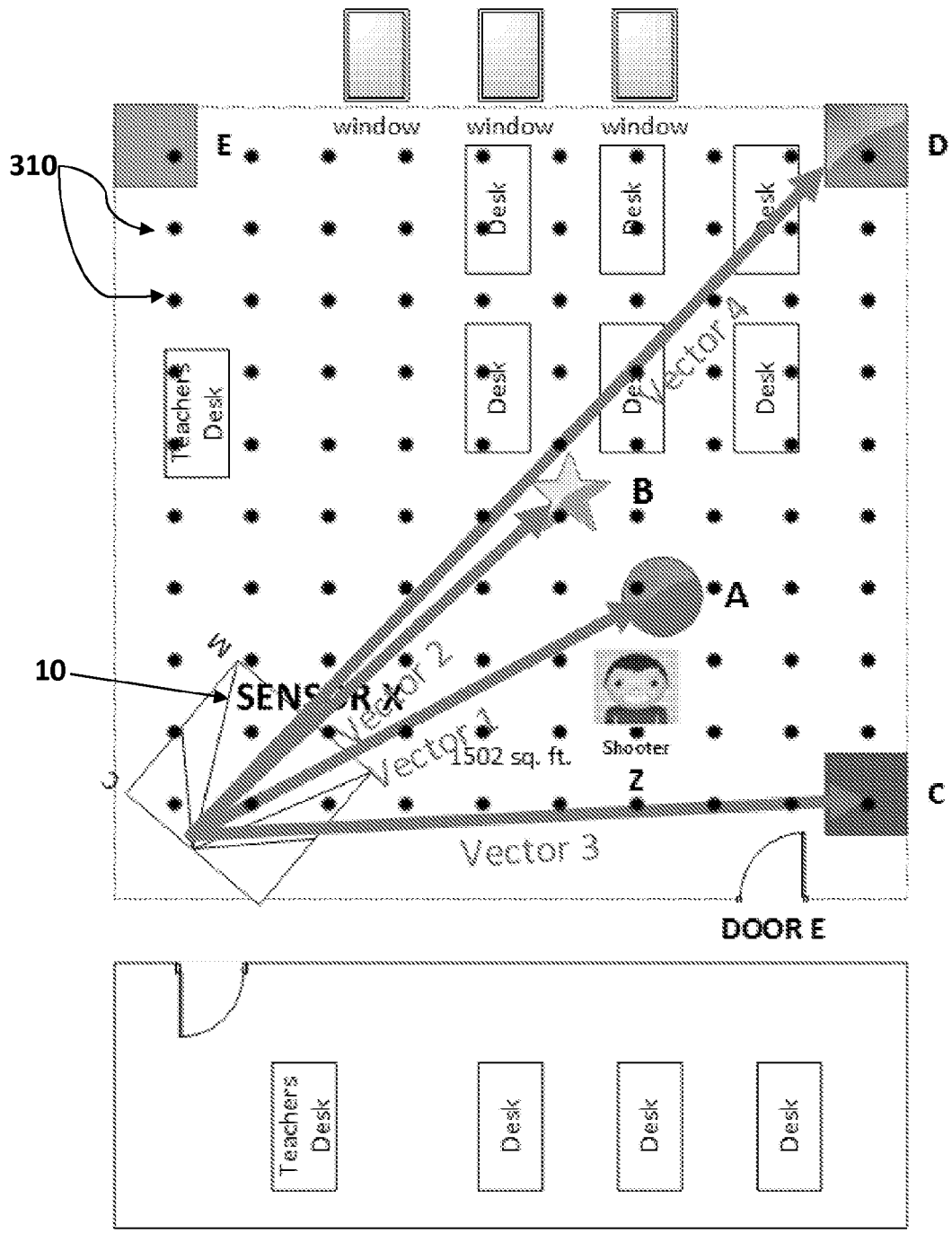
FIG. 5A shows a representation of a school classroom using a threat sensing system according to at least some aspects of the present concepts.
Figure 5B:
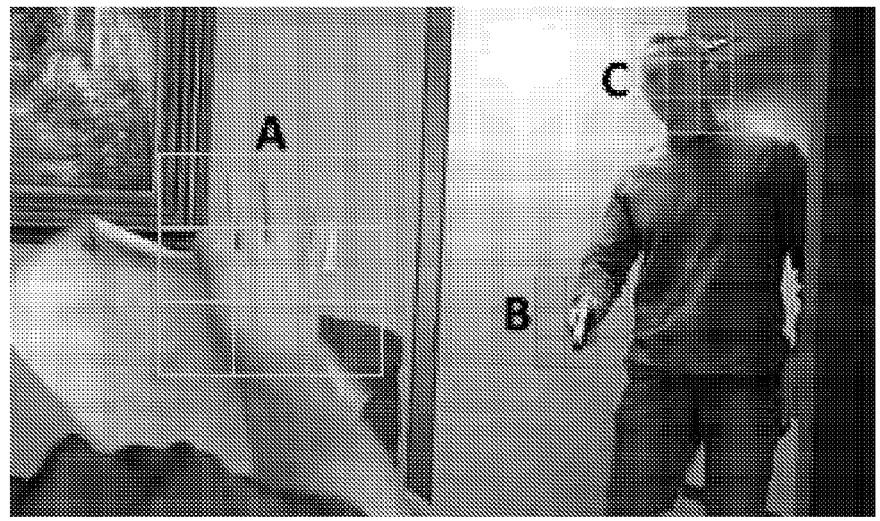
FIGS. 5B-5C show representations of a vision-based system identifying postures and/or gestures indicative of a threatening situation according to at least some aspects of the present concepts.

The image-based sensor(s) 40 and threat sensing device 10 are configured, using conventional threat algorithms and pattern recognition data techniques, to interpret specific postures or gestures indicative of a threatening situation (e.g., an individual carrying a weapon or acting in a hostile manner) which may need to be identified, tracked and targeted by active countermeasures. FIG. 5B shows examples of identifiable postures or gestures indicative of a threatening situation detectable and ascertainable by the image-based sensor(s) 40 in accord with at least some aspects of the present concepts. Examples of such postures or gestures indicative of a threatening situation could include, but are not limited to, an individual holding their hands up, an individual holding up one arm extended with a hand at roughly face level, or an object in an individual's hand that corresponds to a known weapon type. The system may further analyze postures and gestures of multiple individuals in combination (e.g., an individual holding their hands up in combination with an individual holding up one arm extended with a hand at roughly face level in a direction toward the individual holding their hands up).

In the example of FIG. 5B, A represents detection of an individual being threatened and holding their hands up by a Vision-Based Threat Recognition System in accord with the present concepts, B represents detection of a threating object, here a hand gun, by the Vision-Based Threat Recognition System, and C represents detection of the face and running facial recognition and tracking of threat using the Vision-Based Threat Recognition System.

Figure 5C:
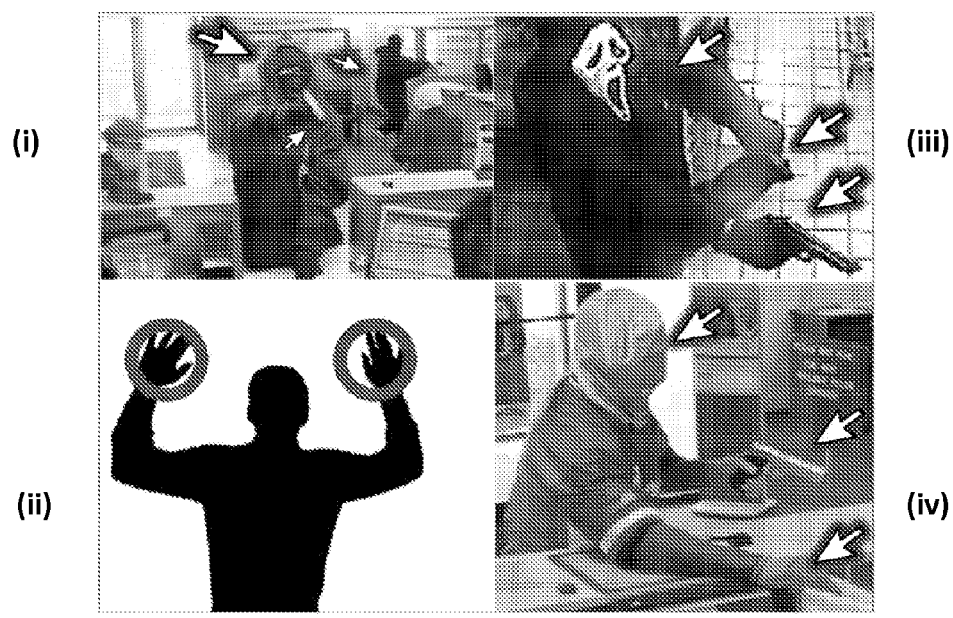

In the example of FIG. 5C(i)-(iv), the arrows in the illustration indicate detection from the Vision-Based Threat Recognition System of threating events and threating items. Items detected in the photo range from gloves, masks, weapons, body posture and multiple targets. The objects detected in most cases are uncommon to the environment.

The data gathered from the image-based sensor 40 and analyzed by the threat sensing device 10 (or other device external to the threat sensing device) can be used to guide in-room countermeasure devices that will target the threat or shooter(s) and their weapon(s). The image-based sensor 40 and threat sensing device 10 detect and define the position and direction of travel of the threat(s) (e.g., shooter(s)) in the room, bodily orientation, and the location of weapon(s). The determined threat coordinates and movement vectors are optionally used to guide deployment of a countermeasure device, such as to guide movement of a motorized aiming mechanism for a less-than-lethal system, such as a Taser, and firing thereof at the threat. In some aspects, the present concepts may be used in combination with the "Sentinel" Taser Area Denial System (TADS), deployed for perimeter protection, covering entryways, building interiors, corridors or rooms. The TADS is effective at a range of 8-15 meters, is controlled via camera installed on remotely controlled pan-tilt platform, and enables effective engagement of threats using 7 Taser dart cartridges which can be fired in different directions in an arc of 160°.

Countermeasures could further or alternatively include, for example, but are not limited to, LED strobes, sound grenades and/or a flash-bang. One countermeasure may comprise a LED (Light Emitting Diode) incapacitator, configured to emit an extremely bright, rapid, and well-focused series of differently-colored random pulses. Before the human eyes can focus in on one frequency, another frequency comes on, causing intracranial pressure, which results in cluster headaches, nausea, vomiting, disorientation, irritability, temporary paralyzation and visual impairment to the target/shooter. Coordinates can be sent to a driving mechanism (e.g., one or more motors) to aim and keep light focused on the head of the target. In another aspect, the LED may simply comprise a high-intensity light (e.g., 750 lumens, 1000 lumens, 1500 lumens, etc.). Yet further, instead of using the incapacitator offensively against a threat, the incapacitator could be used defensively by projecting the output light onto classroom door windows, in hallways, or other surfaces and objects (e.g., in a room) to discourage an active shooter from wanting to enter or stay in that room. The incapacitator need not be physically integrated with the threat sensing device 10, and may be separately disposed in any convenient location, with communication between the threat sensing device and countermeasure occurring via a conventional wireless (e.g., wi-fi, Bluetooth, etc.) or hardwired connection.

As another countermeasure, an imaging system may be used to convey an appearance of an empty room. A classroom door "window" may comprise an LCD display having one or more cameras on the backside thereof. In normal circumstances, the displayed image on the LCD window is that of the classroom. However, following activation of the threat sensing system 100, the LCD display reverts to a default image of an empty classroom. In another aspect, a projector may be used to project a default image of an empty classroom onto a screen disposed over the window.

Yet another countermeasure that can be integrated (e.g., physically or operatively) with the threat sensing system 10 is the Dazzler, a light-based weapon intended to temporarily blind or disorient a target with intense directed radiation (e.g., visible light output by laser diodes or diode-pumped solid-state lasers), but without causing of any long-term damage to the eyes. Again, as with the incapacitator, the Dazzler countermeasure need not be physically integrated with the threat sensing device 10, and may be separately disposed in any convenient location, with communication between the threat sensing device and countermeasure occurring via a conventional wireless (e.g., wi-fi, Bluetooth, etc.) or hardwired connection. Other possible countermeasures could include directed energy weapons (e.g., lasers, directional acoustic weapons), such as the SaberShot laser dazzler, outputting 250 Mw of 532 nm green-laser or a highly directional, high power speaker configured to produce sounds in a narrow beam at a debilitating 150 dB.

In some aspects, the image-based sensor 40 and threat sensing device 10 are configured to apply conventional facial recognition techniques to captured images of the threat(s) (e.g., shooter(s)). One such facial recognition technique uses an open-source software called OpenCV (Open Source Computer Vision Library), a library of programming functions mainly aimed at real-time computer vision, developed by Intel. After facial identification images have been obtained by the threat sensing device 10, the threat sensing system 100 can report facial recognition information to other threat sensing device located throughout a facility to more quickly and accurately track the threat and, optionally, deploy countermeasures to neutralize or impede such threat (s). The facial recognition information is also advantageously automatically sent to local law enforcement, first responders, and workers (e.g., staff, teachers, administrators, etc.) in the facility.

In some aspects, the threat sensing devices can be pre-programmed to look for a particular person of interest even in the absence of any particular threat. For example, a student presenting a disciplinary problem is placed on suspension by a school and the school administration prophylactically adds images of that student to an alert database for the image-based sensor 40, so the threat sensing system 100 can activate an alert if the student unexpectedly shows up at school while on suspension. It is to be noted that the present concepts advantageously may incorporate a variety of tiered alert levels to provide responses and messaging suitable to individual threats or potential threats. By way of example, the appearance of an unauthorized student should not necessary automatically summon the police and place the school on lockdown. Instead, in such a situation, messaging could automatically inform school administrators and teachers (e.g., the suspended student's teachers) that the student was identified entering the school, together with the point of entry. The school can, at its discretion, immediately dispatch an administrator to investigate, heighten a state of alert, or manually activate the threat sensing system 100 alert to summon the police.

As noted above, the image-based sensor(s) 40 may be physically incorporated into the threat sensing device 10 housing 12, or may be deployed externally thereto (e.g., in a different location in a room, connected to the threat sensing device via a port 16, etc.). Optionally, the image-based sensor(s) 40 may be deployed independently of the threat sensing devices 10 and the image data provided directly to the system gateway 110 or other external device. Likewise, the countermeasures may also be deployed independently of the threat sensing devices 10 and control thereof managed through the system gateway 110 or other external device (e.g., deployed by a first responder on the scene). The image-based sensor(s) 40 may comprise, for example, one or more camera modules configured to be plugged into any existing electrical outlet or screwed into any light housing or light socket. The image-based sensor(s) 40 may further comprise built-in communication module configured to transmit live video and audio to the system gateway 110 for storage or dissemination (e.g., to school and city emergency coordination facilities, etc.) as needed.

Figures 3A, 3B, 3C:
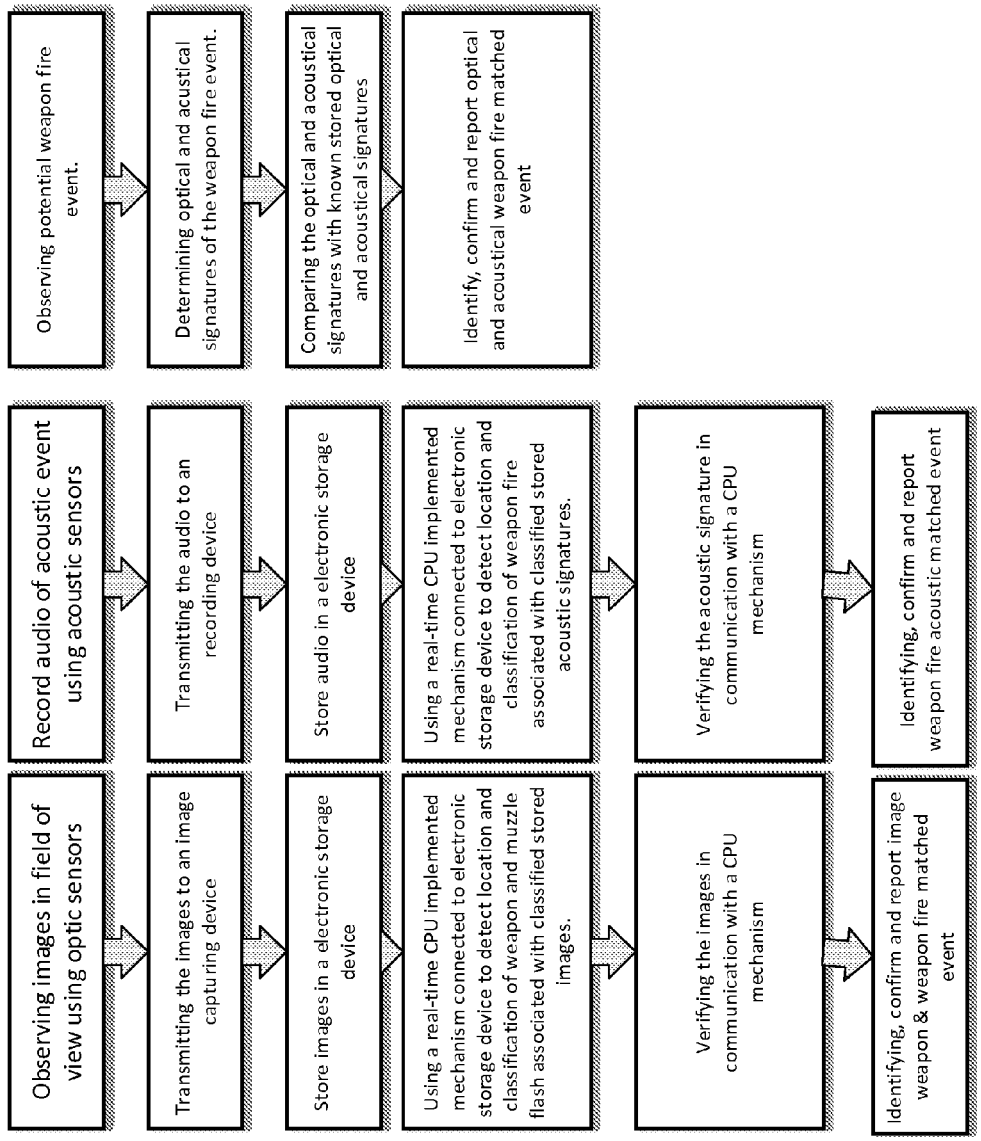
FIGS. 3A-3C show flowcharts of acts conducted by various sensing devices of the threat sensing system, such as is represented by way of example in FIG. 2A, according to at least some aspects of the present concepts.

FIGS. 3A-3C show examples of methods for use of a vision-based threat recognition system in combination with a gunshot sensor in the disclosed threat sensing system 100.

In FIG. 3A, the image-based sensor(s) 40 observe images in the field of view using one or more optic sensors. The image data, the optical signature of the gunshot, is then transmitted to an image capturing device and stored in a physical computer-readable storage medium. One or more processors are then used to compare the image data to an image data library stored on the physical computer-readable storage medium according to a classification system of weapon, attachments (e.g., muzzle brake, flash suppressor, etc.), caliber (e.g., 9 mm, 40 S&W, 45 ACP, .223, .308, etc.), direction of fire, and resulting muzzle flash. The one or more processors determine the weapon most closely associated with a weapon muzzle flash contained in the image data library.

Muzzle flash is the light emitted in the vicinity of the muzzle by the hot propellant gases and the chemical reactions that follow as the gases mix with the surrounding air. Before projectiles exit a slight pre-flash may occur from gases leaking past the projectiles. Following muzzle exit the heat of gases is usually sufficient to emit visible radiation—the primary flash. The gases expand but as they pass through the Mach disc (for supersonic rounds) they are re-compressed to produce an intermediate flash. With rifles, hot combustible gases (e.g., hydrogen and carbon-monoxide) may follow when they mix with oxygen in the surrounding air to produce a secondary, bright flash. The blast and flash are caused by the combustion products of the gunpowder, and any remaining unburned powder, mixing with the ambient air. The size and shape of the muzzle flash is dependent on the type of ammunition being used and the individual characteristics of firearm and any devices attached to the muzzle (such as a muzzle brake or flash suppressor). Muzzle flash can be broken down into five distinct components: (1) muzzle glow, a reddish glow that is visible before the bullet leaves the barrel, created by superheated gases that have leaked past the projectile (via the barrel rifling) and have exited the barrel; (2) primary flash, caused by propellant gases exiting the firearm behind the bullet, which is bright but dissipates quickly; (3) intermediate flash, caused by shock waves created by the high speeds of the escaping gases and projectile, appearing as a reddish disc shape in front of the muzzle; (4) secondary flash, appearing farthest from the muzzle as a large white or yellow flame, caused by the mixture of fuel-rich gases ($CO_2$, $H_2O$, $N_2$, CO and $H_2$) and oxygen in the atmosphere surrounding the muzzle; and (5) sparks representing partially unburned powder or other heated materials ejected from the muzzle. Of course, muzzle flash may also comprise lateral components (e.g., from a revolver cylinder gap) or other vertical components (e.g., muzzle brake, compensated barrel, etc.).

In FIG. 3B, acoustic sensor(s) 20 and/or other acoustic sensor(s) (see, e.g., microphones in overhead light of FIG. 4) records audio of an acoustic event using one or more acoustic sensors. The acoustic data is then transmitted to and stored in a physical computer-readable storage medium. One or more processors are then used to compare the acoustic data to an acoustic data library stored on the physical computer-readable storage medium according to a classification system of weapon, attachments (e.g., suppressor, etc.), caliber, direction of fire, and resulting acoustic waveform. The one or more processors determine the weapon most closely associated with a weapon acoustic waveform contained in the acoustic data library. At to the potential for a suppressor, suppressors do attenuate and alter the gunshot pressure pulse. By way of example, whereas an unsuppressed .22 LR handgun can produce gunshots of over 160 decibels, a suppressed .22LR reduces the volume generally by about 30 dB, to between roughly 130 dB (the threshold of pain) and 145 B (slightly less than a jet engine at 30 m). The threat sensing devices 10 are configured to detect weapons of any caliber suppressed or not suppressed. Even though the suppressor has the capability to reduce muzzle flash and the amplitude of the pressure wave (sound) emanating from the barrel, suppressors do not eliminate sound, muzzle flash, or gas emission. The gunshot, though tempered, is hardly silent. Moreover, for a rifle round or supersonic round, the supersonic crack of the bullet itself from the bullet bow shockwave produces an audible event separate from that of the muzzle blast.

In FIG. 3C, acoustic sensor(s) 20 and/or other acoustic sensor(s) (see, e.g., microphones in overhead light of FIG. 4) records audio of an acoustic event using one or more acoustic sensors and image-based sensor(s) 40 observe images in the field of view using one or more optic sensors. The image data and the acoustic data is then transmitted to and stored in a physical computer-readable storage medium. One or more processors are then used to compare the image data and the acoustic data to an image data library and an acoustic data library stored on the physical computer-readable storage medium according to a classification system of weapon, attachments (e.g., suppressor, etc.), caliber, direction of fire, acoustic waveform and muzzle flash. The one or more processors determine the weapon most closely associated with the combination of the weapon acoustic waveform and optical signature (e.g., muzzle flash, muzzle flash and cylinder flash from a revolver, etc.) contained in the acoustic and image data libraries.

As to the acoustic signature, passive acoustic location involves the detection of sound or vibration created by the object being detected, which is then analyzed to determine the location of the object in question. In detecting a gunshot (pressure waves), there is a characteristic burst of sonic energy, an "N wave," a substantially instantaneous shock and vibration. Each of these actions gives off a unique acoustic signature that can be identified and reported. Thus, in accord with such aspects, radio frequencies are emitted incident into an area where people pass through (e.g., entry ways) that would resonate one or more components of a firearm that are characteristic of a firearm (e.g., a magazine spring, a trigger spring, a recoil spring, a hammer spring or mainspring, a firing pin spring, a striker spring, etc.). A resonated signature (e.g., a spring) is then analyzed by the threat sensing device 10, alone or in combination with the data sensed by other sensors, such as but not limited to a "smell sensor" 30 determining whether there are any vapors produced by solvents or lubricants typically used with a firearm.

The acoustic sensor(s) 20 may comprise MEMS microphones, which have an omnidirectional pickup responsive equally to sounds coming from any direction. In other aspects, the acoustic sensor(s) 20 comprise multiple microphones disposed in an array to form a directional response, or a beam pattern. In yet other aspects, the acoustic sensor(s) 20 comprise a beamforming microphone array can be designed to be more sensitive to sound coming from one or more specific directions than sound coming from other directions and can employ beamforming techniques such as, but not limited to, conventional (fixed or switched beam) beamforming, adaptive beamforming phased array, desired signal maximization mode, and interference signal minimization or cancellation mode.

The sound waves sensed by the acoustic sensor(s) 20 are, of course, also influenced by the structures in the room, occupants in the room, and the like, and require significant computing power to properly interpret. In at least some aspects, one or more acoustic sensors utilize an ultrasonic transducer as a receiver to detect the waves of a gunshot, which helps to reduce the influence of ambient noise and other unwanted waveforms. The high energy created from the gunshot has a signature unlike most common waveforms. Accordingly, an ultrasonic transducer can detect threat waveforms while ignoring all others.

FIG. 4 shows an example of a threat sensing device 10 integrated into a light housing. In other aspects, light switches can also be adapted to house the acoustic sensor(s) 20 and optionally other sensors. By way of example, in FIG. 4, the threat sensing device 10 is integrated into an integrated LED retrofit light bulb assembly comprising a speaker, horn, microphone with gunshot detection circuitry, optic sensor, infrared sensor and communication apparatus. In one control mode, the light 207 is caused to strobe or flash off and on to signal an alert of an event (e.g., to warn students and teachers in a room such as music classroom or gymnasium in which the ambient noise level could mask a warning sound, siren or speaker). The threat sensing device 10 can also be used to distract an active shooter by using sounds generated by the onboard speaker 206 and/or by activating a strobe of the LED light. As with the aforementioned threat sensing devices 10, this light-based threat sensing device can connect to a network (e.g., system gateway 110) via powerline carrier 204 or wireless connection 203. In the threat sensing device 10 of FIG. 4, the microphones 209, 210 are at an elevated position, which helps to avoid acoustic obstructions that might influence an acoustic waveform were the threat sensing device to be disposed at a lower elevation. As shown in FIG. 4, an electrical power source 201 comprising a standard light socket connector powers the threat sensing device 10. The threat sensing device 10 comprises a conventional male screw base 202 that provides electrical contact with the light socket connector 201. The threat sensing device 10 advantageously comprises at least one of a wireless communication module 203 (e.g., Wi-Fi, Zigbee, Z-Wave, 900 MHz, etc.) and/or a powerline communication module 204 (e.g., HomePlug AV, IEEE 1901, etc.).

The threat sensing device 10 also includes circuitry 205 comprising power measurement circuitry, power quality circuitry, power usage circuitry, and power control circuitry. One or more acoustic sensor(s) 20, and optionally other acoustic circuitry and devices (e.g., speaker, horn, buzzer, audio circuitry, etc.) are housed in an audio module 206. A light-emitting diode (LED) 207 (or other illuminating source(s)), light drivers and circuitry, and strobe are also provided. Optionally, an infrared sensor 208, optic sensor, camera, IR projector, or laser diode are provided. As noted above, the threat sensing device 10 shown in FIG. 4 comprises acoustic sensor(s), of which are shown an acoustic microphone and transducer 209 and a gunshot sensor microphone 210. In at least some aspects, the use of an acoustic microphone enables users of the system, such as law enforcement, to listen to events in rooms through the microphone(s) of the threat sensing device(s) 10.

A threat sensing device 10 speaker 206 (e.g., in audio module 206 or integrated with or attached to the threat sensing devices of FIGS. 1A-1D) may be used to alert individuals in the vicinity of the threat sensing device to the presence of a threat or to provide instructions in the event of a threat. In other aspects, the threat sensing device 10 communicates with one or more external speakers wirelessly or through a wired connection (e.g., through an I/O port 16) to alert individuals in the vicinity of the threat sensing device to the presence of a threat or to provide instructions in the event of a threat. The threat sensing system 100 is, as noted above, adapted to interact with and use school's Public Address (PA) sound systems, via the system gateway 110, to alert the school to a threat and to provide instructions. The threat sensing system 100 is optionally configured to interact, via the system gateway 110, with communication systems of other nearby business and schools to notify them of an event. For example, if a shooting event was triggered by a threat sensing system 100 deployed in a department store in one end of a mall, the threat sensing system could be configured to broadcast the event to all other tenants in that mall or surrounding areas to facilitate response and information flow.

Figure 5D:
FIG. 5D shows an example of a person holding a handgun, as imaged by in infrared sensor, such as is used in accord with at least some aspects of the present concepts.

In at least some aspects of the present concepts, one or more the threat sensing device(s) 10 may comprise an infrared sensor (e.g., a passive IR (PIR) sensor, etc.), an electronic sensor that measures infrared (IR) light radiating from objects in its field of view. FIG. 5D shows an example of a person holding a handgun, as imaged by in infrared sensor, such as is used in accord with at least some aspects of the present concepts. The IR sensor can be used to detect muzzle flash from a gunshot. Multiple IR sensors can be advantageously used to enable detection of a direction of projectile or a direction of weapon. Databases of known gunshot IR emissions can be compared to the captured IR sensor data to provide estimates of weapons closest to the infrared radiation emitted by the gunshot. A hidden Markov Model is one method used to filter and pattern-match the captured muzzle flash event. Various Thermal and optical sensors can also be used to detect the flash event. UV/IR/VIS, IR/IR/VIS, IR/IR/IR/VIS sensors could also be modified to detect muzzle flash events. IR sensors are even able to detect moving projectiles, such as bullets and ejected ammo casings. As with other sensor combinations in the threat sensing device 10, the optional optical and infrared sensors can be used in conjunction with the acoustic sensor(s) 20 to increase the accuracy of the threat sensing device and better define a location of the adverse event. To illustrate some of the thermal differences that would be captured by such IR sensor(s), a short barreled rifle produces a higher flash level than a longer barrel rifle due to a larger amount of unburned powder leaving the barrel. M-16 5.56× 45 mm rifle bullets emerge with a temperature of about 500-550° F., whereas conventional pistol bullets emerge from the barrel with lower temperatures (e.g., for a pistol cartridge, there is less propellant, a shorter muzzle length over which the bullet is exposed to the burning propellant, a lower bullet velocity and lower air friction, etc.). Ejected ammo casings also possess heat signatures that can be detected.

The threat sensing system 100 may further comprise, in combination with the IR sensor(s), IR projectors to project a 2-D (e.g., all in one plane) or 3-D (e.g., in different planes) of non-visible light beams into a room to provide reference points for measurements and calculations. The grid spacing may be adjusted as to provide a desired resolution. Known distances from the sensor location can optionally be marked or tagged (e.g., special shapes, tags or indicators can be applied to surfaces of the floor, walls, ceiling, furniture, etc.), as shown in FIG. 5A, for increased accuracy. Where multiple IR projectors are used in the same space, different IR projectors can emit IR of different brightnesses or different frequencies, for example, to enable differentiation by an IR sensor sufficient to permit overlay of grid patterns within a space. In general, a light source (emitter) emits light (irradiation light) at an object to be measured and the reflected light from the object is returned to a light detector (e.g., CMOS device) and the time the light takes to hit the object and return is measured, thus providing a distance to the target. On a larger scale, a 3D range image is obtained. Simultaneous localization and mapping (SLAM) technique may also be advantageously used. The threat sensing system 100 may comprise a low cost fixed stereo camera and LIDAR (light detection and ranging) based on a laser-radar paradigm.

FIG. 5A shows an example of a school classroom equipped with an image-based threat sensing device 10. A black dot grid 310 is provided to enable depth to be calculated (stereo-triangular) against the known projected IR dot patterns. A binary reference dot pattern is stored by initially calibration process once fixed to its designated location. Calibration can be adjusted as needed from original placement of the sensor. An orthogonal grid with a more or less binary map of bright/dark spots simplifies the acquisition of the pattern. The system can create a bitmap image with a minimum of one pixel per pattern-point that can be viewed by the IR sensor(s). Calibration can be performed by, for example, the methods set forth in "A convenient multi-camera self-calibration for virtual environments. PRESENCE: Teleoperators and Virtual Environments, 14(4), August 2005".

In FIG. 5A, circle A represents a fixed identification tag that is applied to the floor surface in the room. The exact location, distance, angle, height and shape of the identification tag from the position of the sensor system is recorded and stored in a physical computer readable medium operatively associated with the threat sensing device 10 and the threat sensing system 100. The threat sensing device 10 image sensor(s) (e.g., IR sensor, optical sensor, etc.) can use this fixed identification tag as a reference in calculating trajectory to a stationary or moving target such as a shooter Z.

Reference B (star) represents a fixed identification tag applied to a location on the ceiling of the room. Square C is a fixed identification tag applied to a location on a wall of the room. Square D is a fixed identification tag applied to a location in a first corner of the room. Square E is a fixed identification tag applied to a location in a second corner of the room. The threat sensing device 10, shown as "Sensor X" comprises an IR laser diode sensor system configured to transmit and receive three dimensional data, such as but not limited to, vectors 1, 2 and 3, which represent a magnitude (distance) and direction relative to the IR laser diode sensor.

Figure 6:
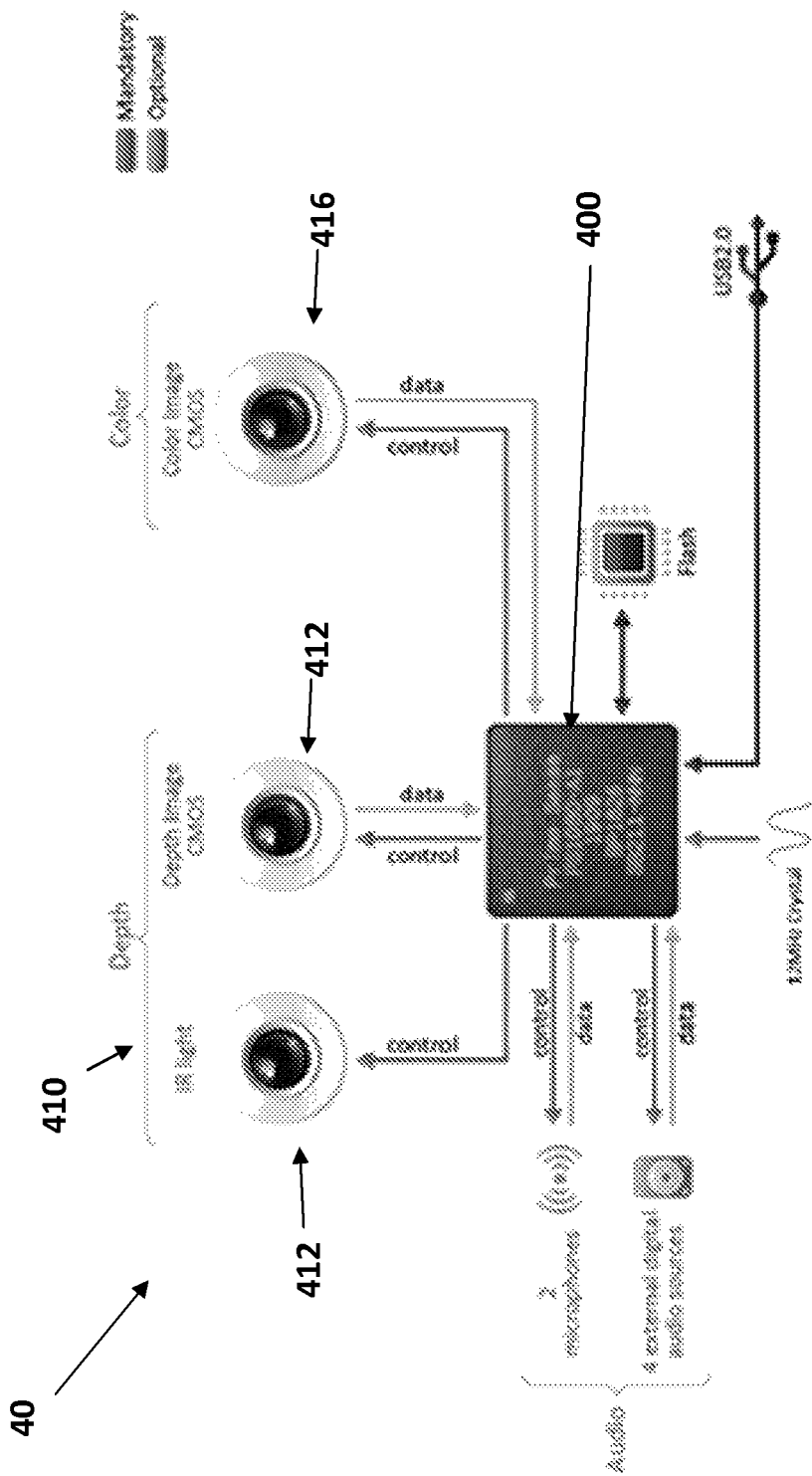
FIG. 6 shows an example of a depth-based sensor system advantageously incorporated into the threat sensing system sensing devices, according to at least some aspects of the present concepts.

FIG. 6 shows one image-based sensor 40, particularly PrimeSense 3D sensing technology manufactured by PrimeSense, advantageously implemented in combination with the threat sensing device 10 and threat sensing system 100. FIG. 6 shows the PrimeSense processor 400 (PrimeSense PS1080 SoC), 3D depth sensors 410 (IR light source 412 (e.g., Microsoft/X853750001/VCA379C7130) and CMOS depth image sensor 414 (e.g., VNA38209015)), and a RGB video camera 416 (color image CMOS image sensor). The processor 400 acquires the depth image by directing IR light from the IR light source 112 outwardly and the CMOS depth image sensor 414 reads the incident reflected light. The reflected IR light is processed using algorithms to create an accurate per-frame depth image of the scene, whereas the RGB video camera 416 aids in facial recognition and other color-based detection features. Such image-based sensors 40, or other image-based sensors (e.g., CCDs, etc.) are advantageously used to obtain information about an identified threat, or suspected threat, including but not limited to sex, race, approximate age, height, facial hair, eye wear, eye color, hair color, tattoos or other markings, height, clothing worn, clothing type, shoes, mask or disguise.

In at least some aspects of the present concepts, the acoustic sensor(s) 20 of the threat sensing device(s) 10 comprises auto gain control circuitry to provide noise differentiation (target noise versus ambient noise).

In at least some aspects of the present concepts, the acoustic sensor(s) 20 of the threat sensing device(s) 10 comprises a plurality of microphones configured to perform noise cancellation to eliminate echo effects.

In operation, the threat sensing system 100 utilizes timestamps to record times at which events are recorded by the system processor(s). The system gateway 110 has an internal clock and emits multiple pulses per second to receive, sequentially, information from each connected threat sensing device 10. One method of determining triangulation and location of an adverse event, such as a gunshot, is to use the system gateway 110 time clock to determine time stamps and time of arrival for acoustic sensor 20 responses of the adverse event and to use the system gateway to determine a sequence of events reported from each of the acoustic sensor responses.

Although not preferred, Wi-Fi triangulation or an indoor GPS system can be used to determine a location of an adverse event.

In at least some aspects, the threat sensing system 100 comprises one or more geophone sensors configured to convert ground movement (displacement, vibration) into voltage, which may be recorded with a seismic sensing device. One or more geophone sensors embedded into walls or floors at multiple known locations throughout a school or facility can permit triangulation of a location of a sufficiently loud sound, such as a gunshot. Acoustic signatures are significantly different when transmitted through the ground as compared to air-based sound waves (e.g., sound waves in open air is around 300-330 m/s, water 1,500 m/s, and steel 5,000 m/s per second the speed of sound in concrete is from 3,700 to 5,000 m/s dependent on many factors). The present concepts advantageously integrate use of the geophone sensors as yet another way to detect gunshots (independently or in combination with other sensors) and increase accuracy (e.g., elimination of false positives, enhanced location information, etc.). Geophone sensors, properly calibrated, can not only independently locate a gunshot to within inches of the source, but can be used to distinguish kids from adults based on the amplitude and frequency of their footsteps and can be programmed to detect other patterns.

In other aspects, a geo-fence (a virtual perimeter) can be dynamically generated to define a predefined boundary, such as a school attendance zone or a specific building boundary that can be monitored (e.g., to track the entry and exit of persons bearing a location-aware device, such as a smart phone having a location-based service (LBS) activated). In at least some aspects of the present concepts, the threat sensing system 100 uses geo-fencing to help eliminate false alarms. Using geo-fencing methods, an acquired location of the user (e.g., a teacher) could be used to limit the ability of that user to trigger an alarm. Thus, if the teacher were to accidently trigger the alarm on their mobile device (e.g., key fob) outside of the pre-determined approved location, the system would recognize this as a false alarm. Another use for geo-fencing would be to allow the system to locate first responders as they arrive at the location of the adverse event and track a location of, or presence of, such first responders. Near field sensors could be used to allow the system to identify mobile phones, other mobile devices and the owners of those phones, and monitor the arrival and departure of those device owners from the geo-fenced area.

Other user devices with which the threat sensing system 100 interacts include, but are not limited to, smart phones, smart watches, personal digital assistant (PDA) devices, headsets, helmet displays, smart visors or glasses (e.g., Google Glass) or other heads-up displays. Maps and alerts from the threat sensing system 100 and other data from the system can be displayed on these type of devices and provide a real time situational awareness to first responders and other users.

In at least some aspects of the present concepts, the threat sensing system 100 utilizes acoustic sensors 20 that detect, measure and monitor the infrasound in their environment and can detect and monitor infrasound (sound under 20 Hz).

In at least some aspects of the present concepts, the threat sensing system 100 utilizes at least one parabolic reflector in combination with an acoustic sensor 20.

In at least some aspects of the present concepts, the threat sensing system 100 acoustic sensors 20 comprise a cover over the sensor to help protect it from impacts and sonically-inflicted damage (e.g., from a gunshot). In one example, a metal grill and foam cover are disposed over the sensor, with the metal grill providing structural protection for the sensor and the foam providing attenuation of ambient sound in the room.

One method of identifying the presence of a gun and identifying a type of gun by comparison to known patterns that is advantageously implemented in combination with the other aspects of the present concepts disclosed herein utilizes terahertz (THz) waves (electromagnetic waves located between infrared waves and radio waves) to detect a weapon. Such THz sub-system can be always on (e.g., at entry points to the building, in hallways, etc.), or can be activated following an adverse event (e.g., gunshot) or following manual activation of system responsive to an imminent threat. Due to the emissions of terahertz wave imaging devices, it is generally desired to only activate such terahertz waves sensors after initiation of an adverse event or prior to an imminent adverse event to lower radiation exposure caused from transmission (it is generally viewed as being safer than X-rays). The terahertz waves are not affected by clothing, plastics or packaging (e.g., backpacks) and can identify immediately unique THz characteristics of any hidden materials (e.g., a metal gun, a metal gun barrel, a magazine spring, etc.) down to a resolution of about 1 mm.

Metal detectors, already present in many schools, may also be integrated into the threat sensing system 100. The metal detectors are advantageously configured specifically to recognize characteristic patterns of firearms, using Very Low Frequency (VLF) technology, to ascertain the inductive and resistive characteristics of an object by looking at the phase shift of the object (e.g., a concealed gun) and comparing it to known patterns (e.g., guns). VLF metal detectors distinguish between different metals through phase shifting, the difference in timing between the transmitter coil's frequency and the frequency of the target object. This discrepancy can result from inductance (e.g., an object that conducts electricity easily (is inductive) is slow to react to changes in the current) or resistance (e.g., an object that does not conduct electricity easily (is resistive) is quick to react to changes in the current). Basically, an object with high inductance is going to have a larger phase shift, because it takes longer to alter its magnetic field. An object with high resistance is going to have a smaller phase shift. Phase shift provides VLF-based metal detectors with the ability to discriminate between metals and the metal detector is able to be set to filter out (discriminate) objects above a certain phase-shift level (e.g., the metal detector can be set to ignore objects that have a phase shift comparable to car keys or coins/currency). Thus, when it is desired to detect a particular object having particular characteristics (e.g., a gun barrel), the VLF sensing can be useful.

In accord with the present concepts, the threat sensing system provides nearly instant gunshot detection indoors with no false alarms and then provides near real-time notification to first responders via one of the most ubiquitous of all communications devices, smart phones and tablets. The intent of the system to have 911 and every first responder in the immediate area and every teacher, employee and staff member at the affected schools notified of a shooting within seconds and to provide each recipient, inclusive of teachers and staff on-site, with actionable and immediate intelligence.

As discussed above, the threat sensing system 100 can also notify first-responders of the number of shooters involved and the room number and exact location where the shooter(s) is/are located. In many cases, the threat sensing system 100 can also advise the first responders as to the kind(s) of weapon is being fired to enable the first responders to know the level of the threat (e.g., the level of body armor that might be required) and necessary tactics. Furthermore, while the first responders are in route, the threat sensing system 100 is able to continuously update 911 and the first-responders mobile on the shooter's movements and where injured persons are located inside the school (i.e., the areas along the shooter's path).

In addition, the threat sensing system 100 has the ability to automatically initiate lockdown procedures within the school when gunshots or threats are detected. Immediately, doors can be locked throughout the school, lights turned off, and specific alarms sounded over the PA system. The purpose of these actions is to isolate as many children and school staff from harms-way as possible while first responders are en route.

Not only can the initial gunshot alert message automatically notify all relevant authorities to ensure help arrives as soon as possible, the threat sensing system 100 provides vital, life-saving information to teachers, staff, security and administrators already on-site and enables communication between the teachers, staff, security and administrators while the first responders en route. To do this, the threat sensing system 100 is designed to use the school's issued computers, teacher mobile phones and tablet devices. The threat sensing system 100 mobile apps and web apps can provide teachers and staff, in lockdown, an effective way to send messages to the police dispatcher and to receive messages from the police dispatcher. This flexible communication provides the police, first responders and, significantly the affected persons, with near real-time situation awareness so they can take the most effective offensive (police) and defensive (affected persons) actions to end the threat as quickly as possible and to minimize harm to the extent possible.

Contrary to military-grade systems, the threat sensing system 100 is a low cost, practical, workable, and realistically effective system deployment in a typical school. The system to be designed can provide long term maintenance and remote monitored features and services to insure the threat sensing system 100 always works when needed. Additionally, the threat sensing system 100 is flexible enough that it can be readily configured by each school district to meet the varying needs of and procedures of different schools districts and their local law enforcement. Further, the non-limiting designs presented herein (e.g., a power socket plug-in threat sensing device, a light socket screw-in threat sensing device, etc.) provide unobtrusive protection.

The threat sensing system 100 solves the inevitable problem of slow and confused human response to the sudden threat of gun violence. As indicated earlier, in both the Columbine and Sandy Hook shootings, it took more than 5 minutes for 911 to be called, whereas the threat sensing system 100 is expected complete notifications to the authorities within 5 seconds. The 295 seconds the threat sensing system 100 saves will result in fewer deaths.

The first objective of the threat sensing system 100 is to create a means to enable police and emergency medical personnel to reach the location of a shooting faster and with the kind of information at their disposal that allows them to act more effectively when they do arrive. Schools are the most immediate concern, but the technology can work in any building.

The threat sensing system 100 can help reduce the extent of violence that can occur while law enforcement is en route to the scene of an active shooter event. In Columbine it took 11 minutes for the sheriff to arrive and another 20 minutes for SWAT to be ready to engage the shooters. In Sandy Hook it took 23 minutes for the police to arrive and engage the shooter.

The second objective of the threat sensing system 100 is to create a means to get children and staff in the school out of harm's way as quickly as possible and to contain, restrict, encumber, confuse, and distract the active shooter in the school while police are en route to the school. To achieve this objective, the threat sensing system 100 can include defensive measures, or countermeasures, including, but not limited to a control system and actuator(s) to automate the control of third-party devices such as electronic locks, lighting control systems, and PS systems, to help isolate, encumber, and contain the active shooter and to assist teachers and staff in the removal of as many children as possible from harms-way while first responders are en route.

Additional defensive measures include, as previously noted, a mobile notification application for teachers and staff that can lead to faster reaction from teachers so they can lockdown each school room and isolate the different areas of the school more quickly and effectively.

Due to the ongoing intelligence provided to the first responders by the threat sensing system 100, both while the first responders are en route and upon arrival of the first responders (and up until engagement with the threat(s)), the amount of time needed by the police to evaluate the situation inside the school and to organize their engagement and neutralization of the threat is markedly reduced. The intent of threat sensing system 100 is to reduce death and injuries by enabling faster engagement by law enforcement. In both Sandy Hook and Columbine, the police delayed engaging the shooter for several minutes while the situation inside the school was assessed. Adequate situational awareness is vital to the success of engagement and any reduction in the time it takes to acquire this awareness can allow a more rapid engagement by police after they are on the scene.

A third objective of the threat sensing system 100 is to provide complete situational awareness to first responders by providing to them the location of the shooter(s) in the school, the lockdown status of all rooms, the location of injuries, the type(s) of weapons used, images of the shooter(s), physical characteristics of the shooter(s), etcetera, as well as data pertaining to the actions of the shooter and the condition of staff and students. To achieve this objective, the threat sensing system 100 utilizes the aforementioned mobile application which enables teachers and staff to quickly provide updates on the shooting from their perspective and to provide updates on the condition of children under their care, and which enables first responders to receive active shooter alerts (e.g., updates from the gunshot detectors and other sensors) as the shooter(s) move (s) in the building.

The threat sensing system 100 capitalizes on the ubiquity of mobile devices by police and teachers and the threat sensing system mobile application is particularly adapted to solve the potential problem of mobile application usability when users are under extreme stress (threat of imminent harm, time pressure, etc.), which compromises both logic and fine motor skills. Studies show that people lose 60% of their cognitive ability when confronted with the sudden and imminent threat of violence. Yet despite this likely occurrence, the threat sensing system 100 mobile application is simple and informative and is usable by most teachers and staff members when a gunshot or threat event occurs and after they enter lockdown. Police officers may not be under the same stress or react to the emergency in same way as the staff in the school, but the threat sensing system 100 mobile application can be usable under heavily time constrained conditions and when the officer's attention is being drawn to other urgent situations, like racing to the school.

A fourth objective of the threat sensing system 100 is to design the mobile application for quick effectiveness and immediate usability under the stressful and pressure-filled circumstance of active shooter emergencies. For example, the mobile application for teachers and staff is centered around bold, easily-interpreted symbols displayed on the screen (e.g., showing current and prior locations of the shooter(s) relative to a well-known map of the school) instead of requiring complex manipulations and inputs, which may not be possible under the extreme duress brought about by the actions of and presence of the shooter(s). In regard to the Internet administrative web pages, the user interface is simple, clean, easy and intuitive to use. The threat sensing system 100 mobile user interfaces emphasize graphical versus textual displays to permit instant assessment and heavily utilize icons that can be pressed, alone or in combination, to send pre-defined information to other teachers and police or first responders, which permits the mobile applications to be usable under stressful conditions encountered in such emergencies.

Data integrity and operational reliability are essential to the success of the threat sensing system 100. For instance, if a gunshot is identified and reported as occurring in the wrong school or in the wrong room, or if first responder mobile phone numbers are entered incorrectly, the effectiveness of the system could be compromised and the lives of children, staff and first responders could be jeopardized or lost. In addition to mistakes in system setup and maintenance, hackers could gain access to the system and issue false alarms or sabotage setup data that identifies sensor room locations or first responder phone numbers. Mistakes of this nature would not only hurt the response effort and the effort to save lives, but it would undermine the credibility of the system and the quick response to any subsequent real gunshot event could be compromised. Accordingly, a sixth objective of the threat sensing system 100 is to create product features and system operating procedures within threat sensing system 100 to ensure data integrity and make hacking extremely difficult to accomplish and easy to identify. To achieve this objective, two people can be required to enter and verify all web based system component identification processes and all user identification processes. To achieve high barriers to hacking, the threat sensing system was designed in collaboration with a cyber-security agency and review of all system architectural and system design features to minimize threats to system hardware, software, interfaces, and stored data. Further, on an on-going basis, a cyber-security firm is advantageously engaged to conduct regular penetration testing and to provide guidance on avoiding system penetrations.

Lives literally depend on the high quality of all threat sensing system 100 system components, hardware and software. Hardware, in particular, can never fail to work properly. Most sensors will never be used, other than regular testing, but they cannot be permitted to fail when they are needed, even if it has been decades since they were installed. Accordingly, a seventh objection of threat sensing system 100, to ensure operability and longevity, is to configure the hardware to perform regular self-diagnostic assessments and to report component degradation or failure to the system gateway 110 and relevant personnel (e.g., automatically placing a service call for service). All threat sensing system 100 circuits are capable of periodic or continuous health-checks and reporting of a status of every component or subsystem. Further, the threat sensing system 100 circuits are able to be remotely polled and diagnostics performed on every circuit and sensor.

The threat sensing system 100 will be held fully accountable for its performance in the event of a shooting. The actions and messages that are executed by the threat sensing system 100 during an adverse event are recorded and open for post-event evaluation and for any subsequent legal proceedings. The history of actions performed by the threat sensing system 100 and the messages the system sends and receives to all mobile device are to be treated as official legal records. Analysis of the flow and timeline of actions and messages caused by a gunshot event is also important as this can assist further development of and improvement to the threat sensing system 100. The seventh objective of the system is to create and maintain a permanent, complete and detailed audit trail and timeline of all alerts, messages, and other systems actions during a gunshot-alert event. That audit trail can then legitimately serve as evidence in subsequent legal proceedings. It is also desirable to maintain a permanent record of all threat sensing system 100 continuing 'health-check' functions (self-diagnostics) and periodic automated remote testing activities. To achieve this objective, the threat sensing system 100 advantageously creates an audit database populated with time-stamped copies of all message traffic and time-stamped notations of all system actions, such as "automatic locks engaged". A set of standard reports from the database can also be prepared to facilitate auditing.

Considering the limited amount of funds available to most school districts, the threat sensing system 100 is intended to be affordable and to be easy to use. Typically, schools do not have large technology budgets, nor can they afford complex technical installations and maintenance. Furthermore, and understandably, schools do not want the kind of obtrusive and intimidating technology that can turn their schools into a TSA-level security compounds. The eight objective of this threat sensing system 100 is to create the threat sensing system in such a way that it is, to the extent possible, inexpensive, unobtrusive, and rapidly deployable without professional installation. The setup process is simple enough that can be easy accomplished by school personnel or district IT staff with minimal instruction or assistance. Similarly, maintenance requirements are minimal and diagnostics can be performed remotely, if desired, to supplement system self-diagnostics. To achieve this objective, the threat sensing system 100 hardware is designed to be closely integrated with the existing power infrastructure inside the school building, including the use of electrical outlets and powerline carrier to communicate. As a result, no significant installation requirements are imposed and no external wiring is required. Instead, in accord with at least some aspects of the present concepts, the gunshot detection module needs only to be plugged into a convention electrical socket or light socket to operate. Furthermore, all setup and configuration is advantageously web-based, so as to avoid the need for school systems to download and maintain software on school computers.

Potential beneficiaries of the threat sensing system 100 include not only schools and school systems, but also institutions like hospitals, government entities, government office buildings, commercial entities, office buildings, apartment buildings, or even individuals (e.g., a home alarm system).

In the disclosed, school-based implementation, the users of the threat sensing system 100 are expected to include staff of each school in the school district and the school district staff themselves, teachers at each of the schools in the school district, school resource officers at each school (e.g., police or specially trained security personnel dedicated to schools that work for the school district), school district emergency management personnel (e.g., emergency manager), local 911 emergency management centers and police dispatchers, all local law enforcement officers (e.g., police, sheriff deputies, state police, etc.), EMSA personnel (e.g., emergency medical dispatcher, ambulance services, etc.), identified government officials (e.g., local FBI, State Police, Homeland Security, local SWAT teams, and bomb squads), government and media officials, and parents of the school children (limited involvement until after the event).

In at least some aspects of the present concepts, the threat sensing system 100 comprises three technology sub-systems (e.g., sensor and controller hardware, messaging software, and management software applications) and a communication system. The hardware sub-system comprises, for example, one or more gunshot sensors, remote automation controllers, and network communication controllers that can reside in each school. The Communications Server Process can provide the data connection between the specialized hardware located in schools and the threat sensing system 100 messaging and management systems running on the web and mobile devices. The threat sensing system 100 messaging sub-system can process alert messages received from the threat sensing system hardware, transmit and manage alert messages to the mobile devices of all affected parties. The threat sensing system 100 management sub-system comprises of a suite of databases, back-end servers, and web applications that can be used to (a) manage the hardware administration and user-base, (b) coordinate information dissemination and threat sensing system operation during gunshot events, and (c) manage the remote monitoring and maintenance of threat sensing system hardware.

Figure 7:
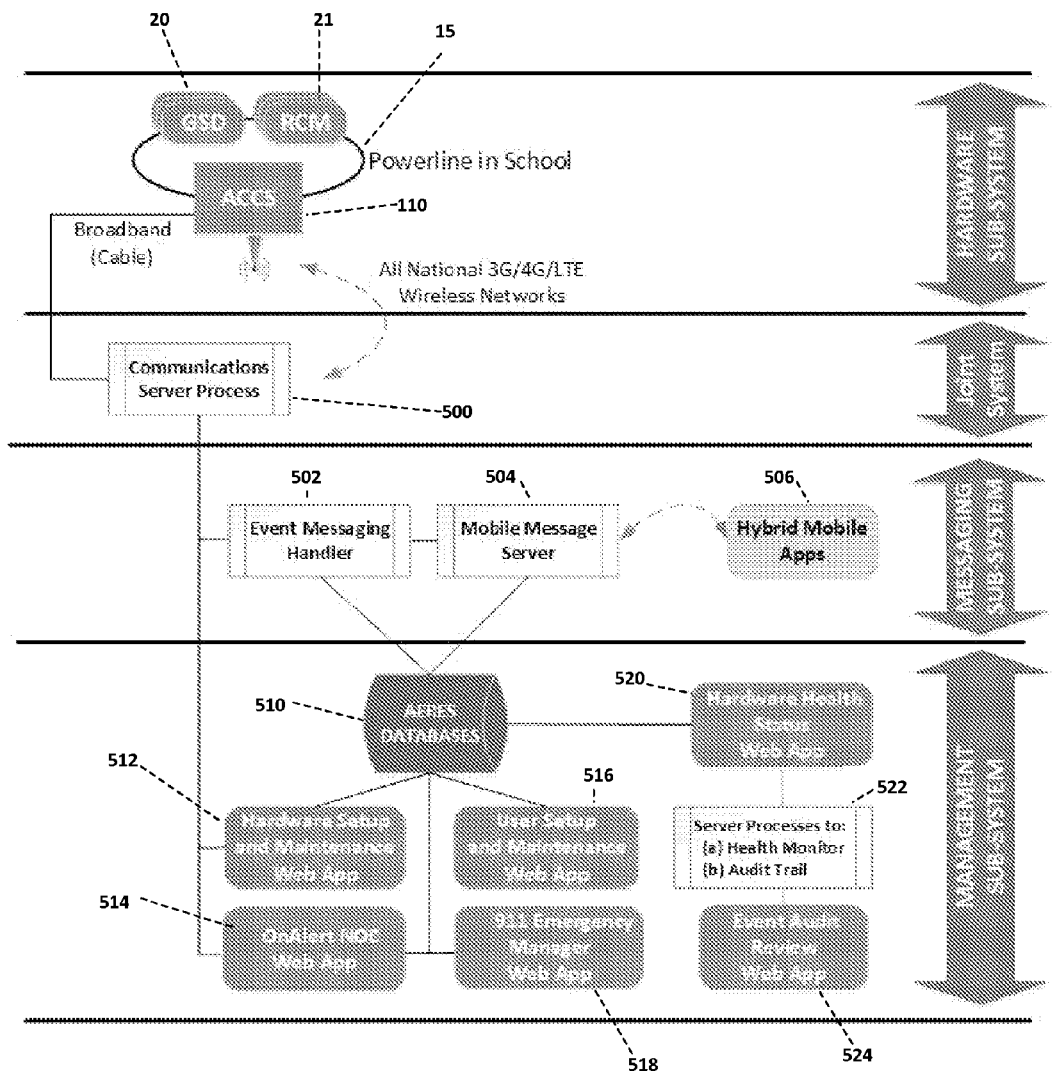
FIG. 7 shows an example of interrelated sub-systems of the threat sensing system according to at least some aspects of the present concepts.

FIG. 7 shows a representation of the components of the three threat sensing system 100 sub-system. The topmost sub-system is the hardware sub-system, which comprises the hardware, sensor, and communications components. The acoustic sensor(s) 20 (e.g., gunshot sensor device (GSD)) may comprise proprietary gunshot sensors or commercially available gunshot sensors that can be installed in customer locations. The sensor device package can be plugged into electrical outlets (e.g., 120 VAC outlets) for both power and data communications. Typically thousands can be installed for each customer, located in buildings dispersed over a large geographical area or region.

As previously noted, powerline communications may be advantageously utilized to enable communication over the existing powerline 15 within the building, with the powerline being used as a data network to transmit alert and administrative data between all the acoustic sensor(s) 20 within a building and a small command and communications server (e.g., system gateway 110) conveniently located inside the building. The threat sensing system 100 system gateway 110 is a small, specialized computer and communications gateway device that connects to the powerline 15 to not only receive power but to also gain access to alert data sent by the acoustic sensor(s) 20. This system gateway 110 performs functions including (1) serving as a communications gateway (or bridge) between the building's internal powerline data networks and the external public data networks that the threat sensing system 100 can use to reach the Internet (these public networks can consist of all the national wireless networks and broadband cable networks), (2) manage the network of threat sensing devices 10 in the building, and (3) issue data commands to effect control of a wide variety of electromechanical devices located inside the school, such as electronic locks and PA systems.

The hardware sub-system also includes a Remote Control Module (RCM) 21 that can be plugged into an electrical outlet to receive control signals from the system gateway 110. This module can use wireless (Zigbee, Z-Wave, and Wi-Fi) and hardwired connections to communicate with various devices such as electronic locks, lighting control systems, and PA systems. Doors can be locked, lights turned off, and pre-recorded PA announcements made via commands received from the system gateway 110.

FIG. 7 shows, below the hardware sub-system level, a joint systems level comprising a communications server process 500. This communications server process 500 can be used by all three sub-systems to access the data flow to and from the threat sensing system 100 premise equipment. This communications server process 500 can interface with all the different national wireless networks (e.g., AT&T, Sprint, Verizon, etc.) to transmit alert and administrative support data between each command and communications server and the threat sensing system 100 Internet Services Platform (described below). The communications server process is required because the national wireless networks are not an IP network. In effect, this process can allow us to spoof one IP dataflow over all the different wireless networks. Broadband connectivity is illustrated above as if it can also be focused through this server process.

Below the joint systems level is a messaging sub-system level that can include server processes (e.g., event messaging handler 502 and mobile message server 504) and hybrid mobile applications 506. As to the Event Messaging Server Process 502, the command and communications server 110 can push gunshot alert messages to this server process. This process 502 updates the event database and accesses the user and hardware databases. The information received from the command and communications server 110 and information gathered from the databases is used to create and format the alert message content to be pushed and presented to the different classes of alert message recipients. The message content can be both text and graphical in nature, with a schematic of the school overlaid by icons showing shooter location, text giving the name and address of the school, and color-coded information representing the path of the shooter, location of injuries, and status of lockdown by rooms within the school. The ID information in text and the graphical information in terms of maps, icons and color-coding within the map can be continuously updated. One "standard" message content format can pertain to the "first responders" class of message recipients and other classes of message recipients can receive sub-sets of the standard message format.

The Event Messaging Server Process 502 is responsible for receiving and processing event messages pushed by command and communications server devices in school buildings and uses the information received from the command and communications server 110 to update the event databases and invoke the other Messaging and Management server processes, as needed. It can also be responsible for building the graphical content of each message for each message class and building the different alert messages, tailored to particular user classes, using the gunshot event data it has received and data from the user base. It delivers the content packages it creates to the Mobile Message Server 504 and further to PC web pages used by network operations center personnel (e.g., manufacturer representatives), and the customer's 911 Emergency Management Center personnel.

The applications can be activated by receiving a push alert from the threat sensing system 100 Message Server Process 504. Only people who have been pre-authorized by the systems administrator for the school district can be allowed to download the threat sensing system 100 applications. The native mobile app can launch a mobile web page that can display the message content. In some aspects, there are seven different types of mobile users defined by the threat sensing system 100, with seven different sets of mobile web pages showing slightly different content. In one example, the seven different types of mobile users can receive information pushed to them via the hybrid mobile apps 506. Each mobile user of the threat sensing system 100 can download the same push app, but the app can trigger one of seven different mobile web interface, each of which can show slightly different information. The seven different mobile user types are referred to here as different message classes, as further described below. Class one and two, as described below, can receive all the information available, with the other classes receiving a varying sub-set of that information.

In the above example, Class One Messages comprise an Alert Message sent to 911, Emergency Management Center personnel and to the designated Gunshot Emergency Manager, who is most likely, but not necessarily, a law enforcement officer. User acknowledgement of receipt is required for a Class One Message. Class Two Messages comprise an Alert Message sent to all first responders, which can include designated law enforcement personnel, emergency medical personnel, and others like firemen or state and federal agents as selected by the customer in coordination with local law enforcement. User acknowledgement of receipt is required for a Class Two Message.

Class Three Messages comprise an Alert Message sent to all teachers and staff at the affected school. User acknowledgement may be required. Class Three Message Alert apps can also provide additional functionality permitting the teachers and staff to receive text instructions from the Threat Event Manager/Threat Emergency Manager and to send specific situational information to the Threat Emergency Manager about conditions in the school and in her/his classroom. Where user acknowledgement is required, an absence of a response could potentially indicate an inability of the recipient to respond. The Threat Emergency Manager is a person or persons working for local law enforcement or governmental emergency management center who is/are responsible for coordinating message traffic between the teachers and staff onsite and the first responders en route during a gunshot event. They can also be responsible for confirming the first response actions initiated by the threat sensing system 100.

Class Four Messages are informational alert message to selected government personnel (mayor, governor, and such) and to media and possibly others. No user acknowledgement required. Not all school districts can assign anyone to receive this category of message. Class Five Messages are informational messages to parents and spouses of children and staff in the affected school. No user acknowledgement required. This class of message may be used to send pick-up instructions after the event is concluded. Class Six Messages are non-gunshot related alert messages that the school district wishes to broadcast to parents of one or more schools (Class five and six messages go to the same people, parents, but for different reasons). The messages may deal with any type of emergency situation such as weather or school lockdown situation that requires the school to send information to all parents of a school or, like in the case of a tornado, several schools. No user acknowledgement is required. Class Seven Messages are the same alert message sent to Class Two Message recipients, but the recipients in this case are equipment manufacturer (OnAlert) personnel. No user acknowledgement is required. In fact a set of equipment manufacturer personnel can be notified of gunshot alerts for any of its customers.

The Message Server process 504 is used to issue the push alert to all alert recipients identified in the database for the school. The Message Server process 504 can manage the broadcast of the push alert and informational messages to and from mobile devices. It can interface with and broadcast over all 3G/4G/LTE wireless networks identified in the database for the city/county surrounding the school. It can wait for acknowledgements and report non-acknowledgments to the threat event manager's web page. This process 504 is responsible for broadcasting the gunshot push alerts upon receipt of a package of gunshot alert content packages from the Message Handler process 502. It accesses the user database to determine who to send the alert messages to, which class of message they are to receive, and what devices it can be sending to for each user. It is also responsible for ensuring the push alert was received by all designated mobile devices and for reporting any non-acknowledging recipients to the 911 Emergency Management Web Page in the Management sub-system.

The Multiplatform hybrid mobile apps 506 are intended for use on all smart phones and tablets with a market presence in the US and international markets, including iOS, Android, and Windows-mobile platforms. The app for each platform can receive the push alert from the Message Server Process 504, announce the need for attention to the mobile user, and then, when the user responds, it can bring-up the mobile web page appropriate for the class of recipient. This set of mobile apps for all types of mobile devices can receive push alerts from the Message Server 504, issuing a distinctive and clearly audible alert and present a brief message on the mobile users screen. When the mobile user presses the message on the screen, the mobile app launches the appropriate mobile web site for that user's designated Message Class. In some aspects, the user interface for the push alert can let the user acknowledge the receipt of the alert and indicate whether they are responding (self-dispatch), standing-by (waiting for police dispatcher to say 'go'), or not responding (each law enforcement group can designate some officers as self-dispatch and others as stand-by). The acknowledgement and response intent of each user is sent for display on the web page of the 911 Emergency Management Web application.

As far as the alert messaging, the alert message content can involve, by way of example, continually updated graphical images that can be constructed uniquely for each of class of message recipients (e.g., first responders would be one class, teachers would be another class, etc.) stipulated in the threat sensing system 100. Thus, each class is provided with the information most necessary for each user and formatted in a manner that facilitates ease of use and interpretation for the particular circumstances of each user. In addition to the alert messaging going to everyone, the teachers and staff at the affected school advantageously have extra functionality present within their message content. This functionality permits them to enter situational data and send it to emergency managers running the threat sensing system 100 web application in the 911 emergency management center. This added functionality also includes a display for instructions entered on the web by the emergency manager. To make the application more usable in a stressful situation, the additional functionality can be implemented with icons so users can easily communicate an emergency condition without having to compose a text message.

As previously noted, the mobile web pages advantageously superimpose shooter location, lockdown locations, and injury locations on the school schematic. The following example illustrates one potential, non-limiting classification system for alerts. Message Class One recipients can see all information about the school, the shooter(s), the weapon, the lock down areas, and the location of shooter on their mobile web page. They can also be instructed to launch the 911 Emergency Management Center Web app. Message Class Two recipients (first responders) can see the same school and shooter information on their mobile web page. They can receive continuous updates via the mobile web site as the situation progresses. Message Class Three recipients (teachers and staff) can see less information, just the school and shooter location information (and possibly the lock down areas) on the mobile website they can be accessing. The mobile web app for this message class can provide a more extensive set of pre-defined user responses presented as easy to interpret icons the user presses. A text box can also be available if the teacher or staff member wishes to send a text message to the Threat Emergency Manager.

Message Class Four recipients can see information that a gunshot has been detected at a certain school, but no details on the shooter or their location can be shown on their mobile web page. They can be instructed that they can receive more information when the event is done. The Threat Emergency Manager can enter this subsequent information from the 911 web app. Message Class Five recipients (parents) can only see gunshot emergency instructional information from the school district on their mobile web page. The Threat Emergency Manager or Systems Administration may enter any instructions they want to send to the parents. They can enter the parental instructions via an manufacturer's web page. Message Class Six recipients (also parents) does not pertain to gunshot alerts, but instead relates to other types emergencies, where the school needs to send instruction information to parents. In some aspects, the school can enter may enter any text message they want, any time they want. Message Class Seven recipients (manufacturer representatives) can see the same information as Class Two recipients. This class is unique in that they are not restricted in the database to pertaining to just one school district, they are message recipients for all school districts. In some aspects, Message Class 1-4 recipients are required to be pre-authorized by the school district's system administrator before they can be permitted to download the threat sensing system 100 mobile app. Parents (Class 5-6) can self-register.

At the bottom of FIG. 7 is the Management Sub-System, which includes the threat sensing system 100 Internet Services Platform, which comprises, in at least some aspects, the following server processes and web applications (1) AERES databases 510 for storing data about (a) users and their mobile devices, (b) each school's hardware devices, (c) each school's user base, (d) event data, and (e) audit date; (2) web application for school administrator to use in setting and maintaining their user base, including each user's message class and mobile information; (2) web application 516 for school administrator to use in setting up the threat sensing system 100 hardware base that is installed in each school; (3) web application 518 for 911 emergency management personnel, and the Gunshot Emergency Manager (GEM), to use in coordinating the response to gunshot events; (4) web application 514 for system manufacturer personnel to use in monitoring all customer hardware installations and any gunshot event; (5) web application 520 for schools tech support personnel to use in reporting and maintaining the health of the hardware installed in their schools; (6) web application 524 for general use that can display the event audit data along a time-line; and (7) back-end server processes 522 to (a) monitor hardware health and (b) record event audit trail.

Regarding the AERES database 510, each customer (e.g., a school district) can have a database pertaining to (a) users, their message class and device types, (b) threat sensing system 100 hardware components installed in each school, (c) administrative information (i.e. school addresses, school building schematics, the teachers and staff of each school), (d) gunshot event data, if and when that occurs, and (e) audit information collected during a gunshot event.

As to the User Setup and Maintenance Web Application 516, this web application is run by a system administrators designated within each school district and can be used to setup and maintain the authorizations and user identifications for all users within the school district and local law enforcement (including school teachers, school staff, various local law enforcement personnel, other first responders and interested parties, like mayors). The school district can assign a system administrator whose job is to enter, change, and delete user and device ID information, creating usernames, assign users to message class, and other authorization information. Each mobile app user of the system can be authorized via this web app. Other pages in this web app can include, for example, a page where the system administrator can enter and broadcast a Non-gunshot instructional message to parents (class 6), a page where the pre-authorized mobile users can launch the download process for mobile apps, a page where parents (message class 5 and 6) can self-register and download the app, As to the Hardware Setup and Maintenance Web Application 512, this web application is run by system administrators designated within each school district. It can be used to setup and maintain the information needed to identify the school and room location of each threat sensing device 10/Remote Control Module 21 that has been installed in the school district. It can allow school schematics to be updated for each school in the school system or district.

The Network Operating Center (NOC) Web Application and Server Process 512 can be used by the manufacturer's NOC Operators within the manufacturer's facilities. The web app can display a map that the NOC operator can drill down by school district to see the operating status of every command and communications server 110, threat sensing device 10, and communication link installed by all the school systems using threat sensing system 100. The operating status of all installed threat sensing system 100 devices is acquired from the diagnostic database created by same health-check server process described above. Another associated server process can monitor and test the security status of all the devices, the network, and Internet server systems for the user base, displaying this security status on the NOC web page. Security monitoring can involve all of the system, including physical components, operating processes, network communications, data, and databases. Finally, if a gunshot event happens in any customer school or facility, the NOC website sounds an alarm in the manufacturer's building and displays a diagram of the school and shows the status of the shooter and location. A final server process logs and stores all message traffic and actions conducted by the AISP for subsequent evaluation and audit purposes.

Regarding the 911 Emergency Management Center Web App and Server Processes 518, this web app can used by the customer's 911 or other emergency management center and the Threat Emergency Manager designated by the customer. The 911 EMC website can be operated by the customer anywhere they wish, such as in a 911 center, police dispatch office, or other emergency management facility. The Threat Emergency Manager and others designated by the customer can receive an Alert Notification via their mobile devices at the same time the first-responders are receiving their push alert. The Threat Emergency Manager can know to bring-up this web page when they get this push-alert. The web application can show the alert message with the school diagram and location of the shooter as well as all other information sent in the gunshot alert message. It can show the status of the first responders (via acknowledgements from the mobile apps and maybe from GPS of mobile devices) and send and receive messages from the teachers and staff at the affected schools. The Threat Emergency Manager is supposed to read and send messages and the teachers and the first responders, coordinating actions as needed.

As to the Hardware Maintenance Web Application 512, the data for this web page can be derived from the health-check server process that runs every day (or more) to initiate and report on the results of self-diagnostic routines that can be run in all command and communications server 110, threat sensing devices 10, and RCMs 21. This web application can be used by a technical support person(s) designated by each school district. This web app displays the operating status of every command and communications server 110, threat sensing devices 10, and RCM 21 in the school district and the status of the communication network. The web page can also provide a simple "trouble ticket: like process the school district's technical support person for managing the unit replacement process efficiently.

For the After-Event Review Web Application 524, data to be displayed in this web app is created by the Event Audit backend process and this web application can be used by senior school, police, and manufacturer personnel to review how well the threat sensing system 100 worked after the adverse event is over. The police and emergency management personnel may use it the web app to see how well their procedures worked. In addition, a new set of "legal" users may be authorized to see the web application to support any subsequent legal proceedings. This web application may not need to be done in order to release the system, but can need to be done soon after release.

Figure 8:
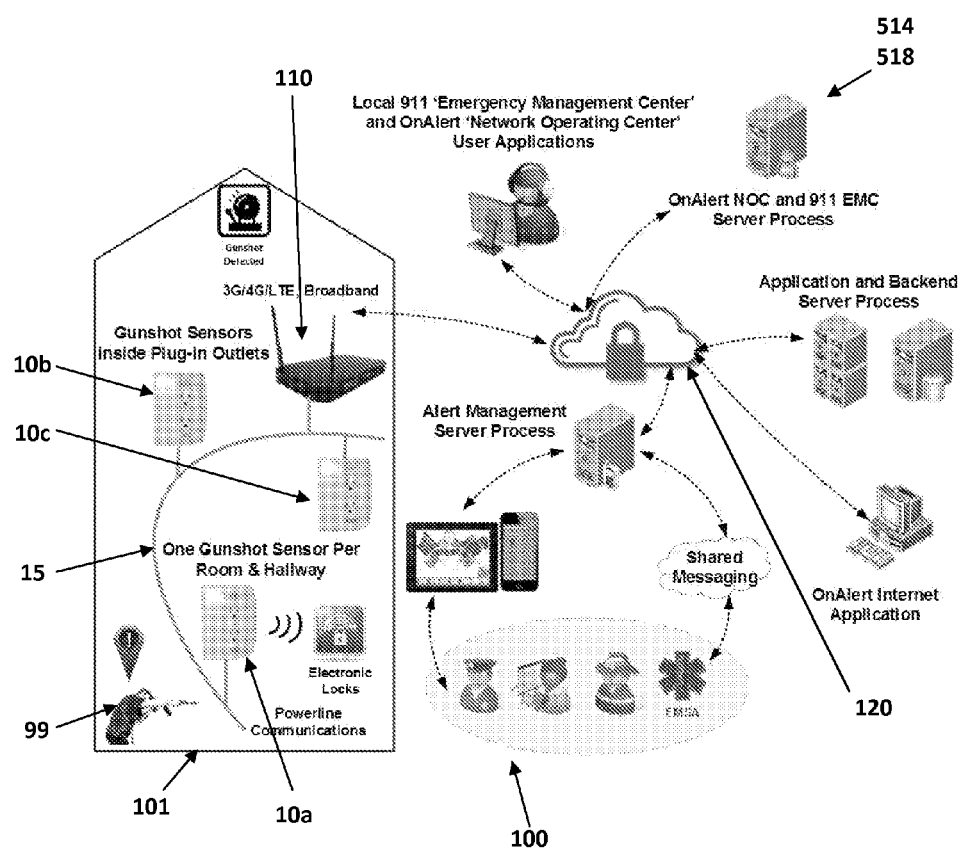
FIG. 8 shows a representation of a school-based threat sensing system, comprising a plurality of threat sensing devices, according to at least some aspects of the present concepts.

FIG. 8 shows another aspect of the threat sensing system 100 illustrated in FIG. 2A implemented in a school 101. In FIG. 8, the threat sensing system 100 comprises a plurality of threat sensing devices 10a, 10b, 10c connected through a powerline communication 15 to a system gateway 110. Threat sensing device 10a is shown to wirelessly communicate with electronic door locks so as to lock the associated door(s). The system gateway 110 communicates with the Internet 120 via 3G/4G/LTE or Broadband, or other wired or wireless communication system (e.g., POTS). A Gunman 99 is shown in the lower left of the school 101. In the school 101 is depicted one gunshot sensor 10 (i.e., threat sensing device 10 comprising one or more acoustic sensor(s) 20 functioning as gunshot sensors) per room and one per hallway, the gunshot sensors being electrically connected to 120 VAC outlets. From the internet 120, communications are routed to the local 911 Emergency Management Center and OnAlert Network Operating Center user applications, the OnAlert NOC and 911 EMC Server Process, Application and Backend Server Process, OnAlert Internet Application, and Alert Management Server Process.

In some aspects, the threat sensing devices 10 comprise dual-band Power Line Carrier chipsets.

Further to threat sensing device 10 push notifications to a system gateway 110 (to command and communications server) responsive to sensing of an adverse event (e.g., a gunshot) via a communication pathway (e.g., powerline communication, wireless communication, etc.), the threat sensing device may await receipt confirmation from the system gateway and, if not receipt conformation is forthcoming within a predetermined period of time (e.g., SCADA like communication handshakes, alert confirmation and message validation), the push notification is retransmitted. In other aspects, the system gateway 110 is configured to sequentially, or in some other order, poll each of the threat sensing devices 10.

In at least some aspects of the present concepts, the threat sensing devices 10 are configured to transmit to the system gateway 110 a message stating in essence "I'm functioning properly/ready to pair" and providing a hardware address at first-discovery after being plugged into the power source/outlet (e.g., wall socket). All outlets regularly receive time synchronization data from the system gateway 110 so that all outlets operate on same time scale. As previously noted, the input/output ports 16 of the threat sensing device 10 may be used to send and receive data externally to and from some external device (e.g., a sensor, a motion sensor, an output device, a countermeasure, etc.). Thus, any data output from the external device would be sent to the system gateway 110 through the threat sensing device and data or instructions sent from the system gateway would be relayed to the external device through the threat sensing device.

In accord with at least some aspects of the present concepts, the threat sensing devices 10 comprise a gas sensor 30 that is able to provide, in essence, a sense of smell, to complement the other sensors deployed by the threat sensing device. In a gunshot detection configuration, the threat sensing devices 10 comprise a sensor suite able to detect sound (e.g., microphones), pressure (e.g., acoustic sensor), and smell (e.g., gas sensor). Image sensors (e.g., IR sensors, video cameras, cameras, etc.) can further be used as part of such sensor suite to further complement the sound, pressure, and "smell" sensors.

As indicated above, the gunshot sensor device pushes an Alert Message to system gateway 110 when the sound and pressure sensors detect a gunshot or receives and responds to a poll request from the system gateway, thereafter providing the Alert Message. Likewise, a second alert message can be pushed to the system gateway 110 when certain one or more certain gases (e.g., NOS) are detected ("smelled") by the gas sensor(s) 30 following a gunshot or the threat sensing device 10 receives and responds to a poll request from the system gateway, thereafter providing the Alert Message regarding the adverse event gas detection. If one or more sensors (e.g., gunshot sensor 20, gas sensor 30, etc.) of one or more threat sensing devices 10 determine a gunshot has been detected a message formed that contains the relevant sensor data for all of the sensors that are triggered. The message is time stamped at message creation time and transmitted immediately (or can wait for next polling). The time can be as accurate to as many decimals points as possible Regarding gunshot detection reporting, the threat sensing devices 10 can transmit a new message every time a gunshot occurs. If an automatic weapon were to be involved, many shots could be fired per second, in which case the gunshot sensor device only needs to generate a gunshot message over some period of time, like 1 or 2 seconds, and indicate in the message how many shots were fired in that interval. Then resend every few seconds as shots are continued to be fired. In at least some aspects, a gunshot alert messages includes an ID of the threat sensing devices 10 and/or specific sensor thereof registering the gunshot and the number of shots registered in a predetermined window (e.g., 2 seconds). In response to a shooting, many threat sensing devices 10 in the building will likely transmit a gunshot alert, but each may indicate a slightly different time stamp, as well as different data for flash and pressure sensors that reflect different intensity levels.

Either the threat sensing devices 10 or the system gateway 110 (aka command and communications server) calculates an acoustic or pressure (or other) sensor intensity rating on some scale for comparison to stored reference data. If the system gateway 110 is configured to perform these calculations, the threat sensing devices 10 are able to simply transmit raw data to the system gateway. If the threat sensor device is configured to calculate such an event rating number, this determined result alone (i.e., all of the data need not be sent) can be sent to the system gateway 110 for comparison thereby to the other rating numbers coming from other threat sensing devices 10 perceiving (e.g., "hearing," "seeing," and "smelling" the same gunshot). The system gateway 110 can use the highest "rating" reporting gunshot sensor device to determine the location of the shooter.

The threat sensing devices 10 and/or the system gateway 110 collectively store all the data-points collected for each of the sensors for each of the threat sensing devices. Since multiple gunshots can be required to be detected and since different weapons could be used, the threat sensing device 10 desirably is provided with enough memory to store many different sets of detailed gunshot data points for each event. Multiple shooters could be present, so multiple threat sensing devices 10 could be sending gunshot alerts about two distinct shooting events in progress. If the threat sensing devices 10 in two rooms detect gunshots and the pressure wave and/or IR sensors are triggered in two separate threat sensing devices 10, that is likely an indication of two shooters. The system gateway 110 can calculate or estimate if there are one or two shooters by logical processes and procedures (e.g., relating time and sensor data to location and time of gunshots, which may include sensor position as well, as multiple sensors could pick up the same event, particularly with overlapping coverage).

At some point, the system gateway 110 sends an "Event Over" message to all threat sensing devices 10 instructing them to "reset" and store the gunshot data just collected in local archive memory, in addition to storage of the same data on the servers. (Local archiving may be necessary for possible future forensics or legal proceedings that may require an audit of all data from the source).

In accord with at least some aspects of the present concepts, internal diagnostics for each of the threat sensing devices 10 are used to monitor and test each component and sub-system of each threat sensing device to determine if the sensors, communications, and safety features are working properly. This internal health check function could be conducted upon a "health request" poll from the system gateway 110 and a report on the results of the health check sent back to the system gateway. In testing the threat sensing devices 10, the gunshot sensor device may optionally be programmed to recognize a specific sound or waveform as a simulated gunshot signal and trigger test alert messages for testing. This feature could avoid the need to fire a real gun in a school, although a real gunshot test can conducted periodically in addition to such a simulated test. For full functional testing using actual gunshots, the system gateway 110 can be used to send messaging in advance of such testing to ensure that every recipient well knows that a test is about to occur and let either the TDOs in the schools or the system gateway know it is in a "drill/simulation" mode so it works normally but appends, at the very least, "drill/simulation" to its messages to the command and communications server.

As noted in relation to FIG. 4, a threat sensing device 10 may be integrated into an LED Fixture ("GSL") and may further comprise an infrared gunshot sensor embedded into such LED light fixture. The sound, pressure, smell, and IR gunshot sensors can also be embedded into such LED light fixture. As previously noted, the LED fixture-based threat sensing device 10 can screw into any existing light bulb socket and can be used to detect gunshots in areas where no electrical outlets exist.

Turning to the system gateway 110, the system gateway is able to be plugged into a conventional wall socket in any office in the school building. Typically only one system gateway 110 is needed per building, but a plurality of system gateways could be utilized. The system gateway 110 receives gunshot detection alert messages from threat sensing devices 10 in the building via the powerline 15 in the building and through its power cord plugged into the wall. The system gateway advantageously comprises multiple external wide-area network connections and a RJ45 connector and Ethernet network operating capability, or the like. So configured, the system gateway 110 is able to communicate through most broadband networks that may be available in the school, such as Cox Cable, DSL, or Wi-max. The system gateway 100 also advantageously contains a 3G/4G/LTE wireless modem that can broadcast over the Priority Channel offered by most carriers and can communicate over multiple national carriers such as AT&T, Sprint, and Verizon.

A static IP address may be needed for each system gateway for use with broadband, although DHCP could also suffice and, if used, the address would need to be entered during setup.

When the system gateway receives gunshot alert message it confirms the validity of the message and then broadcasts the alert over all available wire-area network connections to the manufacturers Internet Services Platform (AISP), described below. As previously noted, if the system gateway receives multiple gunshot alert messages from the same threat sensing devices 10 in rapid succession the system gateway 110 can, in lieu of multiple rapid broadcasts, broadcast one Gunshot Alert Message over the broadband and/or wireless network, with that one message indicating how many gunshots were fired in succession.

The system gateway 110 is not to be unplugged. If power to the system gateway goes out, the system gateway can report that the fact to both the 911 emergency management web page and the maintenance web page. The school district's technical support person(s) can be sent an alert message. An alert would appear in 911 webpage so the 911 people can determine if power is out through out that part of the city or if only the school's power is out, the later condition can raise a red and police can be dispatched.

Each system gateway 110 has a unique hardware address and this address is used in the school setup process so the website user can map each system gateway's physical address to a school name and ID. Big schools can have more than one building and each building can likely have a system gateway, so in addition to the school name the setup process can also identify the building number and possibly a floor number or even zone on a given floor depending on the size of the building, to sufficiently identify the system gateway location.

The system gateway 110 includes self-diagnostic logic to detect and report trouble within the electronics and communications components. In some aspects, the system gateway 110 comprises a physical reset button and/or a USB port for configuring IP addresses or for running diagnostics and program updates if remote diagnostics and updates fail to work.

As can be appreciated, the system gateway 110 can become very busy and needs to react quickly. As a result, it is provided with one or more fast processor(s) together with a large amount of RAM and non-volatile memory. It can need a reliable operating system, such as Linux or one of its derivatives. A GPS module maybe needed for time stamping and future E911 texting.

The system gateway 100 is desirably able to update its own operating software over the network and from both the manufacturer's AISP (Internet Service Platform) and locally through the USB port.

As to communications, the threat sensing system 100 system gateway 100 advantageously utilizes Ethernet ports and a 3G/4G/LTE interface to enable use with any broadband connection the school might have. Optionally, a multi-band/multi-carrier board or capable of handling the interface board of each individual wireless carrier is provided to enable the system gateway 100 to communicate over most of the widely used wireless carriers in the US and over the widely used international wireless carriers. External wireless or broadband communications are intended for sending information to and receiving information from the manufacturer's Internet Service Platform ("AISP", as described below).

As one option, an emergency broadcast radio is provided separate from the system gateway 110, and connected to the system gateway via a connection port.

Gunshot alert messages to mobile devices and alert information sent to manufacturer's AISP can be transmitted over the emergency priority channels that AT&T and the other national wireless carriers offer. Normal-priority wireless transmission can be used for non-emergency Threat sensing system 100 product setup and maintenance information that the system gateway can be transmitting to the AISP. The system gateway 110 is desirably able to communicate gunshot alert messages via at least two available methods or carriers, include broadband and wireless, or two different available wireless carriers. The system gateway 110 can continue broadcasting until it receives acknowledgement from specified parties (e.g., the AISP).

Regarding general setup and maintenance of the system gateway 110, the system gateway desirably regularly polls each threat sensing device 10 to solicit a health-check response. In at least some aspects, the system gateway 110 is configured to transmit health-checks daily to the manufacturer's AISP for record storage and display on the manufacturer's NOC 514 (Network Operations Center), shown in FIG. 7. A back-end process can be provided to catch these health reports and update the database, which is fed into the customer's Maintenance Web application 516 and manufacturer's NOC, so action can be taken.

Between all nodes in the threat sensing system 100, secure SCADA like communication handshakes, alert confirmation and message validation can be used between the threat sensing device 10 and system gateway 110 and the "Message Handler" server process 502.

After being plugged-in each system gateway 110 transmits an "I'm online" message to the Setup backend process in the AISP along with its Media Access Control address (the system administrator at the school district can go online and enter that system gateway's school identity information). After the backend setup routine acknowledges the system gateways "I'm Online" message and creates the necessary database entries for a new gateway. The system gateway can keep transmitting its "I'm online" message until the backend process acknowledges.

As indicated above, the threat sensing devices 10 can broadcast their own "I'm alive" message to the system gateway as soon as they are plugged in a power outlet. The system gateway 110 can begin acknowledge the messages from the gunshot sensor device and store and forward all the threat sensing device's Media Access Control hardware addresses to the Setup Backend process. The school's system administrators can use the manufacturer's website to enter needed ID information for each threat sensing device.

After the system gateway 110 and associated threat sensing devices are stored in the database, the school district's system administrator can ID each outlet/socket to which the threat sensing device is connected, identifying each by its school name, room number, and room type (i.e. "second grade classroom"), or zone location (i.e. "east end of south hallway"). If the outlet/socket is in a classroom, the administrator can also input the typical number of kids in that classroom during different school hours or periods. To provide this information, the installer can note the Media Access Control address and the location each unit they install on a manual report that he/she can give the System Administrator.

The system gateway 110 is also advantageously configured to automatically recognize when a new threat sensing device 10 is added or when an existing threat sensing device 10 is removed and pass on that fact to the AISP.

Regarding gunshot alert messaging, the system gateway 110 can either poll each threat sensing device in the school for gunshot alerts or the threat sensing devices 10 can push gunshot alerts to the system gateway. During a gunshot event, many threat sensing devices in the school can be reporting a gunshot to the system gateway at nearly the same time. In addition, since many shots are typically fired by active shooters, many threat sensing devices can be reporting continuously. Once a gunshot alert message is received and processed by the system gateway 110, the system gateway transmits a gunshot alert message, along with all the needed information, to the AERES Internet Service Platform (AISP) and then the Message Server in the AISP can transmit the Gunshot Alert notice content to the first-responder's and everyone else's mobile devices.

The data transmitted to the system gateway 110 from the threat sensing devices 10 can be retransmitted to the ASIP to use in calculating the type of weapon involved in the shooting. All gunshot detailed data points from all threat sensing devices can be stored locally as well as forwarded to the AISP. The system gateway 110 transmits the alert message with threat sensing device Media Access address to the manufacturer's AISP. The AISP can determine what room(s) is/are involved and room or zone information, as well as the type of weapon(s) being fired to the manufacturer's AISP. Every time a new gunshot alert message is received from a threat sensing device by the system gateway 110, the system gateway can transmit the alert message to the AISP, always reporting it as one or multiple shooters. Since many shots could be fired rapidly from one or two shooters, is can be practical to configure the threat sensing devices to send, rather than a discreet message for each gunshot, a message every couple of seconds indicating in the message how many shots were fired in a given interval. The system gateway receiving these messages every couple of seconds, can forward each message in succession to the manufacturer's AISP. Eventually, the system gateway 100 receives an "Event Over" message from the manufacturer's AISP. The system gateway 110 confirms the message with the AISP and then resets and stores all event data in its own archives (the threat sensing devices 10 are also storing the sensed data and the AISP servers are also storing all the data). The system gateway 110 can also broadcast the "Event Over" message to each threat sensing device.

As discussed, two (or more) threat sensing devices 10 in different rooms or zones could report to the system gateway 110 that gunshots were detected at roughly the same time. In this case, either the system gateway 110 in the school can determine if more than one shooter is active, or the AISP can make such determination. A time-based algorithm can be run to determine if one shooter is moving to different rooms or two shooters are active in two different rooms. If more than one shooter is active, separate streams of messages can be forwarded to the AIS for each shooter, with each message in each stream of messages indicating "Shooter One" or "Shooter Two," and so on.

As to shooter containment procedures, the system gateway 110 is advantageously configed to issue commands to various devices inside the school, such as automated door locks, audio alarms, and lights. As previously mentioned, the system gateway can communicate with various devices over the powerline communication 15, via wireless (e.g., ZWave or Zigbee, Bluetooth, WiFi, etc.), or by analog or digital control lines.

The remote control module 21 (see FIG. 7) can look similar to the threat sensing device, but it may not contain the gunshot sensor(s). Instead it can embed a set of remote control and power safety capabilities. In some aspects, the RCM 21 is plugged into a convenient outlet in the school (e.g., near the schools PA system and/or automated locks system). Both hardwired and wireless analog and digital control signals can be issued from the RCM 21. Like the threat sensing devices 10, the RCM 21 is a fully functioning retrofit electrical outlet that plugs into an existing in-wall electrical outlet and may include sensors, such as heat and moisture sensors configured to report to the system gateway 110 over the same powerline carrier 15 or other communication device (e.g., ZWave or Zigbee communication electronics). The Zigbee/ZWave radio is able to transmit wireless control signals to a wide variety of different external electronic and electrical devices inside a school building (like electronic locks, security cameras, access control cards, alarms, light switches). In fact, any such external device that is designed to be capable of being controlled remotely through a Zigbee/ZWave based local area wireless network may be accessed by a RCM 21.

The RCM 21 can be capable of turning on and off the power being generated through any of the two power ports by command sent from the system gateway. With this capability any device plugged into the RCM 21 for power could be turned off and on by the system gateway The system gateway would be programmed to issue power-off commands to selectively addressed RCM 21 outlets automatically if gunshots detected. The Manufacturer Web Interface that the school district uses can have an interface to define what outlets are to be turned off if a gunshot occurs. The RCM 21 stays off until the "Event Over" command is sent to all threat sensing devices 10 and RCM 21. Software on the RCM 21 to discontinue power flow through either or both power ports upon receipt of a command from the system gateway. Send a time-stamped confirmation to system gateway that power was indeed discontinued. Another command from the system gateway can restore power flow. Send a time-stamp confirmation that power has been restored to the port(s).

The threat sensing system 100 Message Handler ("MH") 502 (see, e.g., FIG. 7) AISP process can manage the message communications between the installed system gateway(s) 110 and manufacturer's Internet Servers. It can use the CSP to connect to send and receive data from all the different wireless carriers and broadband service providers and can send and receive data from the other processes in the AIS, like the Health Check backend process, that has to send receive message data from system gateways. The Message Handler 502 shall receive the gunshot alert messages from the system gateway 110, update the event database, process the content and pass on pertinent data to the message server 504 and other server processes within the AIS. The Message Handler 502 can send and receive IP data streams directly via broadband IP networks and via 3G/4G/LTE wireless networks through the CSP. In some aspects, multiple servers and multiple instances of the Message Handler 502 can be running at all times to ensure receipt of any gunshot alerts from the system gateway(s) 110.

The status of this communications process can be continuously monitored by the Network Operating Center 514 ("Network Operations Center") server and that status can be prominently displayed in the Network Operations Center webpage for continuous display.

Wireless carriers may not provide an IP connection between the system gateway and the Message Handler process. This process can use the CSP to get data to and from the system gateway A broadband connection can be available and used by most system gateways, so this process can send and receive IP data directly via broadband.

Multiple wireless and broadband connections can be used by the system gateway to send the same event data to the Message Handler 502 to provide a high degree of redundancy to ensure receipt of gunshot alert messages from the system gateway 110. The CSP filters this multiple-carrier redundancy and sends on only one stream of data to the Message Handler. Once the affected system gateway 110 receives the acknowledgement message from the Message Handler 502 running in the AISP, it can immediately transmit a 'Confirmation Message' back to the Message Handler in the AISP. The Communications Process in the AISP does not react any further until it has received this confirmation. Once the Confirmation Message is received by the Message Handler 502, the Communications Process effectively 'Declares an Emergency' to the AISP by issuing an Emergency Notice to the Alert Message Server ("AMS"—described below). The content of the Emergency Notice can include the data sent from the system gateway 110, including ID of the reporting system gateway 110, the room/zone number of the active shooter, the type of weapon involved, the number of shots fired, and the exact time of the shot or the first shot if a series of shots is being reported, as well as whether more than one shooter appears to be active.

The system gateway 110 can transmit an ongoing series of gunshot notification messages to the Message Handler 502, one message every time a gunshot is detected, or as an aggregate, as previously noted. Each subsequent gunshot alert message that is received from a system gateway is acknowledged by the Message Handler 502 and a new Emergency Notice message is sent to the Alert Message Server only after a Confirmation is received back from the system gateway (to help avoid a hacker pushing a false message to the AIS). If the continuous acknowledgement and confirmation message traffic starts to slow down responses to the First Responders, the system could discontinue full handshaking after the first Acknowledgement and Confirmation. The Message Handler 502 can keep monitoring the carriers, acknowledging messages, and forwarding Emergency Notices until an "Event Over" message is sent to it from the Gunshot Emergency Manager running the threat sensing system 100 911 Emergency Management Center web app 518. The Message Handler 502 can also forward that 'Event Over' message to the affected system gateway 110.

The Alert Message Server (AMS) process can receive an Emergency Notice from the Message Handler 502 and acknowledge receipt. This message from the Message Handler 502 can contain the system gateway ID and the gunshot information sent from the system gateway. In at least some non-limiting aspects, the AMS can format and send five (5) classes of messages (mobile and auto-call) to different classes of message recipients, delineated as follows. Class-One messages go to "Threat event manager" web application running in customer selected emergency management agencies or centers in the customer's city or county. Class-one messages also go the mobile device of persons designated, by the customer, as the "Emergency Event Manager." One or several agencies could be notified, by various automated communication processes, as configured by each customer. They can receive all active shooter information about and can receive that information at the highest wireless transmission priority. Class-Two messages go to the mobile devices of all first-responders and School Resource Officer's, as designated by the customer. They can need all active shooter information about the event at the highest transmission priority.

Class-Three messages to the mobile devices of the teachers and staff at the affected school. They may not need (and the school may not want them to have) all the information the first responders receive, as explained later. Their transmission priority is just as high as the first-responders. This app can be significantly different than the app for first responders. The two apps are described in the following mobile app section. Class-Four messages go to the mobile devices of customer selected school district, government, and media stakeholders who need a moderate amount of information, but don't necessarily need the information with as high of a transmission priority. Class-Three messages are one-way and do not include in peer-to-peer messaging process described below. Class-Five messages go to the mobile devices of parents, other adults designated as responsible for children at the school, and spouses or other designated significant others. This is an optional category that schools may or may not use. This class can receive a notice that the school is in lockdown and that they are to stay away until notified otherwise. In addition the Emergency Manager may send an informational message to this Class at any time. This feature is covered in the "911 Emergency Management System" task. The Threat sensing system 100 Administrator appointed by each school district can be responsible for identifying and entering data on all users and their "Class" during system setup and in the course of ongoing administration.

The AMS creates, transmits, and verifies receipt of messages to all users' mobile devices and the local 911 emergency management centers. During a gunshot event, all messages to and from schools, law enforcement and all other users are time-stamped stored in the server to form an audit trail. The AMS manages all gunshot alert communications with the Stakeholders and coordinate all responses, as described in the functional and technical specifications described below. The AMS can recognize and tailor its responses according to customer type (school, office building, and individual home) and the individual preferences of each customer. For example, gunshots in schools and other soft-target institutions can notify and trigger all the responses to all stakeholders, by default. Each school system and the local police can configure the threat sensing system 100 to include or exclude certain user and to limit or direct the communication of certain stakeholders (which can be described later in this document).

Gunshots detected in government and commercial offices can notify 911 and trigger responses from assigned law enforcement and emergency medical teams, but with a lesser scope of external engagement than would be implemented in a school-based shooting. Similarly, a gunshot in an individual home can notify 911 a still more local response by police and an ambulance assigned to the area in which the individual's home is located.

The system gateway ID can be used to determine what set of users are to receive alert messages and what class of message each are to receive. From the database, the ID can identify (a) city, (b) set of corresponding first responders and other classes, (c) the school affected, (d) the teachers and staff of the affected school, (e) school district stakeholders that are to receive the alert messages and (f) the local, state and Federal government (e.g., State Police, Homeland Security) that want to receive alerts, and other identified user identified by the customer that are to receive the alert messages. From database determine which type of mobile or PC device for each stakeholder to receive the alert message, so the system can format the message properly for their screen. The make and model of mobile device can also be entered in the database.

When an "Event Over" message is received from the designated "Emergency Manager", (which the Manager sends through the manufacturer's web application running on a PC within the customer's 911 emergency management center), the AMS can format a final message to be sent each Message Classes declaring the event over and passing on any final messages.

The purpose of threat sensing system 100 disclosed herein is to reduce the appalling effects of gunshot violence in schools. In a broader sense, the intent of threat sensing system 100 is to minimize casualties and deaths when shootings occur inside a school or building.

Figure 9:
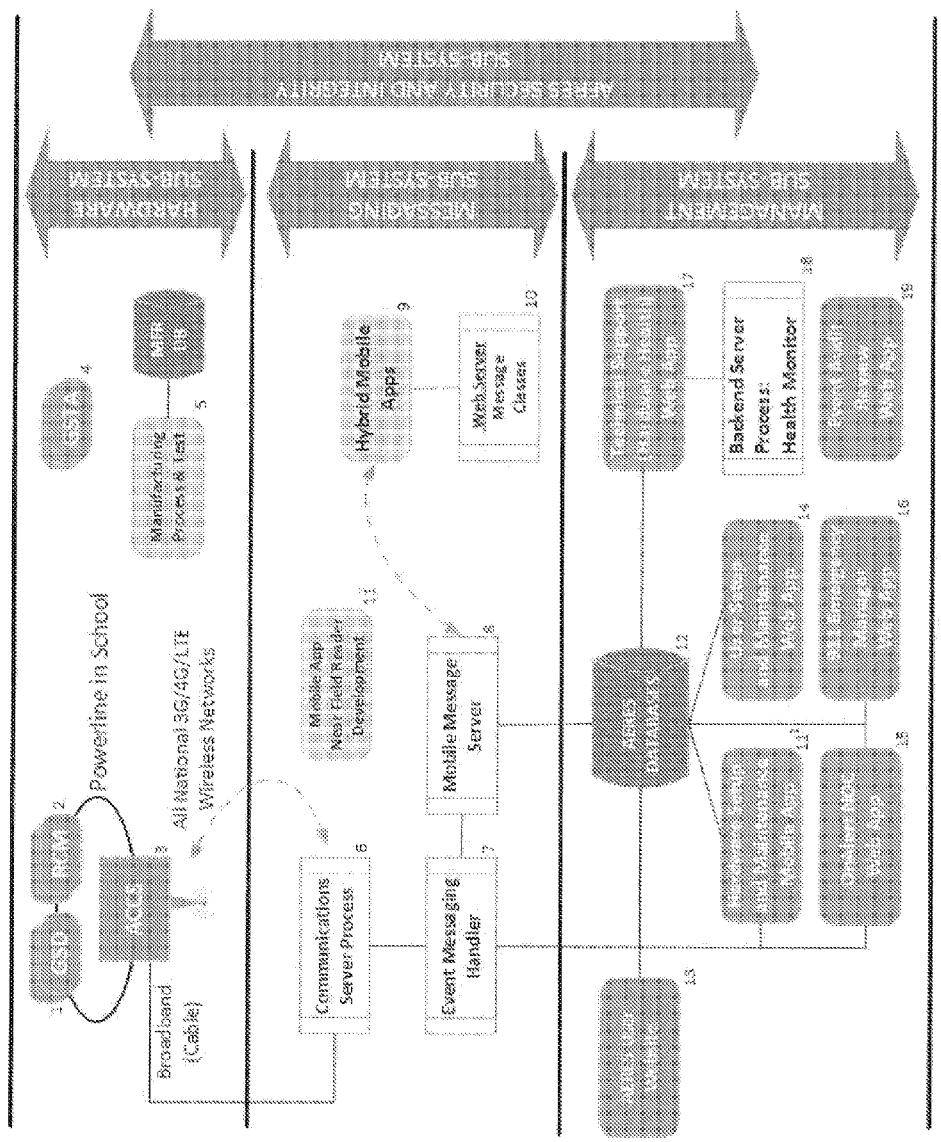
FIG. 9 shows an example of interrelated sub-systems of the threat sensing system according to at least some aspects of the present concepts.

The threat sensing system 100 involves, as shown in FIG. 7, for example, four technology sub-systems, a hardware subsystem, a joint system, a messaging sub-system, a management sub-system or, as shown in FIG. 9, for example, a hardware subsystem, a messaging sub-system, a management sub-system, and an integrity and security sub-system, which includes design and software elements embedded in the hardware, messaging software, and management software. As discussed previously, the threat sensing system 100 hardware sub-system can comprise, for example, gunshot sensors, remote automation controllers, and communication controllers that can reside in each school and the messaging sub-system is configured to process alert messages received from the threat sensing system 100 hardware, transmit and manage alert messages to and/or from, as appropriate the mobile devices of all affected parties.

Figure 10:
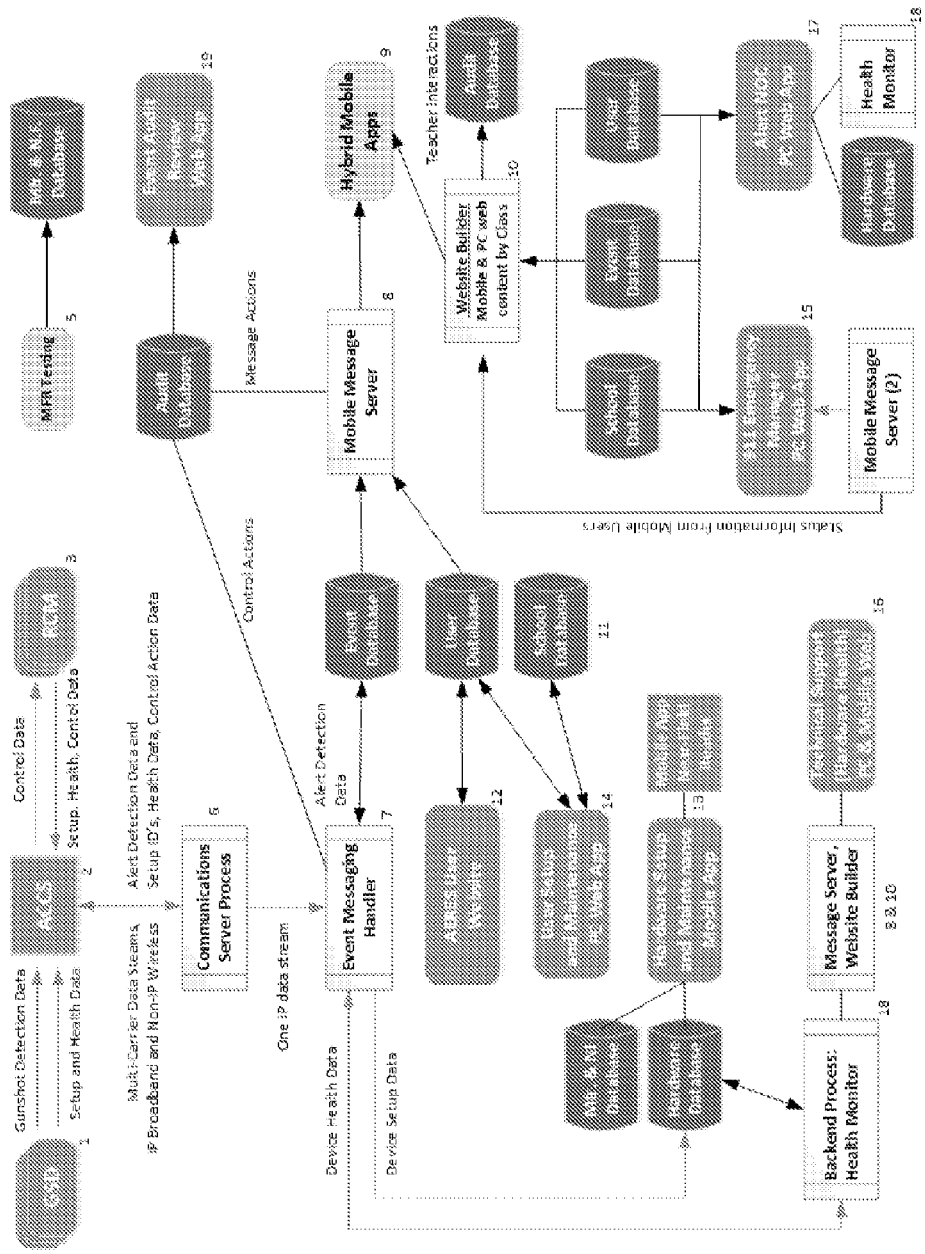
FIG. 10 shows an example of a component data flow diagram according to at least some aspects of the present concepts.
Figure 11:
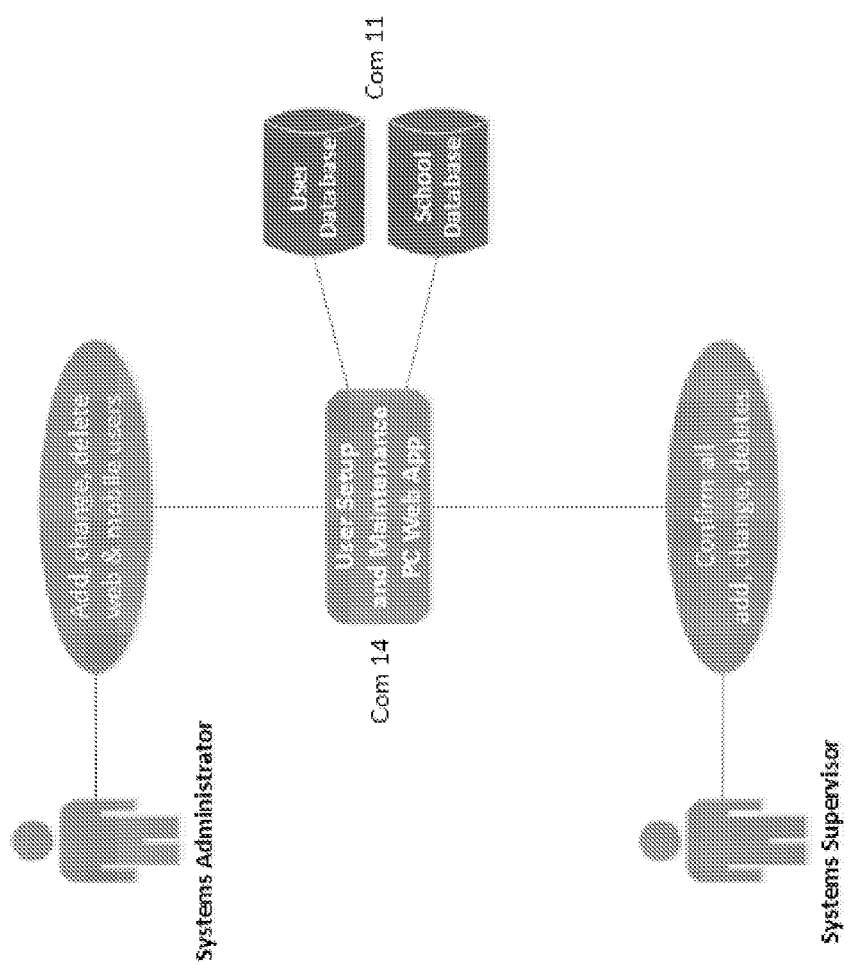
FIGS. 11-16 show additional examples of component data flow diagrams, user interactions with sub-systems of the threat sensing system according to at least some aspects of the present concepts.
Figure 12:
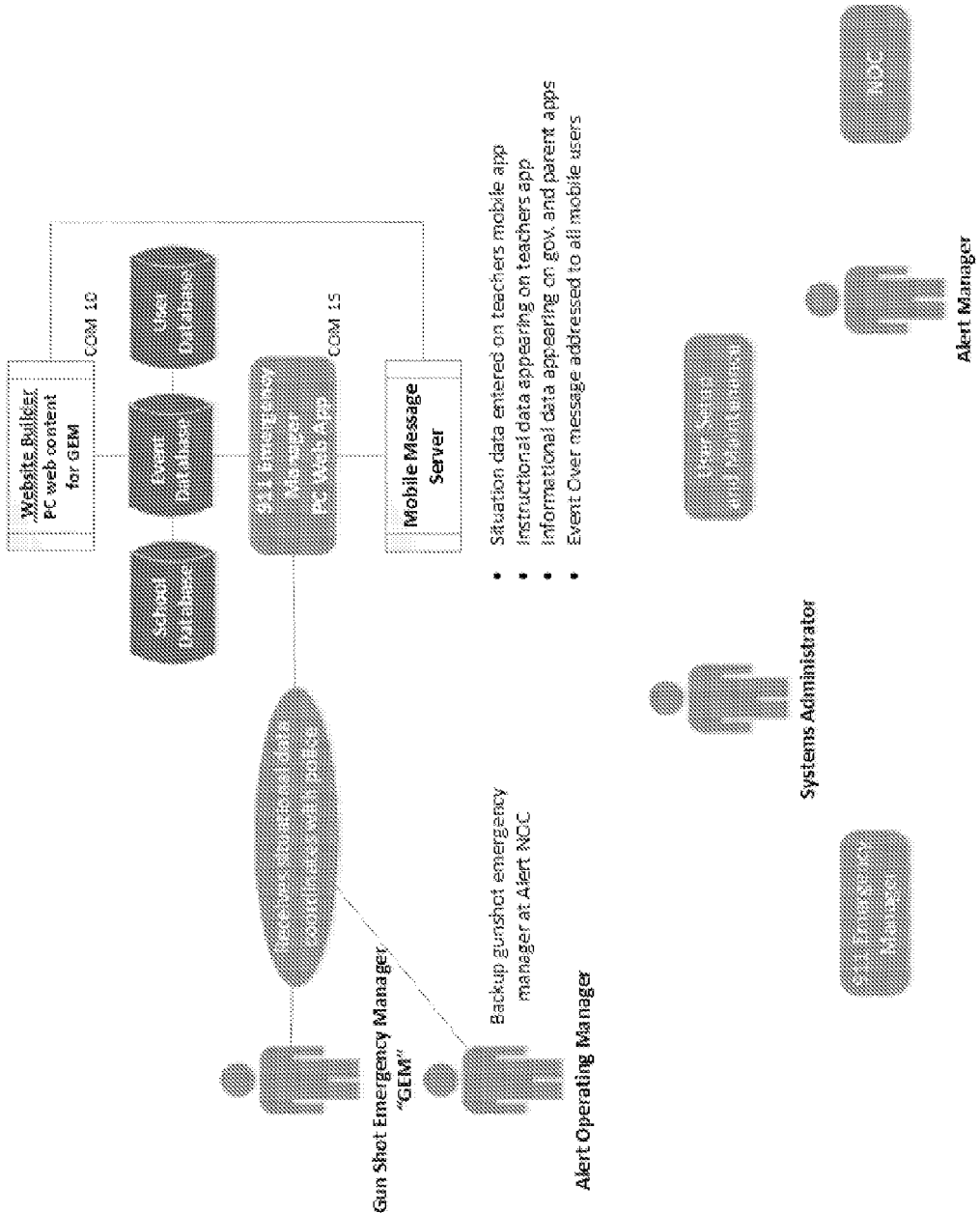
Figure 13:
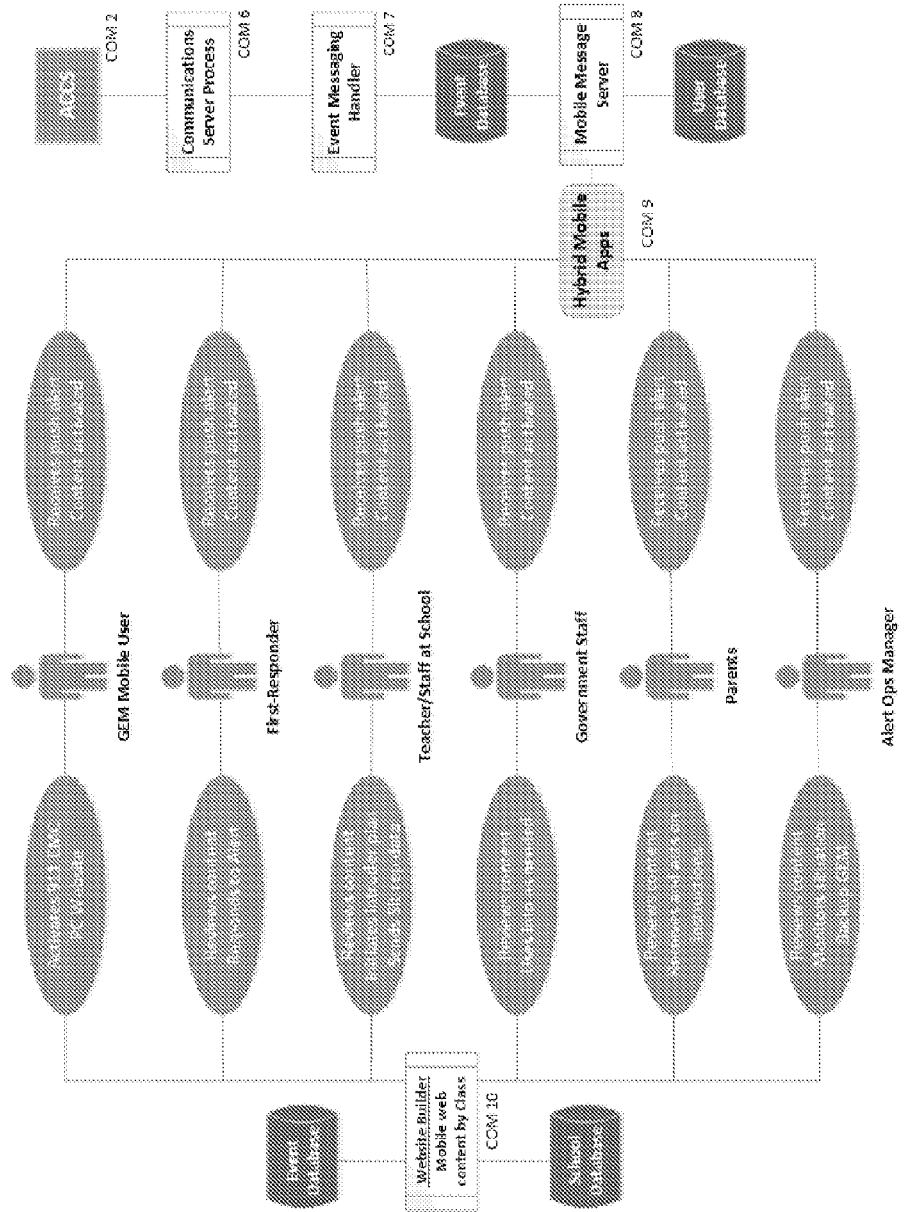
Figure 14:
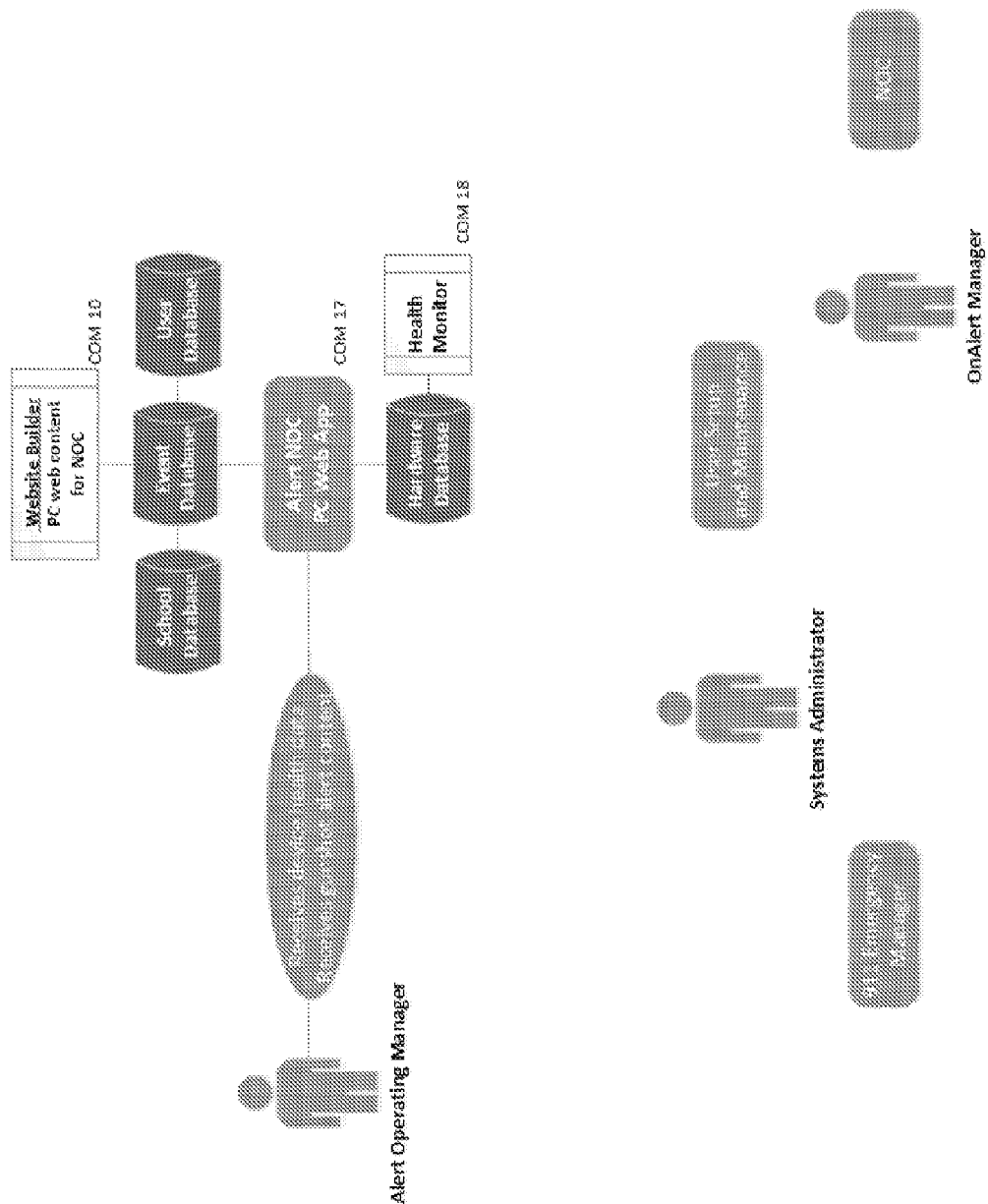
Figure 15:
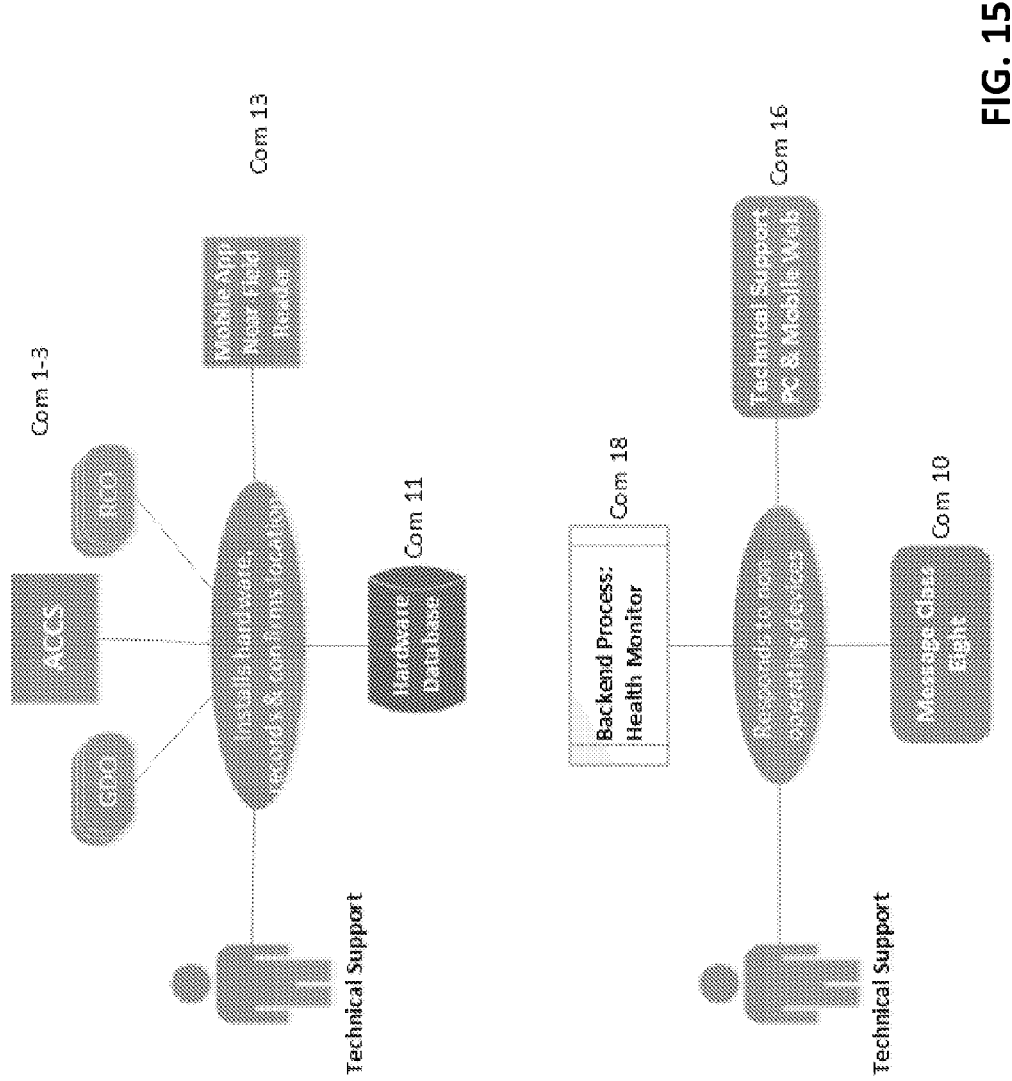
Figure 16:
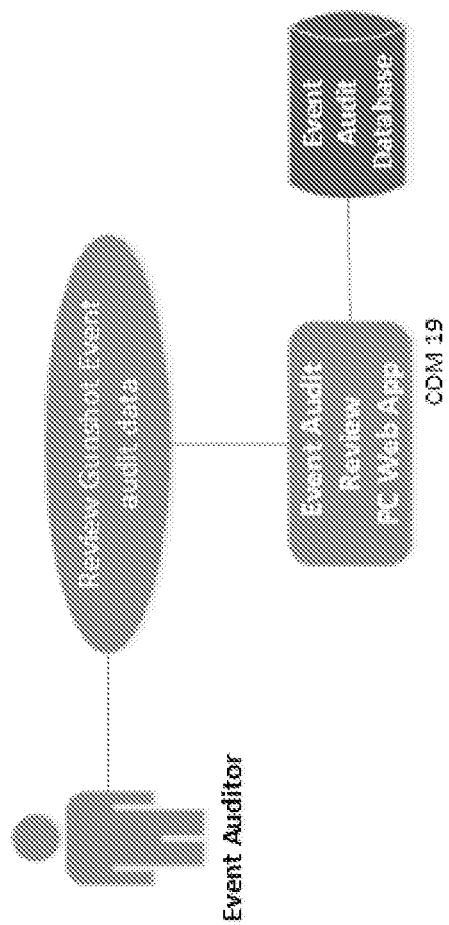

As shown in FIG. 10, the threat sensing system 100 management sub-system can comprise a suite of databases, back-end servers, and web applications that can be used to (a) manage the hardware administration and the user-base, (b) coordinate information dissemination and threat sensing system 100 system operation during gunshot events, and (c) manage the remote monitoring and maintenance of threat sensing system 100 hardware.

In FIGS. 7-16, GSD refers to Gunshot Detection Devices or more generally threat sensing devices 10, RCM refers to remote control modules 21, ACCS refers to the system gateway 110, and GSTA refers to a Gunshot Sensor Testing Appliance.

As shown in FIG. 9, nineteen (19) system components are depicted. The components are organized into four sub-systems.

As shown in FIG. 9, the system gateway (ACCS) connects to the powerline to not only receive power, but also to gain access to alert data that could be sent by the GSDs (threat sensing devices 10). This system gateway (ACSS) server, as noted, serves as a communications gateway (or bridge) between the building's internal powerline data networks and the external public data networks that threat sensing system 100 can use to reach the Internet (these public networks can consist of non-IP all the national wireless networks and IP broadband cable networks), manages the network of sensors in the building, and can issue data commands to effect control of a wide variety of electromechanical devices located inside the school, such as electronic locks and PA systems.

The threat sensing system 100 Communications Server Process (CSP) runs continuously. An instance of this process runs for each customer. It captures data pushed by each customer's family of ACCS (system gateway) devices. It can be a redundant process and each instance being run by each school district can be constantly monitored by threat sensing system's 100 Network Operating Center. The threat sensing system 100 can ensure this process is always running for each customer. The CSP can be used to access the data flow to and from ACCS in each school. This Internet server processes can interface with all the different national wireless networks (like AT&T, Sprint, Verizon and others) to transmit alert and administrative support data between each ACCS and the threat sensing system 100 Internet Services Platform. One output IP data stream can be issued to the Message Handler from this process, filtered from the multiple IP and wireless input data streams. The one IP input stream coming from the Message Handler may be transmitted to the addressed ACCS by one or multiple IP and non-IP wireless networks. The Message Handler (MH) process runs when it is invoked by the CSP. An instance runs for each customer. The CSP can invoke the Message Handler whenever it receives data from any ACCS device. It can be a redundant process and each instance being run by each school district can be constantly monitored by threat sensing system 100 Network Operating Center. The Message Handler is advantageously invoked at least once a day by a "Health-Check" background process that sends a "Health-Check" to each ACCS for each customer. The Message Handler can wait for a response from each ACCS device. It can resend the Health-Check if it gets no response in some period of time. If no response is returned or it the Message Handler receives a "Trouble" message, it can update the hardware database with a "trouble ticket".

Each ACCS (system gateway) can push gunshot alert messages to the event message handler and the information received from the ACCS can be passed to the threat sensing system 100 message server and used to update the Gunshot Event database. A continuously running backend process, can initiate a daily (or more frequent) health check through the Message Handler. The Message Handler can access the hardware database to determine all ACCS devices that need to receive a "Health Check" message. The CSP can determine the IP address of each ACCS and send the message over at least two networks.

Each of the aforementioned aspects, examples, and embodiments and obvious variations thereof is contemplated as falling within the spirit and scope of the claimed threat sensing system 100, of which certain non-limiting aspects are set forth in the appended claims. The present concepts expressly include any and all combinations and sub-combinations of all of (i.e., any combination of) the disclosed elements, aspects, systems, sub-systems and components without limitation.

What is claimed is:

1. A threat sensing system comprising:
   at least one threat sensing device mounted inside a building, the at least one threat sensing device comprising plurality of sensors, the plurality of sensors comprising an acoustic sensor, a gas sensor, a pressure sensor, and a first communication device configured to output sensor data along a communication pathway; and
   a system gateway, comprising a second communication device configured to receive sensor data from the at least one threat sensing device along the communication pathway, the system gateway being configured to automatically communicate at least one of the existence of the threat, the sensor data, or one or more predetermined messages to a plurality of pre-registered recipient devices by processing a probability to give a confidence score based upon a sequence of the sensor data from the acoustic sensor, the pressure sensor, and the gas sensor that is determined to correspond to one of a predetermined plurality of known threats;
   when the confidence score is low, do nothing;
   when the confidence score is medium, record data in a memory;
   when the confidence score is high, automatically communicate the at least one of the existence of the threat, the sensor data, or one or more predetermined messages to the plurality of pre-registered recipient devices.

2. The threat sensing system according to claim 1, wherein the at least one threat sensing device further comprises:
   an image sensor.

3. The threat sensing system according to claim 1, further comprising:
   a plurality of threat sensing devices, the plurality of threat sensing devices being disposed within, and distributed within, the building.

4. The threat sensing system according to claim 3, wherein the building comprises a school.

5. The threat sensing system according to claim 4, wherein the plurality of pre-registered recipient devices comprise at least one of a police dispatcher, a first responder's mobile device, a police car laptop, an ambulance laptop, a teacher's mobile device, a school employee's mobile device, a school staff member's mobile device, a security guard mobile device, and a school administrator mobile device.

6. The threat sensing system according to claim 1, wherein the plurality of pre-registered recipient devices subscribe to a messaging system to receive communications from the threat sensing system.

7. The threat sensing system according to claim 6, wherein the communications from the threat sensing system comprise at least two of a map of the building, a location of a shooter within the building, a number of shots fired, or an identification of a type of weapon or weapons discharged.

8. The threat sensing system according to claim 7, wherein the communications from the threat sensing system comprise the map of the building, the location of the shooter within the building, the number of shots fired, and the identification of the type of weapon or weapons discharged.

9. The threat sensing system according to claim 2, wherein the communication pathway comprises a universal powerline bus.

10. The threat sensing system according to claim 2, wherein the first communication device and the second communication device comprise wireless devices.

11. The threat sensing system according to claim 2, wherein the threat sensing device is configured to be screwed into a light socket.

12. The threat sensing system according to claim 2, wherein the threat sensing device is configured to be attached to an electrical outlet.

13. The threat sensing system according to claim 3, wherein the acoustic sensor is configured to detect a gunshot, and the gas sensor is configured to detect molecules representative of the gunshot.

14. The threat sensing system according to claim 13, wherein at least some of the plurality of threat sensing devices further comprise:
an IR image sensor configured to detect a firearm muzzle flash inside the building.

15. The threat sensing system according to claim 13, further comprising:
at least one threat countermeasure communicatively coupled to at least one of the at least one threat sensing device or the system gateway, wherein the at least one threat countermeasure is a less than lethal countermeasure.

16. The threat sensing system according to claim 1, wherein the determination as to whether the sensor data corresponds to one of the predetermined plurality of known threats is performed by the at least one threat sensing device.

17. The threat sensing system according to claim 1, wherein the determination as to whether the sensor data corresponds to one of the predetermined plurality of known threats is performed by the system gateway.

18. A method of detecting and reporting a threat comprising:
mounting at least one threat sensing device in at least a first location inside a building, the at least one threat sensing device comprising a plurality of sensors, the plurality of sensors comprising an acoustic sensor, a gas sensor, a pressure sensor, and a first communication device configured to output sensor data along a communication pathway;
outputting the sensor data to a system gateway, the system gateway comprising a second communication device configured to receive the sensor data from the at least one threat sensing device along the communication pathway;
determining, using either the system gateway or the threat sensing device, whether the sensor data corresponds to a gunshot by processing a probability to give a confidence score based upon a sequence of the sensor data from the acoustic sensor, the pressure sensor, and the gas sensor wherein;
when the confidence score is low, do nothing;
when the confidence score is medium, record data in a memory;
when the confidence score is high, automatically communicate the at least one of the existence of the threat, the sensor data, or one or more predetermined messages to the plurality of pre-registered recipient devices.

19. The method of detecting and reporting the threat according to claim 18, wherein a plurality of the threat sensing devices are disposed in a plurality of locations in the building, and the act of determining whether the sensor data corresponds to the gunshot further comprises:
analyzing the sensor data from the plurality of the threat sensing devices.

20. The threat sensing system according to claim 1, wherein the system gateway is configured to send identical event data to a message handler through a plurality of wireless and broadband connections.

21. The method of detecting and reporting the threat according to claim 18, wherein the system gateway is configured to send identical event data to a message handler through a plurality of wireless and broadband connections.

22. The threat sensing system according to claim 15, wherein the less than lethal countermeasure is at least one of a Taser projective, a LED strobe, a LED incapacitator, or a Dazzler.

23. The threat sensing system of claim 2, wherein the image sensor is an optical sensor.

24. The threat sensing system of claim 1, wherein the image sensor is an infrared (IR) sensor configured to detect a firearm muzzle flash inside the building.

25. The threat sensing system of claim 1, wherein the pressure sensor is a shock sensor.

26. The threat sensing system of claim 1, further comprising:
a seismic sensing device configured to record voltage based upon ground movement.

27. The threat sensing system of claim 1, further comprising:
an electromagnetic pulse detector.

28. The threat sensing system of claim 27, wherein the electromagnetic pulse detector is an electromagnetic wave detector configured to detect terahertz (THz) waves.

* * * * *